US012658821B1

(12) United States Patent
Hu et al.

(10) Patent No.: US 12,658,821 B1
(45) Date of Patent: Jun. 16, 2026

(54) COIL DRIVEN SWITCHED CAPACITOR AND CONTROLLER FOR WIRED AND INDUCTIVE CHARGING

(71) Applicant: Apple Inc., Cupertino, CA (US)

(72) Inventors: Zhiyuan Hu, Santa Clara, CA (US); Jizhen Fu, San Jose, CA (US); Weihong Qiu, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 322 days.

(21) Appl. No.: 18/457,721

(22) Filed: Aug. 29, 2023

Related U.S. Application Data

(60) Provisional application No. 63/476,107, filed on Dec. 19, 2022, provisional application No. 63/476,101, filed on Dec. 19, 2022.

(51) Int. Cl.
| | |
|---|---|
| *H02M 1/00* | (2007.01) |
| *H02M 1/10* | (2006.01) |
| *H02M 3/07* | (2006.01) |
| *H02M 3/157* | (2006.01) |
| *H02M 7/23* | (2006.01) |
| *H02J 50/10* | (2016.01) |

(52) U.S. Cl.
CPC ........... *H02M 7/23* (2013.01); *H02M 1/0009* (2021.05); *H02M 1/0012* (2021.05); *H02M 1/0095* (2021.05); *H02M 1/10* (2013.01); *H02M 3/07* (2013.01); *H02M 3/157* (2013.01); *H02J 50/10* (2016.02)

(58) Field of Classification Search
CPC ......... H02M 3/07–078; H02M 1/0012; H02M 1/10; H02M 1/0009; H02M 1/0095
See application file for complete search history.

(56) References Cited

U.S. PATENT DOCUMENTS

| | | | |
|---|---|---|---|
| 11,387,666 B2 | 7/2022 | Dalena | |
| 11,515,793 B2 | 11/2022 | Cannillo et al. | |
| 11,563,337 B2 * | 1/2023 | Yuan ....................... | H02J 50/12 |
| 12,212,249 B1 * | 1/2025 | Qiu .................... | H02M 3/33573 |
| 2013/0119961 A1 | 5/2013 | Okuda | |
| 2014/0266135 A1 | 9/2014 | Zhak | |
| 2016/0329809 A1 | 11/2016 | Granato | |
| 2020/0295587 A1 | 9/2020 | Giuliano et al. | |
| 2022/0376616 A1 | 11/2022 | Hu et al. | |
| 2024/0204556 A1 * | 6/2024 | Liu ..................... | H02M 1/0048 |
| 2024/0204658 A1 * | 6/2024 | Phadke .................. | H02M 1/14 |
| 2024/0204662 A1 * | 6/2024 | Lim ........................ | H02M 3/07 |
| 2024/0258801 A1 * | 8/2024 | Sahoo .................. | H02M 1/0058 |
| 2024/0258803 A1 * | 8/2024 | Sahoo ............... | H02M 3/33571 |
| 2025/0266702 A1 * | 8/2025 | Giuliano ................. | H02M 1/32 |

* cited by examiner

*Primary Examiner* — Sisay G Tiku
(74) *Attorney, Agent, or Firm* — FLETCHER YODER PC

(57) ABSTRACT

A coil driven switched capacitor (CDSC) converter can include at least one input coil that receives input power; first and second cascades of one or more CDSC cells, an input of each cascade being coupled to the at least one coil, and an output of each cascade being coupled to an output bus of the CDSC converter. The at least one input coil can include a first inductor coupled between a wired input power source and the first cascade of one or more CDSC cells and a second inductor coupled between the wired input power source and the second cascade of one or more CDSC cells. The at least one one input coil can further include a wireless power receiver coil.

34 Claims, 31 Drawing Sheets

COIL DRIVEN SWITCHED CAPACITOR AND CONTROLLER FOR WIRED AND INDUCTIVE CHARGING

CROSS-REFERENCE TO RELATED APPLICATIONS

This application claims priority to U.S. Provisional Application No. 63/476,101, filed Dec. 19, 2022, entitled "SWITCHED CAPACITOR CONVERTERS FOR WIRELESS POWER TRANSFER," and U.S. Provisional Application No. 63/476,107, filed Dec. 19, 2022, entitled "COIL DRIVEN SWITCHED CAPACITOR AND CONTROLLER FOR WIRED AND INDUCTIVE CHARGING," the disclosure of both are incorporated by reference in their entirety for all purposes.

BACKGROUND

Wireless power transfer ("WPT"), such as inductive power transfer ("IPT"), may be used to provide power for charging various battery-powered electronic devices. WPT has seen increased use in the consumer electronics space around devices such as mobile phones (i.e., smart phones) and their accessories (e.g., wireless earphones, smart watches, etc.) as well as tablets and other types of portable computers and their accessories (e.g., styluses, etc.). In some cases, wireless power transfer system efficiency may be dominated by conduction losses. As a result, in such systems higher operating efficiency can be achieved by increased operating voltages that all for the same level of power with reduced current, thus reducing conduction loss. However, when a wireless power transfer system is used for battery charging, increased operating voltage can decrease efficiency as battery charging circuits may employ regulation or conversion circuitry in which switching losses increase with the difference between the input voltage and the battery voltage. Thus, the design trade-offs between the wireless power transfer circuit efficiency and charging circuit efficiency can result in a configuration that is not optimal for either system.

SUMMARY

Thus, it may be desirable to provide wireless power transfer circuitry that allows for higher operating voltages while reducing the conversion ratio required of downstream battery charging circuitry, allowing for the reduction of both switching and conduction losses of the overall wireless power transfer and battery charger system.

A coil driven switched capacitor (CDSC) converter can include at least one input coil configured to receive input power; a first cascade of one or more CDSC cells, an input of the first cascade being coupled to the at least one coil, and an output of the first cascade being coupled to an output bus of the CDSC converter; and a second cascade of one or more CDSC cells coupled to the at least one input coil and an output of the second cascade being coupled to the output bus of the CDSC converter. The at least one input coil can include a first inductor coupled between a wired input power source and the first cascade of one or more CDSC cells and a second inductor coupled between the wired input power source and the second cascade of one or more CDSC cells. The at least one input coil can further include a wireless power receiver coil.

Each CDSC cell can include a flying capacitor having a first terminal coupled to an input terminal of the CDSC cell and a second terminal; a top switch having a first terminal coupled to the input terminal of the CDSC cell and the first terminal of the flying capacitor and a second terminal coupled to a first output terminal of the CDSC cell, thereby allowing the top switch to selectively couple first terminal of the flying capacitor to the first output terminal of the CDSC cell; a middle switch having a first terminal coupled to a second output terminal of the CDSC cell and a second terminal coupled to the second terminal of the flying capacitor, thereby allowing the middle switch to selectively couple the second terminal of the flying capacitor to the second output terminal of the CDSC cell; and a bottom switch having a first terminal coupled to the second terminal of the flying capacitor and the second terminal of the middle switch and a second terminal coupled to ground, thereby allowing the bottom switch to selectively couple the second terminal of the flying capacitor to ground.

The first cascade of one or more CDSC cells can further include a first upstream CDSC cell having its input terminal coupled to the first rectifier and its first output terminal coupled to the output bus; and a first downstream CDSC cell having its input terminal coupled to the second output terminal of the first upstream CDSC cell and its first and second output terminals coupled to the output bus. The second cascade of one or more CDSC cells can further include a second upstream CDSC cell having its input terminal coupled to the second rectifier and its first output terminal coupled to the output bus; and a second downstream CDSC cell having its input terminal coupled to the second output terminal of the second upstream CDSC cell and its first and second output terminals coupled to the output bus. The first and second cascades of CDSC cells each further comprise one or more intermediate CDSC cells, with each intermediate CDSC cell having its input terminal coupled to an immediately upstream CDSC cell, its first output terminal coupled to the output bus, and its second output terminal coupled to an immediately downstream CDSC cell. Each CDSC cell can further include a diode having its anode coupled to the second terminal of the flying capacitor and its cathode coupled to a terminal of the input coil.

The CDSC converter can further include control circuitry that selectively alternates each CDSC cell among a P mode, an S mode, and a float mode to convert received input power to a desired voltage on the output bus. in the P mode the flying capacitor of the CDSC cell can be connected in parallel with the first output terminal of the CDSC cell. In the S mode the flying capacitor of the CDSC cell can be connected in series with the second output terminal of the CDSC cell. in the float mode the flying capacitor of the CDSC cell is disconnected from the output terminals of the CDSC cell. The control circuitry sequences switching of switching devices of each cascade of CDSC cells to achieve zero voltage switching.

The control circuitry can sequence switching a cascade of CDSC cells undergoing a P mode to S mode transition to achieve zero voltage switching by: simultaneously turning off top and bottom switches of the cascade of CDSC cells undergoing a P mode to S mode transition; turning off a low side switch of a rectifier coupled to the cascade of CDSC cells undergoing a P mode to S mode transition; turning on a high side switch of a rectifier coupled to the cascade of CDSC cells undergoing a P mode to S mode transition; and turning on middle switches of all CDSC cells in the cascade from upstream to downstream, upon middle switches' body diode conduction. The control circuitry can sequence switching a cascade of CDSC cells undergoing an S mode to P mode transition to achieve zero voltage switching by: turning off a middle switch of a most downstream CDSC cell in the cascade of CDSC cells undergoing an S mode to Pmode transition; turning on a bottom switch of the most downstream CDSC cell upon its body diode conduction, and then turning on a top switch of the most downstream CDSC cell; turning off a middle switch of an adjacent upstream CDSC cell; turning on a bottom switch of the adjacent upstream RDSC cell upon its body diode conduction, and then turning on a top switch of the adjacent upstream RDSC cell; and turning off a high side switch and turning on a low side switch of a rectifier corresponding to the cascade of CDSC cells undergoing a S mode to P mode transition. The control circuitry can sequence switching a cascade of CDSC cells undergoing an S mode to P mode transition to achieve zero voltage switching by: simultaneously turning off a middle switch of each CDSC cell in the cascade of CDSC cells undergoing an S mode to P mode transition, and off a high side switch of a rectifier corresponding to the same cascade of CDSC cells; waiting for the coil current to discharge the voltage on a second terminal of each flying capacitor through an auxiliary diode of each CDSC cell in the cascade; upon completion of discharging the voltage on second terminals of all flying capacitors, simultaneously turning on a bottom switch and a top switch of each CDSC cell in the cascade of CDSC cells undergoing an S mode to P mode transition; and turning on a low side switch of an rectifier corresponding to the cascade of CDSC cells undergoing an S mode to P mode transition.

The control circuitry can vary a conversion ratio of the CDSC converter to produce discrete conversion ratios by selectively actively operating a first subset of CDSC cells of a CDSC cascade and selectively forcing a second subset of CDSC cells of the CDSC cascade into P mode. The control circuitry can vary a conversion ratio of the CDSC converter to produce continuous conversion ratios by selectively actively operating a first subset of CDSC cells of a CDSC cascade, selectively operating at least one CDSC cell of the CDSC cascade with a variable duty cycle alternating between active operation and forced P mode, and selectively forcing a second subset of CDSC cells of the CDSC cascade into P mode. The control circuitry can vary a conversion ratio of the CDSC converter to produce continuous conversion ratios by selectively operating a first subset of CDSC cells of a CDSC cascade with a first variable duty cycle alternating between active operation and forced P mode, selectively operating a second subset of CDSC cells of the CDSC cascade with a second variable duty cycle greater than the first duty cycle and alternating between active operation and forced P mode, and selectively forcing a third subset of CDSC cells of the CDSC cascade into P mode.

The control circuitry can operate the CDSC cells to produce three voltage levels in each switching period to control inductor current. One of the three voltage levels can be a medium voltage close to an input voltage of the CDSC converter. One of the voltage levels can be a low voltage that is lower than the input voltage. One of the voltage levels can be a high voltage that is higher than the input voltage. The control circuitry can control inductor current to achieve boundary conduction mode operation. The control circuitry can operate the CDSC cells responsive to a peak current signal to trigger voltage level switching from the low voltage to the medium voltage and can operate the CDSC cells responsive to a dual-role ramp signal to trigger voltage level switching from the medium voltage to the high voltage so as to force coil current to cross below zero at an end of each switching period. The dual-role ramp signal can be used as a switching period timer and an inductor current threshold. The control circuitry can generate the dual-role ramp signal so that an amplitude and a slope of the dual-role ramp signal change with input and output voltage to keep the switching period constant. The control circuitry can generate the dual-role ramp signal so that the amplitude and slope of the dual-role ramp signal are proportional to an amplitude and slope of a current through the input coil.

DETAILED DESCRIPTION

Figure 1:
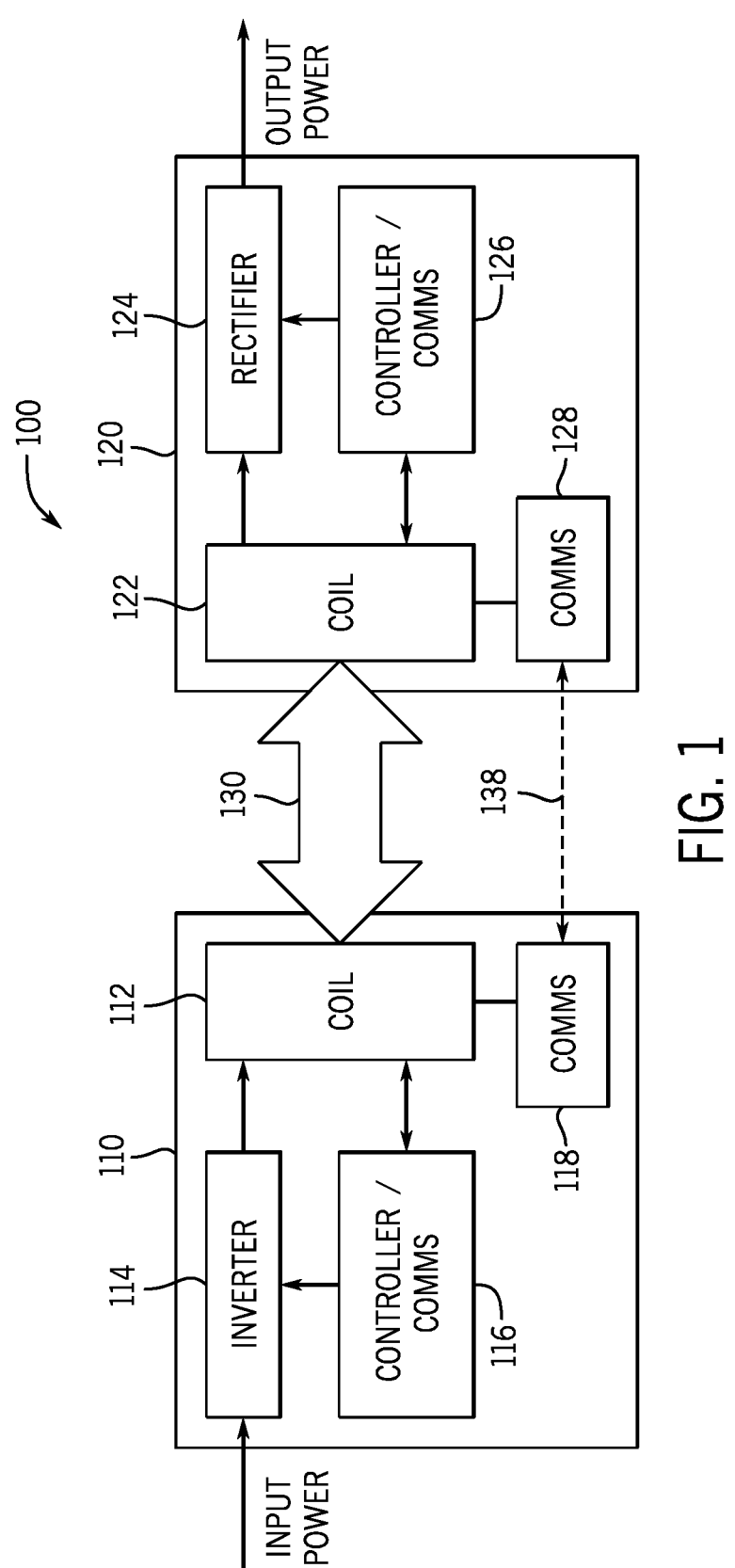
FIG. 1 illustrates a block diagram of a wireless power transfer system.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth to provide a thorough understanding of the implementations described herein. In other instances, methods, procedures, and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 illustrates a simplified block diagram of a wireless power transfer system 100. Wireless power transfer system includes a power transmitter (PTx) 110 that transfers power to a power receiver (PRx) 120 wirelessly, such as via inductive coupling 130. Power transmitter 110 may receive input power that is converted to an AC voltage having particular voltage and frequency characteristics by an inverter 114. Inverter 114 may be controlled by a controller/communications module 116 that operates as further described below. In various embodiments, the inverter controller and communications module may be implemented in a common system, such as a system based on a microprocessor, microcontroller, or the like. In other embodiments, the inverter controller may be implemented by a separate controller module and communications module that have a means of communication between them. Inverter 114 may be constructed using any suitable circuit topology (e.g., full bridge, half bridge, etc.) and may be implemented using any suitable semiconductor switching device technology (e.g., MOSFETs, IGBTs, etc. made using silicon, silicon carbide, or gallium nitride devices).

Inverter 114 may deliver the generated AC voltage to a transmitter coil 112. In addition to a wireless coil allowing magnetic coupling to the receiver, the transmitter coil block 112 illustrated in FIG. 1 may include tuning circuitry, such as additional inductors and capacitors, that facilitate operation of the transmitter in different conditions, such as different degrees of magnetic coupling to the receiver, different operating frequencies, etc. The wireless coil itself may be constructed in a variety of different ways. In some embodiments, the wireless coil may be formed as a winding of wire around a suitable bobbin. In other embodiments, the wireless coil may be formed as traces on a printed circuit board.

Other arrangements are also possible and may be used in conjunction with the various embodiments described herein. The wireless transmitter coil may also include a core of magnetically permeable material (e.g., ferrite) configured to affect the flux pattern of the coil in a way suitable to the particular application. The teachings herein may be applied in conjunction with any of a wide variety of transmitter coil arrangements appropriate to a given application.

PTx controller/communications module 116 may monitor the transmitter coil and use information derived therefrom to control the inverter 114 as appropriate for a given situation. For example, controller/communications module may be configured to cause inverter 114 to operate at a given frequency or output voltage depending on the particular application. In some embodiments, the controller/communications module may be configured to receive information from the PRx device and control inverter 114 accordingly. This information may be received via the power transmission coils (i.e., in-band communication) or may be received via a separate communications channel (not shown, i.e., out-of-band communication). For in-band communication, controller/communications module 116 may detect and decode signals imposed on the magnetic link (such as voltage, frequency, or load variations) by the PRx to receive information and may instruct the inverter to modulate the delivered power by manipulating various parameters of the generated voltage (such as voltage, frequency, etc.) to send information to the PRx. In some embodiments, controller/communications module may be configured to employ frequency shift keying (FSK) communications, in which the frequency of the inverter signal is modulated, to communicate data to the PRx. Controller/communications module 116 may be configured to detect amplitude shift keying (ASK) communications or load modulation-based communications from the PRx. In either case, the controller/communications module 126 may be configured to vary the current drawn on the receiver side to manipulate the waveform seen on the Tx coil to deliver information from the PRx to the PTx. For out-of-band communication, additional modules that allow for communication between the PTx and PRx may be provided, for example, WiFi, Bluetooth, or other radio links or any other suitable communications channel.

As mentioned above, controller/communications module 116 may be a single module, for example, provided on a single integrated circuit, or may be constructed from multiple modules/devices provided on different integrated circuits or a combination of integrated and discrete circuits having both analog and digital components. The teachings herein are not limited to any particular arrangement of the controller/communications circuitry.

PTx device 110 may optionally include other systems and components, such as a separate communications ("comms") module 118. In some embodiments, comms module 118 may communicate with a corresponding module tag in the PRx via the power transfer coils. In other embodiments, comms module 118 may communicate with a corresponding module using a separate physical channel 138.

As noted above, wireless power transfer system also includes a wireless power receiver (PRx) 120. Wireless power receiver can include a receiver coil 122 that may be magnetically coupled 130 to the transmitter coil 112. As with transmitter coil 112 discussed above, receiver coil block 122 illustrated in FIG. 1 may include tuning circuitry, such as additional inductors and capacitors, that facilitate operation of the transmitter in different conditions, such as different degrees of magnetic coupling to the receiver, different operating frequencies, etc. The wireless coil itself may be constructed in a variety of different ways. In some embodiments, the wireless coil may be formed as a winding of wire around a suitable bobbin. In other embodiments, the wireless coil may be formed as traces on a printed circuit board. Other arrangements are also possible and may be used in conjunction with the various embodiments described herein. The wireless receiver coil may also include a core of magnetically permeable material (e.g., ferrite) configured to affect the flux pattern of the coil in a way suitable to the particular application. The teachings herein may be applied in conjunction with any of a wide variety of receiver coil arrangements appropriate to a given application.

Receiver coil 122 outputs an AC voltage induced therein by magnetic induction via transmitter coil 112. This output AC voltage may be provided to a rectifier 124 that provides a DC output power to one or more loads associated with the PRx device. Rectifier 124 may be controlled by a controller/communications module 126 that operates as further described below. In various embodiments, the rectifier controller and communications module may be implemented in a common system, such as a system based on a microprocessor, microcontroller, or the like. In other embodiments, the rectifier controller may be implemented by a separate controller module and communications module that have a means of communication between them. Rectifier 124 may be constructed using any suitable circuit topology (e.g., full bridge, half bridge, etc.) and may be implemented using any suitable semiconductor switching device technology (e.g., MOSFETs, IGBTs, etc. made using silicon, silicon carbide, or gallium nitride devices).

PRx controller/communications module 126 may monitor the receiver coil and use information derived therefrom to control the rectifier 124 as appropriate for a given situation. For example, controller/communications module may be configured to cause rectifier 124 to provide a given output voltage depending on the particular application. In some embodiments, the controller/communications module may be configured to send information to the PTx device to effectively control the power delivered to the receiver. This information may be received or sent via the power transmission coils (i.e., in-band communication) or may be sent via a separate communications channel (not shown, i.e., out-of-band communication). For in-band communication, controller/communications module 126 may, for example, modulate load current or other electrical parameters of the received power to send information to the PTx. In some embodiments, controller/communications module 126 may be configured to detect and decode signals imposed on the magnetic link (such as voltage, frequency, or load variations) by the PTx to receive information from the PTx. In some embodiments, controller/communications module 126 may be configured to receive frequency shift keying (FSK) communications, in which the frequency of the inverter signal has been modulated to communicate data to the PRx. Controller/communications module 126 may be configured to generate amplitude shift keying (ASK) communications or load modulation-based communications from the PRx. In either case, the controller/communications module 126 may be configured to vary the current drawn on the receiver side to manipulate the waveform seen on the Tx coil to deliver information from the PRx to the PTx. For out-of-band communication, additional modules that allow for communication between the PTx and PRx may be provided, for example, WiFi, Bluetooth, or other radio links or any other suitable communications channel.

As mentioned above, controller/communications module 126 may be a single module, for example, provided on a single integrated circuit, or may be constructed from multiple modules/devices provided on different integrated circuits or a combination of integrated and discrete circuits having both analog and digital components. The teachings herein are not limited to any particular arrangement of the controller/communications circuitry.

PRx device 120 may optionally include other systems and components, such as a communications module 128. In some embodiments, comms module 128 may communicate with a corresponding module in the PTx via the power transfer coils. In other embodiments, comms module 128 may communicate with a corresponding module or tag using a separate physical channel 138.

Numerous variations and enhancements of the above-described wireless power transmission system 100 are possible, and the following teachings are applicable to any of such variations and enhancements.

Figure 2:
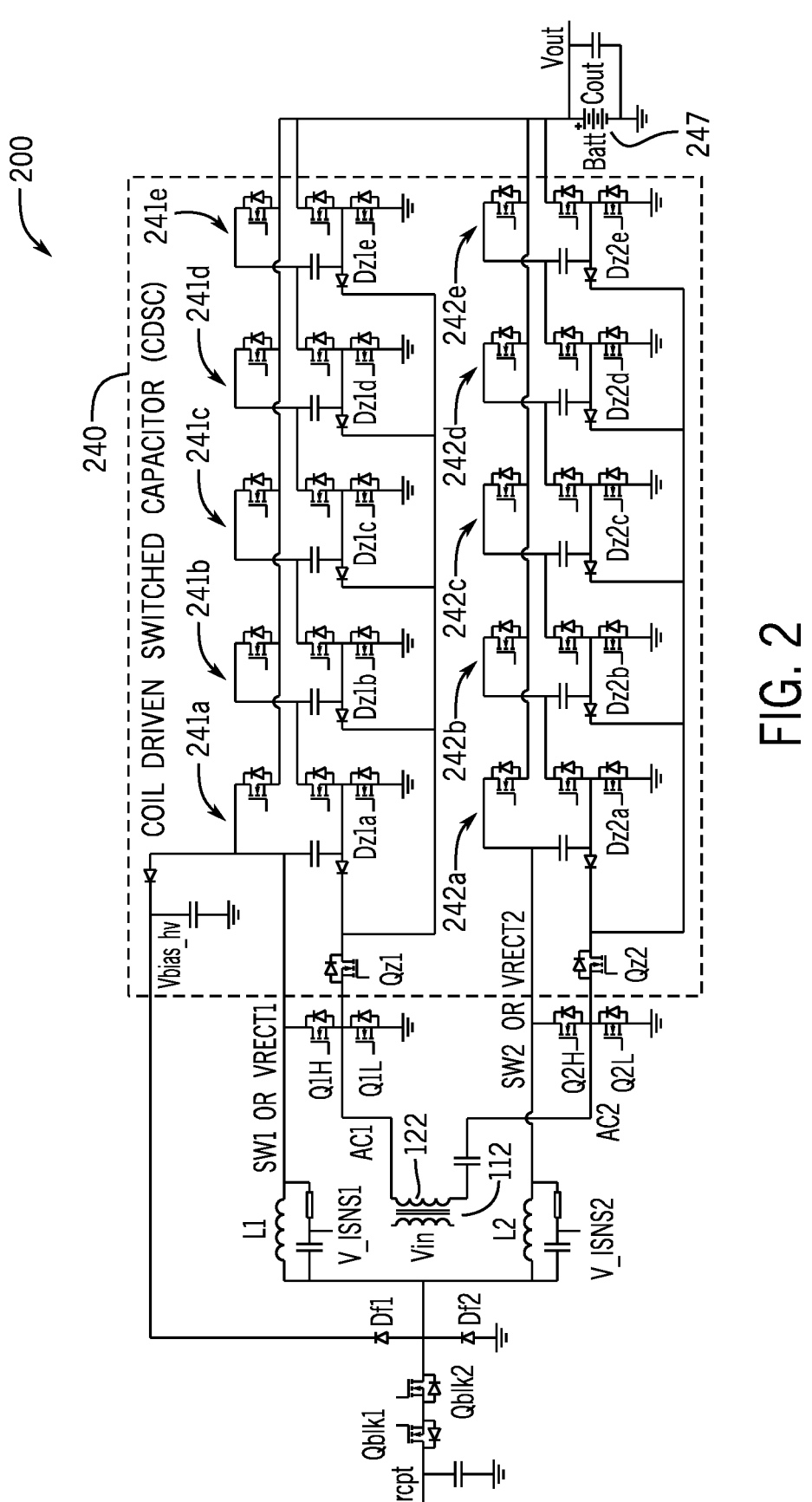
FIG. 2 illustrates a coil driven switched capacitor arrangement.

FIG. 2 illustrates a coil driven switched capacitor (CDSC) circuit 240. As one example application, CDSC circuit 240 can be used in an electronic device (such as a smart phone, smart watch, tablet computer, or accessory such as a stylus, wireless earphones, etc.) to take input power from either a wired power source (via inductors L1/L2, i.e., coils) or a wireless power source (via wireless power transmit winding 112 and wireless power receive winding 122, i.e., coils) and use the received to power the device and/or to charge a battery 247 of the electronic device. As described in greater detail below, CDSC circuit 240 achieves a 6:1 current multiplication ratio (with a corresponding 1:6 voltage division ratio) by operation of CDSC cells 241a-241e and 242a-242c. In other words, the voltage appearing at the input is reduced from a relatively higher value to a relatively lower value (Vout), while increasing the current by the same proportion. The illustrated 6:1 conversion ratio is exemplary only, and other conversion ratios are possible, as described in greater detail below.

CDSC circuit 240 can receive input power via a wireless power transfer system as described above with respect to FIG. 1. In that case, power can be received via wireless power receive winding 122, which can be magnetically coupled to wireless power transmit winding 112 as described above. In this case, switching devices Q1H/Q1L can be operated as a rectifier for AC current delivered via node AC1, and switching devices Q2H/Q2L may be operated as a rectifier for AC current delivered via node AC2. Alternatively, CDSC circuit 240 can be receive power via a wired power source via inductor coils L1 and L2. When a wired input is the power source, the rectifier high-side FETs (Q1H, Q2H) can be operated to disconnect the inductive coil from the rest of circuit. Optionally, the rectifier low-side FETs (Q1L, Q2L) can turn-on to ground the inductive coil. Such a CDSC circuit can therefore allow an electronic device to be powered and charge an internal battery via either a wireless or a wired power source. In the illustrated example, the output rail of CDSC circuit 240 is directly connected to a battery 247 for charging, although in other applications or embodiments, the output rail could be an intermediate rail that does not directly charge a battery.

In addition to the CDSC cells 241a-241e and 242a-242e (described in greater detail below with respect to FIG. 3), CDSC circuit 240 can also include additional components in the form of switches Qz1/Qz2 and diodes Dz1a-DZ1e and Dz2a-Dz2d to provide better symmetrical slopes of the AC input from a wireless power source. These additional components are described in greater detail below. By way of introduction, Qz1 and Qz2 are static switches; they turn on in inductive charging mode and turn off in in wired charging mode. When receiving power from a wireless power transfer source, switches Qblk1/Qblk2 can disconnect node Vrept from the rest of circuit.

Additionally, diodes Df1 and Df2 may be provided as freewheeling diodes for inductors L1 and L2, to be used, for example, in a case in which switches Qblk1/Qblk2 turn off when the inductors are not fully de-energized. Df1 discharges L1 and L2's residual energy to bus Vbias_hv, which can be a relatively high voltage node used for bias supply of various components, etc. For example, Vbias_hv can be used for wired charging controller as described in greater detail below.

Figure 3:
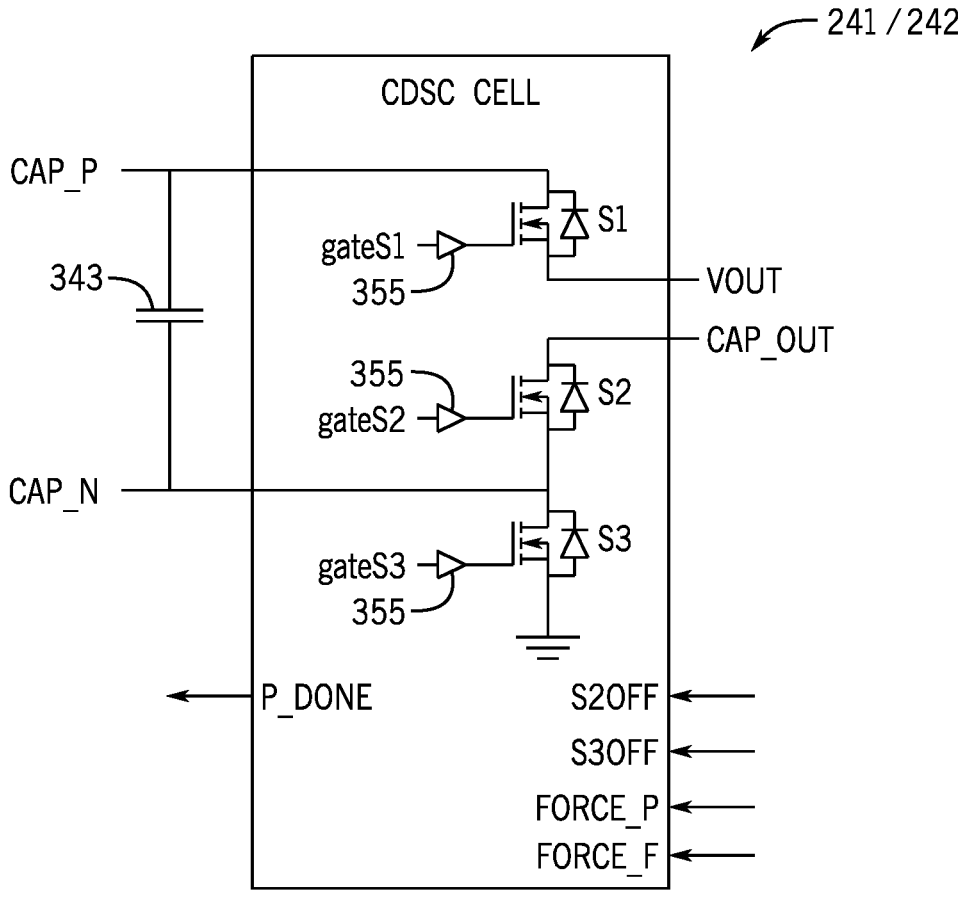
FIG. 3 illustrates a coil driven switched capacitor (CDSC) cell and signal definitions.
Figure 4:
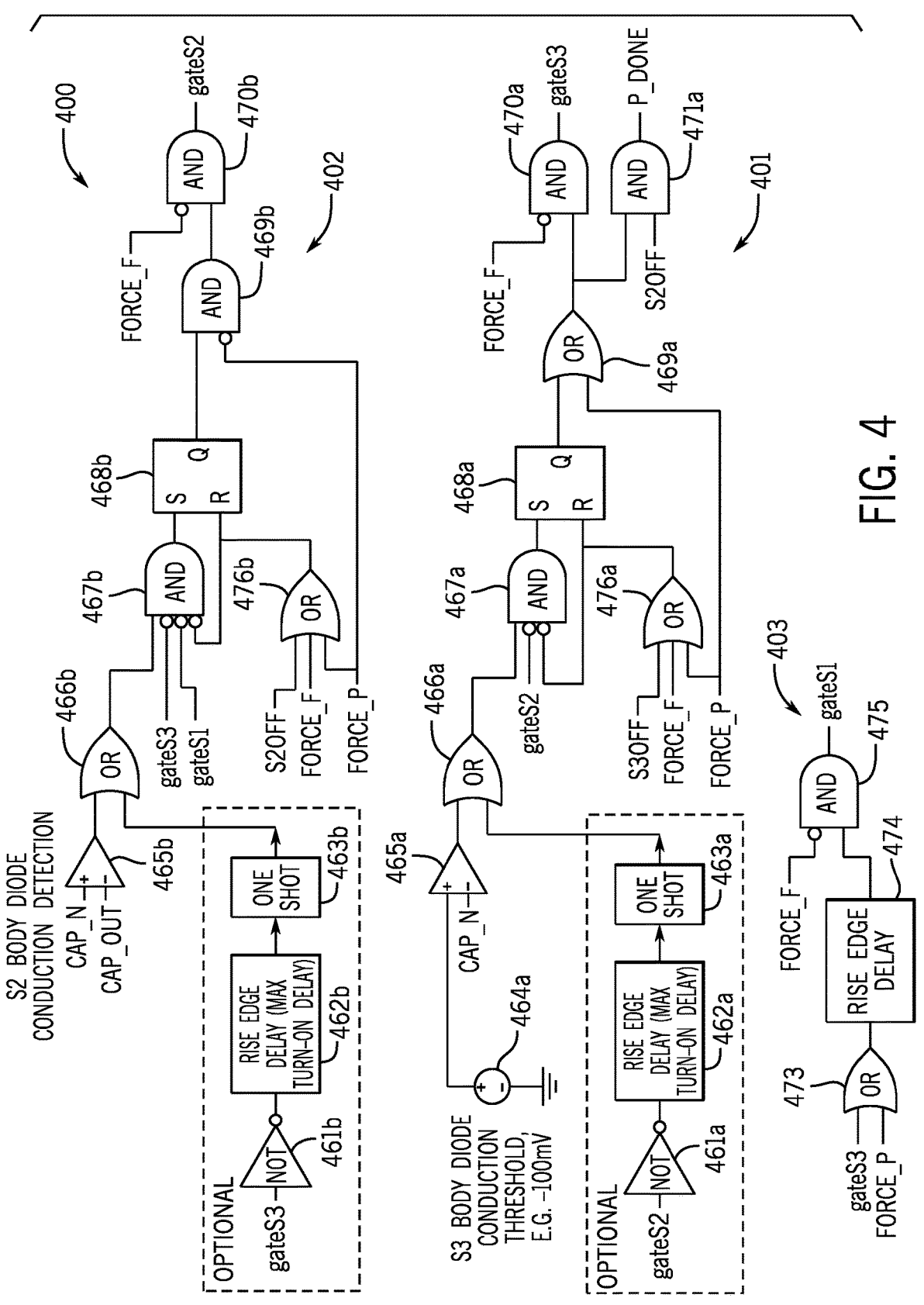
FIG. 4 illustrates internal control logic of a CDSC cell.

FIG. 3 illustrates a coil driven switched capacitor (CDSC) cell along with its control interface inputs. Exemplary control logic for a CDSC cell is illustrated in FIG. 4. With reference to FIG. 3, each CDSC cell includes a flying capacitor 343, a top switch S1, a middle switch S2, and a bottom switch S3. Switches S1-S3 may be driven by gate drive signals gateS1-gateS3, respectively. The logical gate drive signals may be provided to the switches via gate driver circuits 355. The flying capacitor of each respective CDSC cell can be connected to terminals CAP_P and CAP_N. Terminal CAP_P can be coupled to a first terminal of top switch S1. Terminal CAP_N can be coupled to the switch node of the CDSC cell, i.e., the connection point of middle switch S2 and bottom switch S3. Additional "power" connections of the CDSC cell, meaning the path along which power flows as opposed to the control signals discussed below, include the VOUT terminal connecting to the second terminal of top switch S1 and CAP_OUT connecting to middle switch S2. The VOUT terminal is always coupled to the output bus (Vout) of CDSC circuit 240 (which can be coupled to battery 247 and/or output capacitor Cout).

Also illustrated in FIG. 3 are control terminals/connections, specifically, inter-cell control connections/terminals, as described in greater detail below. These include an S2OFF input and an S3OFF input, allowing the CDSC cell 241/242 to receive an input turning off middle switch S2 and bottom switch S3, respectively. Additionally, FORCE_P and FORCE_F inputs may be provided, allowing CDSC cell 241/242 to receive a control signal commanding it to engage P mode or F mode (discussed below). Finally, CDSC cell 241/242 can include a P_DONE signal output, allowing the CDSC cell to pass through a command to another CDSC cell (as described in greater detail below).

Turning now to FIG. 4, the internal control logic 400 of a CDSC cell is depicted in three trains 401, 402, and 403. The control logic may be implemented in any of a variety of forms, including the use of discrete circuitry, integrated circuitry, or programmable circuitry that is programmed to perform the described functionality. The following description is based on discrete logic gates/blocks intended to provide a basic description of the elements of the control circuitry with the understanding that the functionality described could be implemented in a variety of structural forms.

Internal or intra cell control logic 400 is broken down into three trains 401, 402, and 403. The internal control logic can generate the internal gate drive signals gateS1-gateS3 for switches S1-S3 of the CDSC cell as well as the P_DONE signal described above. Logic train 401 generates the gateS3 signal for driving bottom switch S3 as well as the P_DONE signal passed to other cells from various inputs described below. Logic train 402 generates the gateS2 signal for driving middle switch S2 from various inputs described below. Logic train 403 generates the gateS1 signal for driving top switch S1 from various inputs described below.

As noted above, logic train 403 generates the gateS1 signal for driving high side switch S1 from two inputs, the gateS3 signal (produced by logic train 401) and the FORCE_P signal, received from other control circuitry. More specifically, the two input signals of logic train 403 are provided as an input to OR gate 473. If either signal is a logic high, then a logic high will be provided to rising edge delay 474. The output of rising edge delay 474 is provided to a first input of AND gate 475. An inverting input of AND gate 475 receives the FORCE_F signal (discussed in greater detail below). The output of AND gate 475 is the gateS1 signal. Thus, gateS1 will be high, corresponding to a turn on of top switch S1, shortly after either gateS3 (corresponding to the bottom switch of the cell) or FORCE_P (corresponding to the cell being forced to P mode) transitions high and when the cell is not being forced into F mode (discussed below). Thus, top switch S1 is turned on with switch S3 or by an external FORCE_P signal.

Logic train 402 generates the gateS2 signal for driving middle switch S2 from several inputs including the gateS3 signal (provided to optional inverter/NOT gate 461b and an inverting input of AND gate 467b), the voltages at the CAP_N and CAP_OUT terminals (provided to comparator 465b), the gateS1 drive signal (also provided to an inverting input of AND gate 467b). Additional inputs to logic train 402 include the S2OFF signal received from an adjacent CDSC cell, the FORCE_F signal, and the FORCE_P signal, each described in greater detail below. These three input signals are provided to OR gate 476b, the output of which is provided to an inverting input of AND gate 467b and the reset ("R") input of flipflop 468b.

Operation of logic train 402 is as follows. The gateS3 drive signal can be provided to an input of optional logical inverter/NOT gate 461b. The inverted gate drive signal can then be provided to optional rising edge delay block 462b, which provides a maximum turn-on delay. The output of delay circuit 462b passes to an optional one shot 963b, that provides a logic high pulse when triggered that is delivered to OR gate 466b. The other input of OR gate 466b is the output of a comparator 465b that compares the voltage at the CAP_N terminal to the CAP_OUT terminal to detect body diode conduction of switch S2. Thus, OR gate 466b will receive a positive input and therefore produce a positive output when either the body diode of middle switch S2 is conducting or after a maximum delay (block 462b) following turn off bottom switch S3 has turned off. If the optional components 461b-463b are omitted, the S2 body diode conduction (465b) is the only input source to the OR gate 466b, and thus allows unlimited time delay which may happen during light load. When the optional components 461b-463b are omitted, the OR gate 466b may also be omitted, and the output of comparator 465b can be provided directly to a non-inverting input of AND gate 467b. Otherwise, the output signal of OR gate 466b may be thought of as a "raw" turn-on signal for switch S2, meaning that it will cause the switch S2 drive signal gateS2 to transition high unless inhibited by the remaining circuitry of logic train 402 described below.

The remainder of logic train 402 implements circuitry responsive to conditions that should prevent the turn on of switch S2. As described in greater detail below, the turn on of switch S2 corresponds to exiting P mode and entering S mode, while the turn off of switch S2 corresponds to exiting S mode and entering P mode. In any case, the above-described "raw" turn on signal for switch S2 that is the output of OR gate 466b is provided to a non-inverting input of AND gate 467b. The remaining three inputs of AND gate 467b are inverting and receive the gateS1 and gateS3 drive signals and the output of OR gate 476b. The output of OR gate 476b will be high if any of the S2OFF, FORCE_F, or FORCE_P signals are high. Thus, if S2 is forced off, F mode (described below) is forced, or P mode (described below) is forced, turn on of switch S2 will be inhibited. Thus, the output of AND gate 467b will be high if the "raw" switch S2 turn on signal is high, both the gateS1 and gateS3 drive signals for switches S1 and S2, respectively, are both low, and switch S2 is not being forced off by the S2OFF signal, the FORCE_F signal, or the FORCE_P signal. In other words, switch S2 cannot be turned on if either switch S1 or switch S3 is already on, or if it is otherwise being forced off. The output of AND gate 467b is provided to the set ("S") input of S-R flipflop 468b. The reset ("R") input of flipflop 468b receives the output of OR gate 476b, corresponding to any of the forcing signals discussed above. Finally, the output ("Q") of flipflop 468b is provided to a first input of AND gate 469b, which receives at its other (inverting) input the FORCE_P signal from an adjacent CDSC cell as described in greater detail below. The output of AND gate 469b is provided to a non-inverting input of AND gate 470b, with the FORCE_F signal provided to an inverting input of AND gate 470b. The gateS2 drive signal for middle switch S2 is the output of AND gate 470b. Thus, if the output of AND gate 470b will be high if triggered by flipflop 468b and not inhibited by either of the FORCE_F or FORCE_P signals.

To summarize the above, switch S2 will be turned on by a logical high gateS2 drive signal that is generated in response to either body diode conduction by switch S2 (i.e., a ZVS condition) or after a predetermined delay from the turn off of switch S3, provided that neither switch S1 nor S2 is on and there has been no S2OFF signal, FORCE_P, or FORCE_F signal received.

Logic train 401 generates the gateS3 signal for driving bottom switch S3 as well as the P_DONE signal that can be passed to other CDSC cells as described below. Logic train 401 generates the gateS3 signal for driving bottom switch S3 from several inputs including the gateS2 signal (provided to inverter/NOT gate 461a and an inverting input of AND gate 467a) and the voltage at the CAP_N terminal and a reference voltage for switch S3 body diode conduction (provided to comparator 465a). Additional inputs to logic train 401 include the S2OFF and S3OFF signals as described in greater detail below and the FORCE_P and FORCE_F signals also described below. The S3OFF, FORCE_P, and FORCE_F signals are provided to the inputs of OR gate 476a, with the FORCE_P signal also being provided to OR gate 469a, the FORCE_F signal also being provided to AND gate 470a, and the S2OFF signal also being provided to AND gate 471a.

Operation of logic train 401 is as follows. The gateS2 drive signal is provided to an input of optional logical inverter/NOT gate 461a. The inverted gate drive signal is thus provided to asynchronous delay block 462a, which provides a maximum turn-on delay. The output of delay circuit 462a passes to an optional one shot 463a, that, when triggered, provides a logic high pulse to OR gate 466a. Each of components 461a-463a is optional similarly to elements 461b-463b discussed above. The other input of OR gate 466a is the output of a comparator 465a that compares the voltage at the CAP_N terminal to a reference voltage 464a to detect body diode conduction of switch S3. Thus, OR gate 466a will receive a positive input and therefore produce a positive output when either the body diode of bottom switch S3 is conducting or after a maximum delay (block 462a) after middle switch S2 has turned off. The output signal of OR gate 466a may thus be thought of as a "raw" turn-on signal for switch S3, meaning that it will cause the switch S3 drive signal gateS3 to transition high unless inhibited by the remaining circuitry of logic train 401 described below. Otherwise, if optional components 461a-463a are omitted, then OR gate 466a can also be omitted, and the comparator output corresponding to switch S3 body diode conduction may be thought of as the raw turn-on signal for switch S3, which can be inhibited by the remaining circuitry of logic train 401.

The above-described "raw" turn on signal for switch S3 is provided to a non-inverting input of AND gate 467a. The remaining two inputs of AND gate 467a are inverting and receive the gateS2 drive signal and the output of OR gate 476a. OR gate 476a receives three inputs, the S3OFF, FORCE_F, and FORCE_P signals. The output of OR gate 476a will be high if any of the S3OFF, FORCE_F, or FORCE_P signals are high. Thus, if S3 is forced off, F mode (described below) is forced, or P mode (described below) is forced, turn on of switch S3 will be inhibited. Thus, the output of AND gate 467a will be high if the "raw" switch S3 turn on signal is high and each of the above-described forcing signals is also low. The output of AND gate 467a is provided to the set ("S") input of S-R flipflop 468a. The reset ("R") input of flipflop 468a also receives the output of OR gate 476a. Thus, switch S3 will be turned off if one of the above-described forcing signals is received. The output ("Q") of flipflop 468a is provided to a first input of OR gate 469a, which receives at its other (inverting) input the FORCE_P signal. The output of OR gate 469a is provided to an input of each of AND gates 470a and 471a. AND gate 470a receives at its other (inverting) input the FORCE_F signal, and AND gate 471a receives at its other (non-inverting) input the S2OFF signal. The output of AND gate 470a is the gateS3 drive signal for bottom switch S3. The output of AND gate 471a is the P_DONE signal output from the CDSC cell as described in greater detail below. Thus, the output of AND gate 470a will be high if triggered by flipflop 468a or if the cell is being forced into P mode. Likewise, the output of AND gate 471a will be high if triggered by flipflop 468a or if the cell is being forced into P mode and the S2OFF signal is received.

To summarize the above, switch S3 will be turned on by a logical high gateS3 drive signal that is generated in response to either body diode conduction by switch S3 (i.e., a ZVS condition) or (optionally) after a predetermined delay from the turn off of switch S2, provided that switch S2 is not on and switch S3 is not being forced off. Alternatively, switch S3 will be turned on if the cell is being forced into P mode by a FORCE_P signal.

Figure 5:
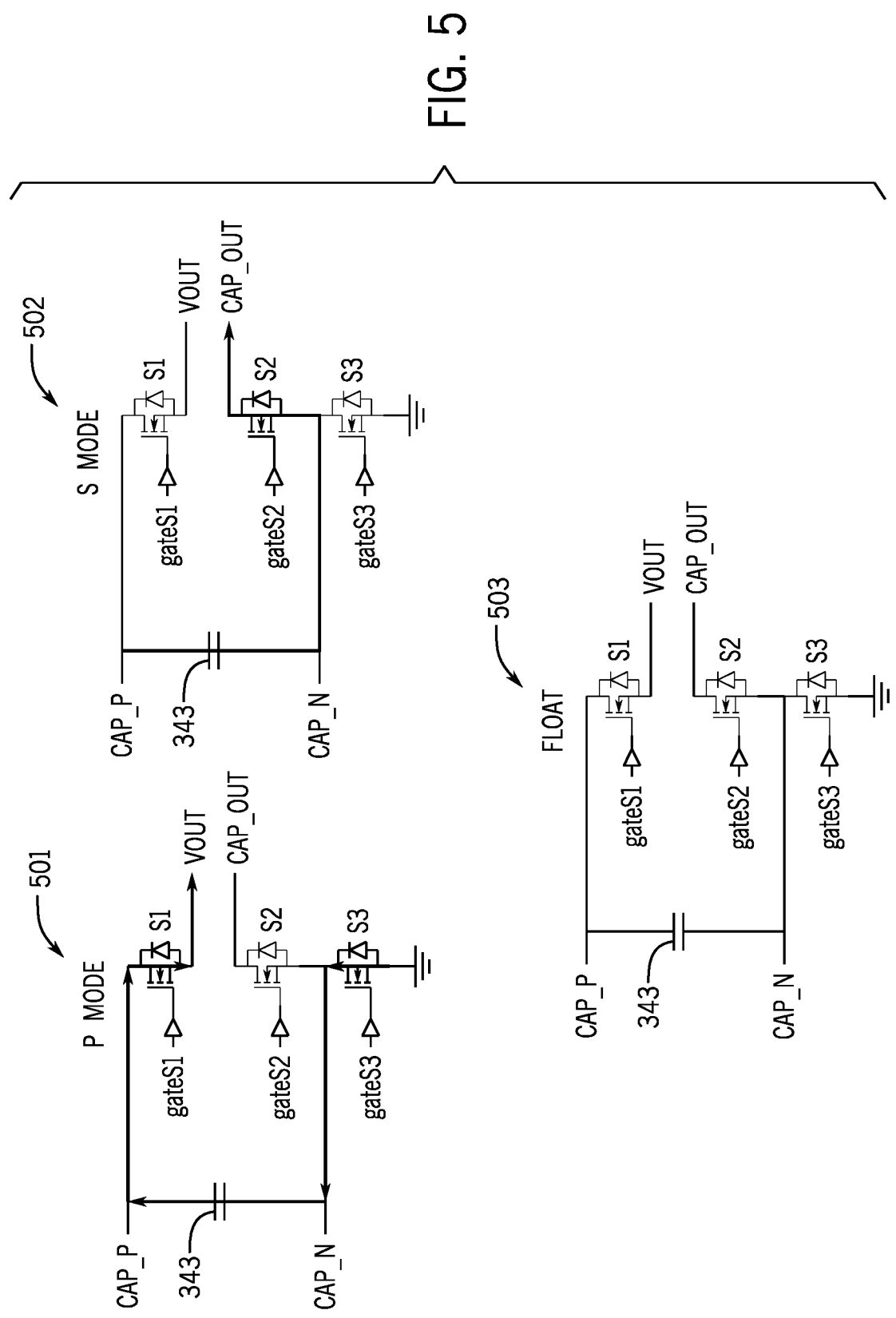
FIG. 5 illustrates three modes of a CDSC cell.

FIG. 5 illustrates three modes of a CDSC cell, which are P (parallel) mode (depicted in schematic 501), S (series) mode (depicted in schematic 502), or F (float) mode (depicted in schematic 503). In P mode, switches S1 and S3 are on, and switch S2 is off. Thus, the flying capacitor 343 is in parallel with VOUT. Current can flow from the capacitor to VOUT. In S mode, switches S1 and S3 are off, and switch S2 is on. Thus, the flying capacitor 343 is in series with the downstream circuit connected to the CAP_OUT node. In F mode, all 3 switches (S1, S2, S3) are turned off, and the flying capacitor 343 is floating.

As described in greater detail below, transitions between S mode and P mode for a cascade of CDSC cells can be used to provide a desired output voltage for a CDSC circuit. Such transitions can either be a P mode to S mode transition (described below with reference to Table 1) or an S mode to P mode transition (described below with reference to Table 2).

With reference to Table 1, initially the cell is in P mode (schematic 501). A coil current sensor (outside CDSC cells)

can detect that the coil current direction has reversed, and subsequently sends a pulse to the S3OFF input pin (FIGS. 3 & 4) of the CDSC cell. As a result, S1 and S3 immediately turn off, and the cell enters F mode (schematic 503). The coil current flows into the S2/S3 switch node. After a short time interval, the coil current causes the body diode of switch S2 to conduct creating a zero-voltage switching (ZVS) condition for switch S2. As a result, S2 turns on with ZVS, and the cell enters S mode. If the coil current is too small to complete ZVS turn on of switch S2, following switch S3 turn-off by a pre-programmed delay time, the switch S2 rising edge timer expiration will force turn-on S2. The control logic (described above with respect to FIG. 4) can detect the lack of ZVS and send an output pulse to an nZVS_S2 pin (not shown, but which can be used by the control circuitry to adapt operation as required).

Figure 6:
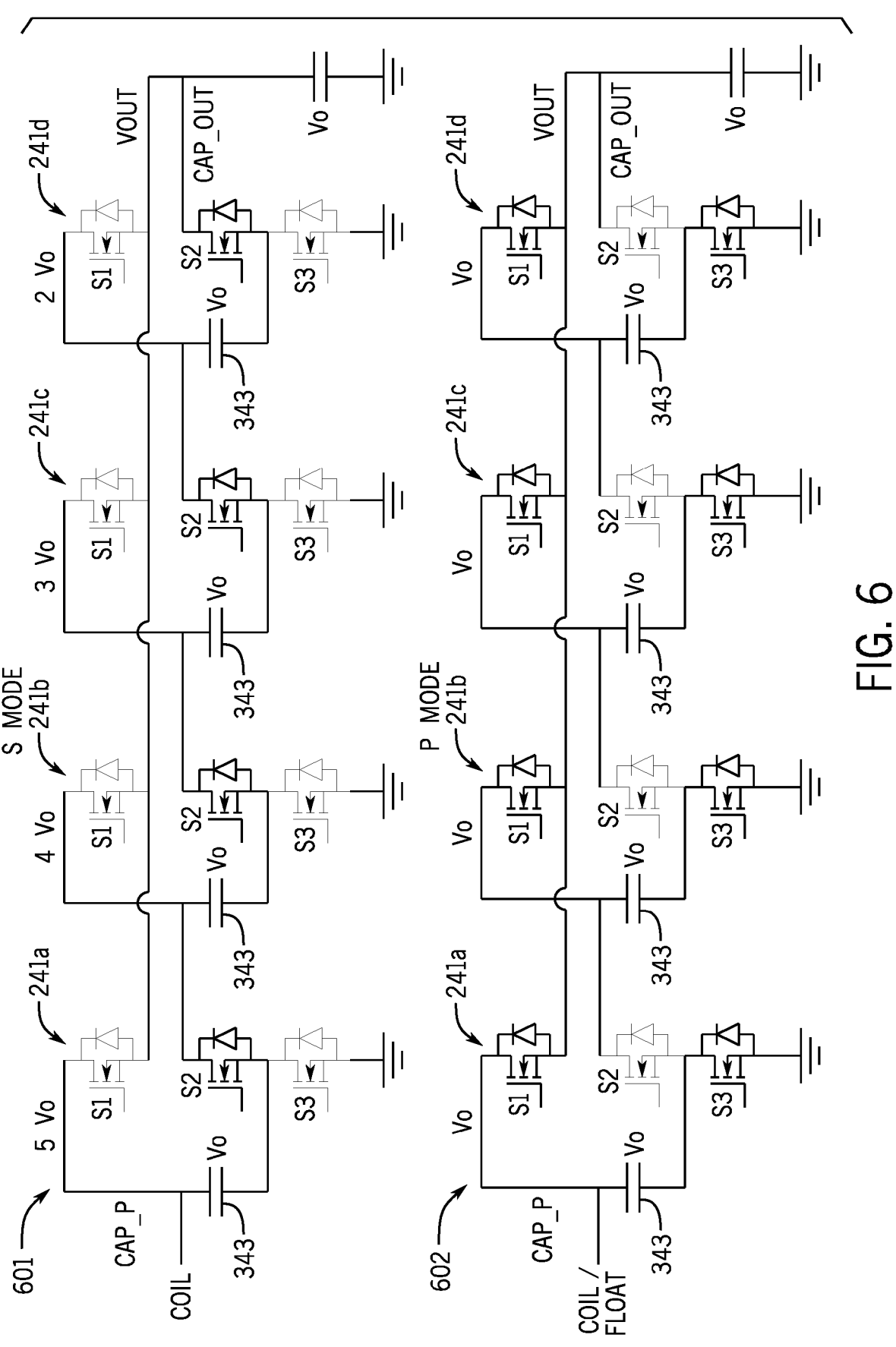
FIG. 6 illustrates cascades of CDSC cells.

As suggested above with respect to FIG. 2, any desired number of CDSC cells can be cascaded to achieve a desired voltage (or current) conversion ratio. FIG. 6 illustrates cascade of four CDSC cells 241a-241b to form a 5:1 conversion ratio CDSC chain, in which the voltage is stepped down by a factor of 5:1 and the current is stepped up by a factor of 5:1. In general, an N: 1 conversion ratio can be achieved by providing a cascade of N-1 CDSC cells. In any case, the first cell 241a (from the input side, i.e., left in FIG. 6) also described herein as the most upstream cell, receives input current on its CAP_P node (identified in FIG. 3). Each subsequent downstream cell 241b/241c (moving towards the output, i.e., right in FIG. 6) connects its CAP_P node to its CAP_OUT node (identified in FIG. 3). The last/most downstream cell 241d (i.e., farthest right in FIG. 6) connects its CAP_OUT node to the output bus Vo (illus-

TABLE 1

| Sequence | Event | Action | Previous State | New State |
|---|---|---|---|---|
| 1 | Coil current flows into S2/S3 switch node. | Send a pulse on S3OFF pin. S3 and S1 turn off. | P mode | F mode |
| 2a | Coil current conducts S2 body diode. | Turn on S2. | F mode | S mode |
| 2b | S2 rise edge timer expires. | Force turn-on S2. Send a pulse on nZVS_S2. | F mode | S mode |

With reference to Table 2, initially the cell is in S mode (schematic 502). A coil current sensor (outside CDSC cells) detects that the coil current direction has reversed, and subsequently sends a pulse to S2OFF input pin (FIG. 3 and FIG. 4). As a result, switch S2 immediately turns off, and the cell enters F mode (schematic 503). The coil current then flows out of the S2/S3 switch node. After a short time interval, the coil current causes the body diode of switch S3 to begin conducting, creating a zero-voltage switching (ZVS) condition for switch S3. As a result, S3 turns on with ZVS. At the same time or shortly after, S1 turns on with a zero-current switching (ZCS) condition. In at least some applications, the switch S1 drain-to-source voltage at the turn-on moment can be designed to be less than a diode drop, so the switching loss can be even less than a true ZVS condition. After turning on S1, the cell enters P mode (schematic 502), and sends an output pulse to the P_DONE pin (FIG. 2 and FIG. 3). If the coil current is too small to complete ZVS turn on of switch S3, following switch S2 turn-off by a pre-programmed delay time, the switch S3 rising edge timer expiration can force turn-on of switches S3 and S1. The control logic can detect the lack of ZVS and send an output pulse to the nZVS_S3 pin (not shown, but which can be used by the control circuitry to adapt operation as required).

trated in FIG. 6 as connected to an output capacitor, but which could connect directly to a battery (as illustrated in FIG. 2) or other loads as desired for the particular embodiment. Additionally, all cells 241a-241d connect their VOUT nodes to the output bus.

During operation, all flying capacitors 343 have voltages that are approximately equal to the output voltage Vo. More specifically, each CDSC cell 241a-241d may be thought of as a charge pump, with the corresponding flying capacitor 343 being alternately charged and discharged, with its average voltage being equal to the output voltage Vo. As a result, in the S mode 601, all of the flying capacitors 343 are effectively connected in series, and their output voltages are summed and connected in series with the output capacitor (also having a voltage approximately equal to the output voltage Vo). Thus, the voltage on the output bus is 5×Vo. As illustrated in S mode cascade 601, the upper rail voltage of each cell increases from downstream to upstream, with the most downstream cell 241d having an upper rail voltage of 2×Vo, cell 241c having an upper rail voltage of 3×Vo, etc. The coil connected to the input of the CDSC cascade will see a voltage of 5×Vo (for the illustrated example). In the P mode 602, each flying capacitor 343 is connected in parallel with the output capacitor, thus having equal voltages. As a result, the coil connected to the input will see a voltage of

TABLE 2

| Sequence | Event | Action | Previous State | New State |
|---|---|---|---|---|
| 1 | Coil current flows out of S2/S3 switch node. | Send a pulse on S2OFF pin. S2 turns off. | S mode | F mode |
| 2a | Coil current conducts S3 body diode. | Turn on S3 then S1. Send a pulse on P_DONE. | F mode | P mode |
| 2b | A timer from S2 falling edge expires. | Force turn on S3 then S1. Send a pulse on P_DONE and nZVS_S3, respectively. | F mode | P mode |

Vo when in the wired charging configuration. Alternatively, in the wireless charging configuration, the input coil (wireless power receive coil 222) can be disconnected from the CDSC cascade by the rectifier.

In a cascaded CDSC chain, the mode transition behavior of each cell can be as described above with respect to FIG. 5, Table 1, and Table 2. Each cell can act to change states upon receiving S2OFF and S3OFF signals on its interface (as illustrated in FIGS. 3 and 4). Described below are exemplary signal routing and arrangements for various transitions and configurations.

Figure 7:
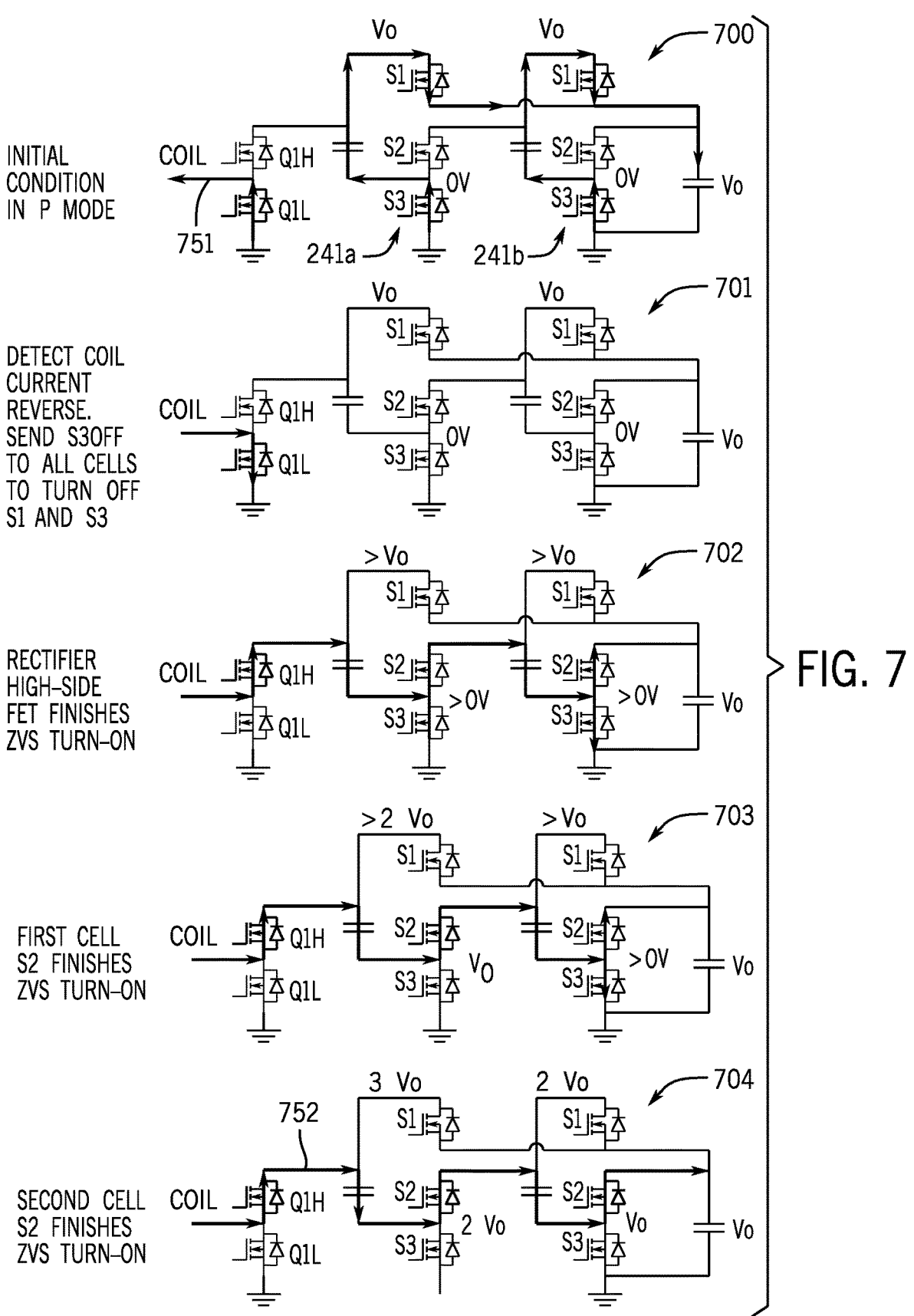
FIG. 7 illustrates a P mode to S mode transition for a cascade of two CDSC cells.

FIG. 7 illustrates a P mode to S mode transition for a cascade of two CDSC cells 241a, 241b as a series of schematics 700-704. The basic principle illustrated applies equally to longer cascades. The initial condition—P mode— is illustrated in schematic 700, with the final condition—S mode—depicted in schematic 704, and intermediate states being depicted in schematics 701-703. When coil current starts to flow into a CDSC chain, the same S3OFF signal pulse can be applied to all the cascaded cells; causing the cells complete the P-to-S mode transitions in short sequence. Depending on their timings these switching events can be made in a ZVS condition. Initially, in switching state 700, the CDSC cascade is in P mode, as described above. Coil current 751 flows from ground to the coil via the low-side switch Q1L. Switching event 1, producing switching state 701, occurs when a coil current zero crossing (current reversal) is detected at the low side switch Q1L of the rectifier. At this time, top switches S1 and bottom switches S3 of each CDSC cell in the branch (i.e., 242a/242b) are turned off.

Switching event 2 is then the turn-off of the rectifier low side switch Q1L, causing the condition illustrated in schematic 702. This causes the coil current to begin flowing through the intrinsic body diode of the rectifier high side switch Q1H. When the rectifier high side switch's body diode conducts, the switch can be turned on in a zero-voltage switching ("ZVS") condition. This allows the coil current to flow through the first CDSC cell's flying capacitor into the switch node (i.e., the connection of middle switch S2 and bottom switch S3) of first CDSC cell 241a. A portion of the switch node current can flow through the middle switch's junction capacitance and subsequently flows into the second cell's switch node (via the second cell's flying capacitor).

Then, switching event 3 occurs, depicted in schematic 703, when the middle switch S2 of the first CDSC cell 241a starts to conduct through its body diode and/or bypass diode. This allows turn on of the first cell's middle switch S2 in a ZVS condition. The two flying capacitors of the first and second CDSC cells are now in series, so the rectifier output voltage is greater than 2×Vout. More specifically, if just for the first cell's middle switch turning on, the rectifier voltage would be 2×Vout. The rectifier voltage can actually be greater than 2×Vout because the second cell's junction capacitance may already be partially charged by this point, as explained in the preceding paragraph. Additionally, all coil current flows into the second cell's switch node.

Then, switching event 4 occurs, depicted in schematic 704, which is the series mode. The second CDSC cell's middle switch body diode starts to conduct. This allows turn on the middle switch in a ZVS condition. The two series flying capacitors are now in series with Vout, so the rectifier output voltage is 3×Vout. All coil current 752 flows through the flying capacitors and into the output capacitor.

There are two options for the S mode to P mode transition. The first option, a sequential transition, is described below with respect to FIGS. 8 and 9. The second option, a simultaneous transition, is described below with respect to FIGS. 10 and 11.

Figure 8:
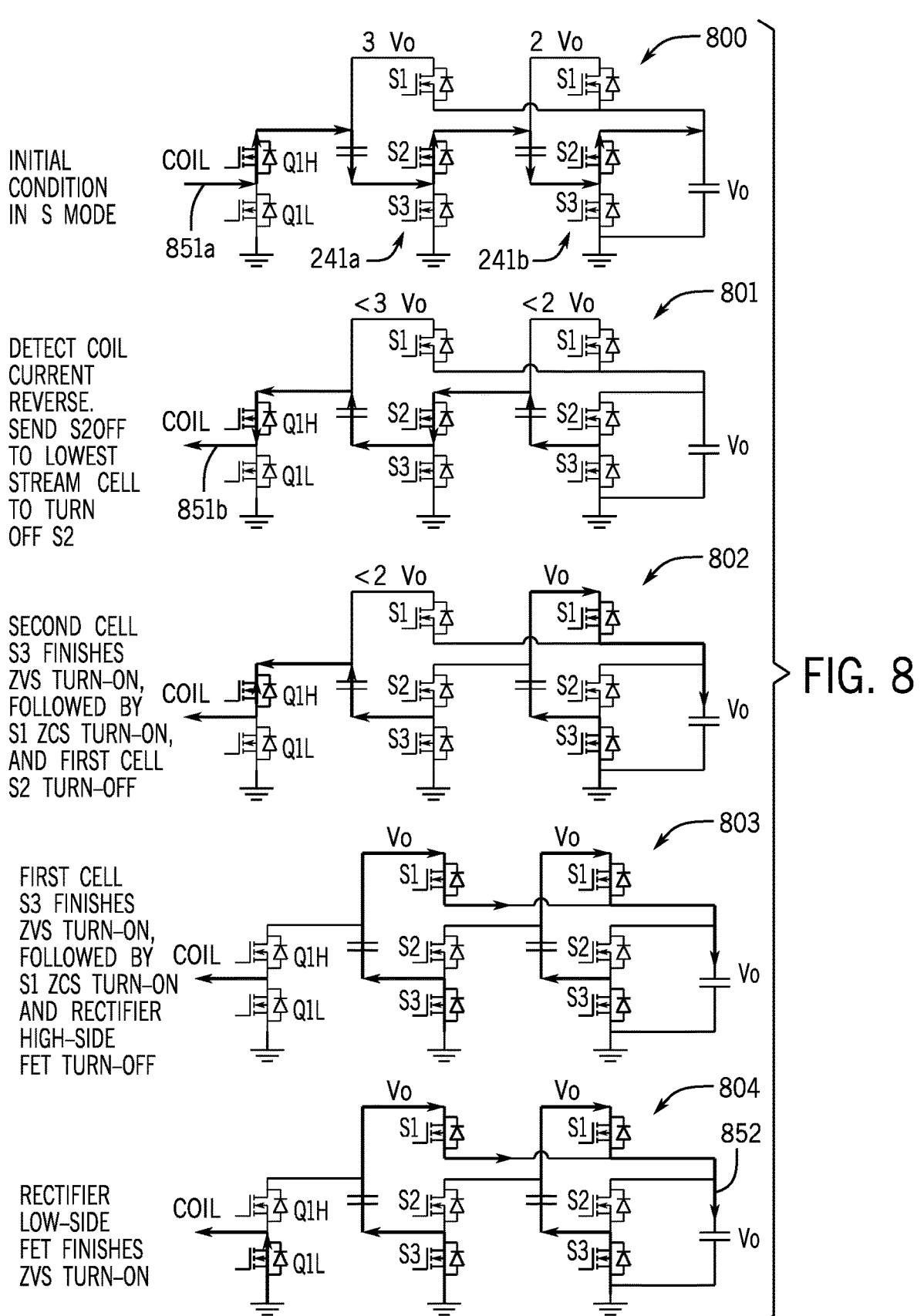
FIG. 8 illustrates a sequential S mode to P mode transition for a cascade of two CDSC cells.

FIG. 8 illustrates a sequential S mode to P mode transition for a cascade of two CDSC cells 241a, 241b as a sequence of schematics 800-804. The same principles apply to longer cascades. For the sequential transition, when coil current starts to flow out of a CDSC cascade, the S2OFF signal pulse can be sent to the most downstream cascaded cell (241b, i.e., the one closest to output capacitor) to turn off S2. After its S3 turns on (with ZVS or by timer expiration), the cell sends its P_DONE signal to the S2OFF node of the next upstream cell (241a).

With reference to FIG. 8, the cascade begins in S mode as depicted by schematic 800. Switching event 1 occurs when a coil current zero crossing (i.e., current reversal) 851a/851b is detected, e.g., at rectifier high side switch Q1H. As a result, the middle switch S2 of the most downstream CDSC cell 241b can be turned off. This produces the state depicted in schematic 801. As a result, the coil current discharges switch node of CDSC cell 241b.

Switching event 2 occurs when bottom switch S3 of the last CDSC cell 241b turns on in a ZVS condition, as illustrated in schematic 802. Shortly thereafter, high side switch S1 of CDSC cell 241b turns on in a zero current switching (ZCS) condition. Also, at about this same time, i.e., shortly after bottom switch S3 of cell 241b turns on, middle switch S2 of the next upstream CDSC cell, i.e., first CDSC cell 241a turns off. As a result, coil current discharges the switch node of CDSC cell 241a. If there were additional CDSC cells in the cascade, then operation would proceed in this manner, with the low side switch of a downstream CDSC cell turning on at about the same time that the middle switch of the next upstream CDSC cell turns off, continuing until reaching the most upstream CDSC cell.

Switching event 3 occurs after the bottom switch of the upstream CDSC cell turns on with a ZVS condition followed by the top switch of the upstream CDSC cell 241a turning on in a ZCS condition. This switching event 3 is the turn off of the high side rectifier switch Q1H, producing the state depicted by schematic 803. The coil current then discharges the switch node (i.e., the connection of its high side and low side switches) of the rectifier. Finally, switching event 4 occurs when the low side switch Q1L of the rectifier turns on in a ZVS condition, producing the state depicted in schematic 804, i.e., P mode, resulting in P mode current 852.

Figure 9:
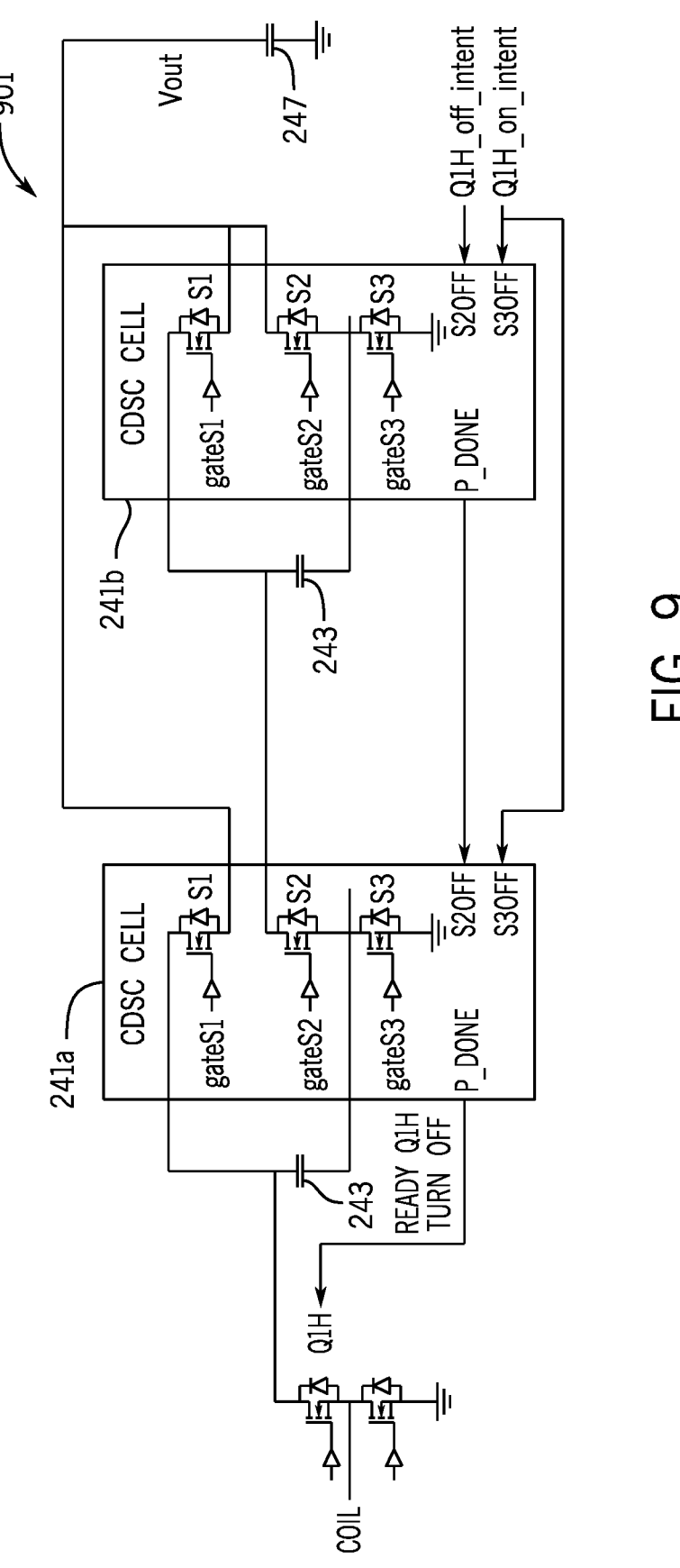
FIG. 9 illustrates control signal routing for the S mode to P mode transition of FIG. 8.

FIG. 9 illustrates control signal routing for the sequential S mode to P mode transition of FIG. 8. One aspect of the controller configuration of FIG. 9 is the connection of the S2OFF input of upstream cell 241a to the P_DONE output of downstream CDSC cell 241b. The same principle (connecting the P_DONE output of a downstream cell to the S2OFF input of an immediately upstream CDSC cell) applies equally to cascades of more CDSC cells. FIG. 9 further illustrates the external control signals for CDSC cell 241b including the Q1H_off_intent signal coupled to the S2OFF input, and the Q1H_on_intent signal coupled to the S3OFF input. Similarly, the external control signals for CDSC cell 241a include the Q1H_on_intent signal coupled to the S3OFF input (as well as the interconnection described above). The P_DONE output of CDSC cell 241a can be used to trigger the turn off of high side rectifier switch Q1H.

Figure 10:
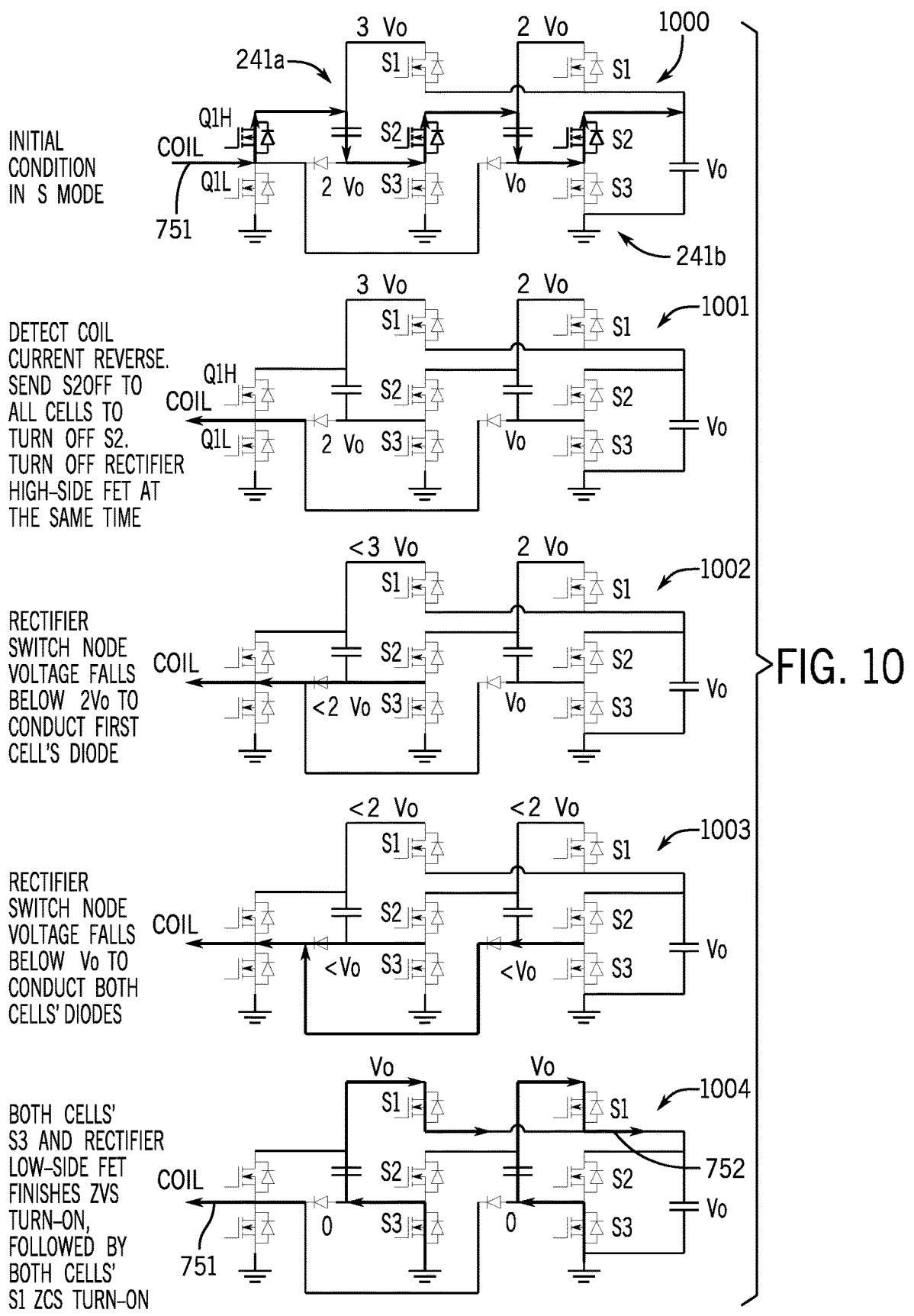
FIG. 10 illustrates a simultaneous S mode to P mode transition for a cascade of two CDSC cells.

FIG. 10 illustrates a simultaneous S mode to P mode transition for a cascade of two CDSC cells 241a, 241b as a sequence of schematics 1000-1004. The same principles apply to longer cascades. For the simultaneous transition, when coil current starts to flow out of a CDSC chain, the same S2OFF signal pulse is applied to all the cascaded cells to turn off S2 in all cells simultaneously. Then the cells complete S3 ZVS turn-on by external diode paths to the rectifier switch node.

With reference to FIG. 10, the cascade is initially in S mode as depicted by schematic 1000. Switching event 1 occurs when a coil current zero crossing (current reversal) is detected, e.g., at the high side switch QH1 of the rectifier. This event can trigger the simultaneous turn off the middle switches S2 of all CDSC cells, resulting in the switching state depicted in schematic 1001. Coil current discharges the switch node of the rectifier (i.e., the connection of the high side rectifier switch Q1H and low side switch Q1L).

Switching event 2 is depicted in schematic 1002 and occurs when the voltage at the switch of the rectifier node falls below 2×Vout. This allows an auxiliary diode coupled between the switch node of CDSC cell 241a and the switch node of the rectifier to begin conducting, thereby discharging the switch node of the first CDSC cell 241a. Switching event 3 occurs when the voltage at the switch node of the rectifier falls below Vout. This allows an auxiliary diode coupled between the switch node of CDSC cell 241b and the switch node of the rectifier to begin conducting, thereby discharging the switch node of the second CDSC cell 241b, as illustrated in schematic 1003. During this interval, both auxiliary diodes continue to discharge the respective CDSC cell switch nodes coupled to their anodes.

For a cascade with more CDSC cells, operation would be similar. Once the high switch of the rectifier is turned off, the coil current will decrease the voltage appearing at the switch node of the rectifier. As this voltage decreases, auxiliary diodes coupling the switch nodes of the CDSC cells to the switch node of the rectifier will begin to conduct in sequence. The sequence begins with the CDSC cell nearest the rectifier (e.g., 241a) and proceeds to the RDSC cell furthest from the rectifier (e.g., 241b in FIG. 10). Eventually, all RDSC cell switch nodes are completely discharged at the same time. This can trigger switching event 4.

Switching event 4 occurs when all CDSC cell switch nodes are discharged. At this time, the low side switch of the rectifier turns on in a ZVS condition, as indicated in schematic 1004. This corresponds to the completed transition to P mode, which exhibits P mode current 752 for the CDSC cascade. At the same time, bottom switches S3 of all CDSC cells (241a/241b) also turn on in a ZVS condition. Finally, the top switches S1 of all CDSC cells (241a/241b) turn on with very small drain to source voltage (Vds). This can be designed/configured to be less than about 0.6V, which is effectively a ZVS condition in practical applications.

Figure 11:
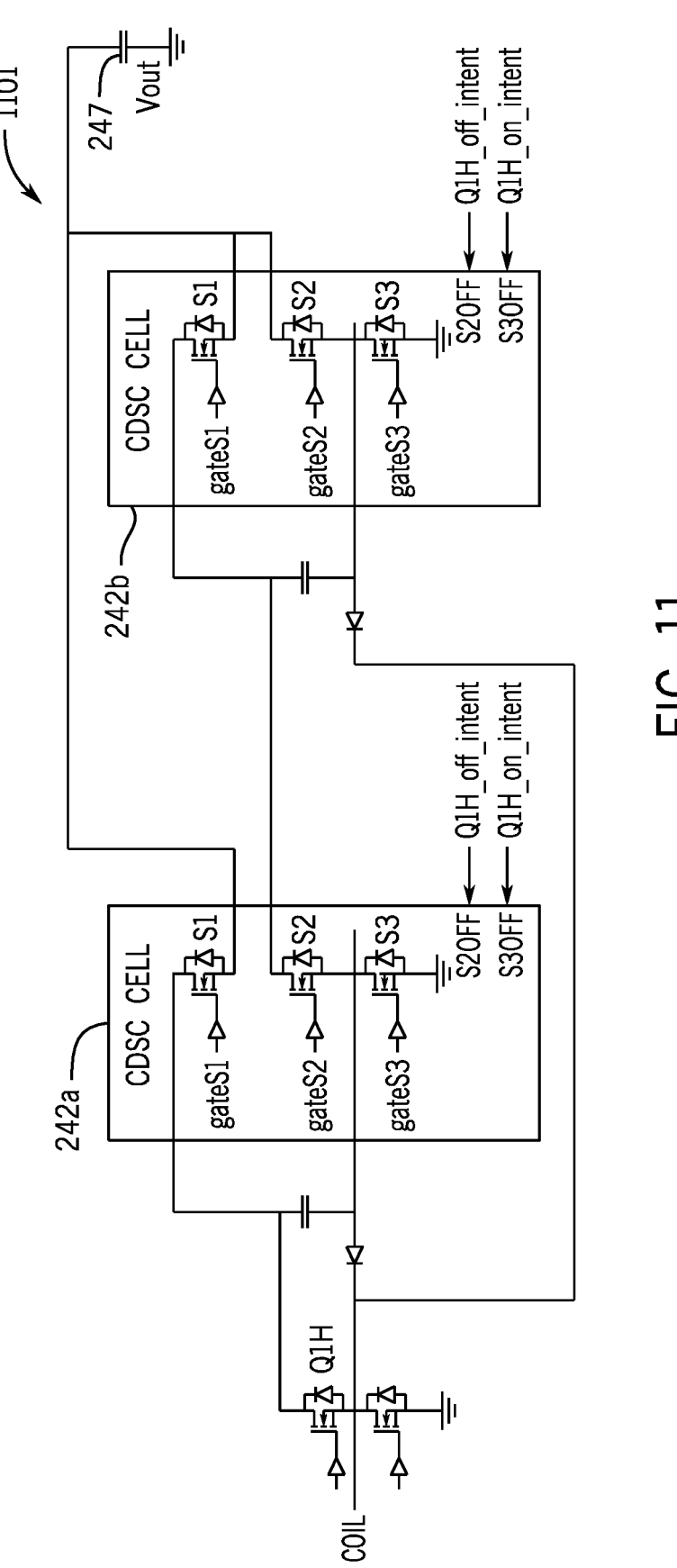
FIG. 11 illustrates control signal routing for the S mode to P mode transition of FIG. 10.

FIG. 11 illustrates control signal routing for the simultaneous S mode to P mode transition of FIG. 8. One aspect of the controller configuration of FIG. 11 that differs from above is the lack of connection of the P_DONE output of each CDSC cell to an adjacent cell. FIG. 11 further illustrates the external control signals for CDSC cells 242a and 242b including the Q1H_off_intent signal coupled to the S2OFF input of each CDSC cell and the Q1H_on_intent signal coupled to the S3OFF input.

Figure 12:
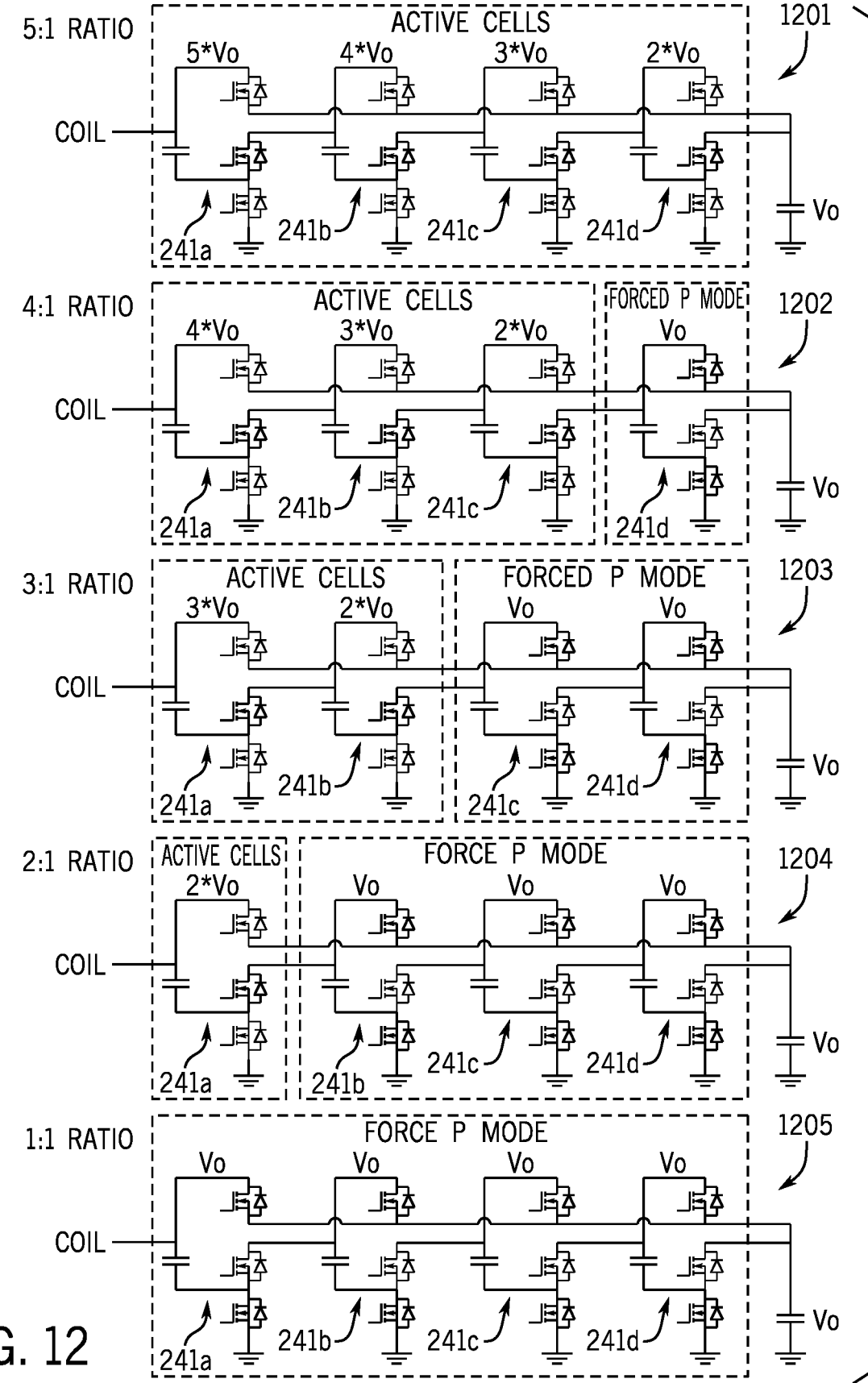
FIG. 12 illustrates a discrete conversion ratio change for a cascade of CDSC cells.

FIG. 12 illustrates a discrete conversion ratio change for a cascade of CDSC cells. The cascade of FIG. 12 incudes 4 CDSC cells 241a-241d, and thus can operate with a conversion ratio of 5:1 (schematic 1201), 4:1 (schematic 1202), 3:1 (schematic 1203), 2:1 (schematic 1204), or 1:1 (schematic 1205). As noted above, when N cascaded cells are activated, the conversion ratio is (N+1):1. The conversion ratio can be reduced by an integer value by forcing one or more cells into P-mode. A cell can be forced into P mode by asserting a logic TRUE signal at the FORCE_P input of the CDSC cell (FIG. 3). For the cascade to operate properly, all cells downstream of a P-mode cell must also be in P mode. Thus, in schematic 1201, a 5:1 conversion ratio is achieved by actively operating all cells. In schematic 1202, a 4:1 conversion ratio is achieved by placing downstream cell 241d in P mode, with upstream cells 241a-241c active. Similarly, in schematic 1203, a 3:1 conversion ratio is achieved by forcing downstream cells 241c and 241d into P mode, while upstream cells 241a and 241b are active. In schematic 1204, a 2:1 conversion ratio is achieved by forcing downstream cells 241b-241d into P mode while upstream cell 241a is active. Finally, a 1:1 conversion ratio is achieved in schematic 1205 by forcing all cells into P mode.

Figure 13:
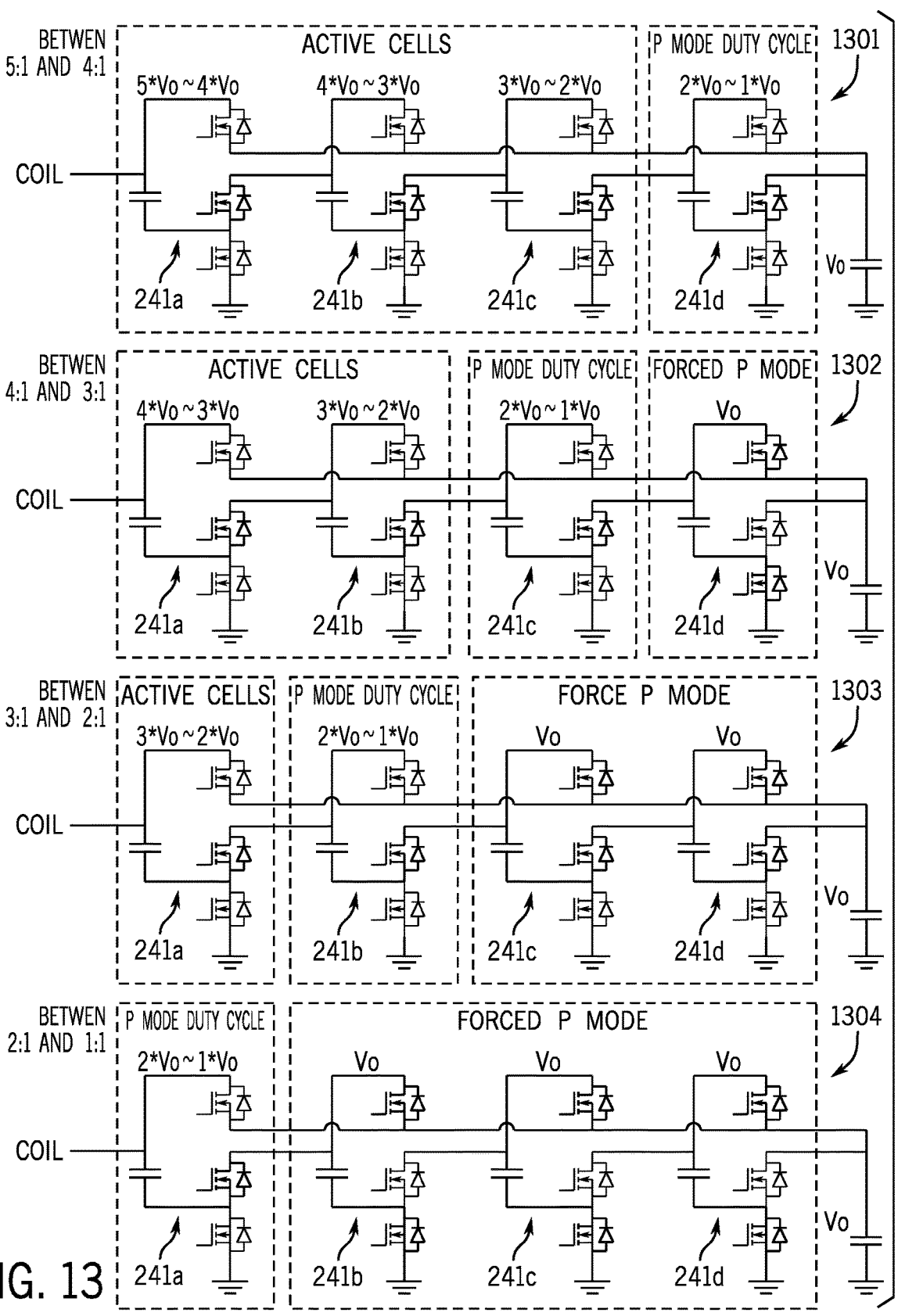
FIG. 13 illustrates continuous conversion ratio modulation for a cascade of CDSC cells.

In addition to the discrete conversion ratio selection/control described above, FIG. 13 illustrates continuous conversion ratio modulation for a cascade of CDSC cells. The cascade of FIG. 13 incudes 4 CDSC cells 241a-241d, and thus can operate with a conversion ratio between 5:1 and 4:1 (schematic 1301), between 4:1 and 3:1 (schematic 1302), between 3:1 and 2:1 (schematic 1303), or between 2:1 and 1:1 (schematic 1304). Between two adjacent integer conversion ratios, continuous ratio modulation can be achieved by forcing a cell in P mode for a fraction of each switching period, referred as duty cycle control in following sections. This cell will thus be active during the complementary (1-duty cycle) fraction of each switching period. This P-mode duty cycle modulates the equivalent CDSC input node voltage that is applied to the coil, and thus controls the current through the coil, and is applicable to both wired and inductive charging coils. As described above, the cells downstream of the duty cycle-controlled cell can be forced into P mode to ensure proper cascade operation. Thus, in schematic 1301, a conversion ratio between 5:1 and 4:1 can be achieved by actively operating cells 241a-241c, with cell 241d alternating between active control and P mode according to an appropriate duty cycle. In schematic 1302, a conversion ratio between 4:1 and 3:1 can be achieved by placing downstream cell 241d in P mode and controlling cell 241c with P mode duty cycle control, with upstream cells 241a-241b active. Similarly, in schematic 1303, a conversion ratio between 3:1 and 2:1 can be achieved by forcing downstream cells 241c and 241d into P mode and controlling cell 241b with P mode duty cycle control, while upstream cell 241a is active. Finally, in schematic 1304, a conversion ratio between 2:1 and 1:1 can be achieved by forcing downstream cells 241b-241d into P mode and controlling cell 241a with P mode duty cycle control. This duty cycle control scheme may be advantageously used with wireless charging applications.

Figure 14:
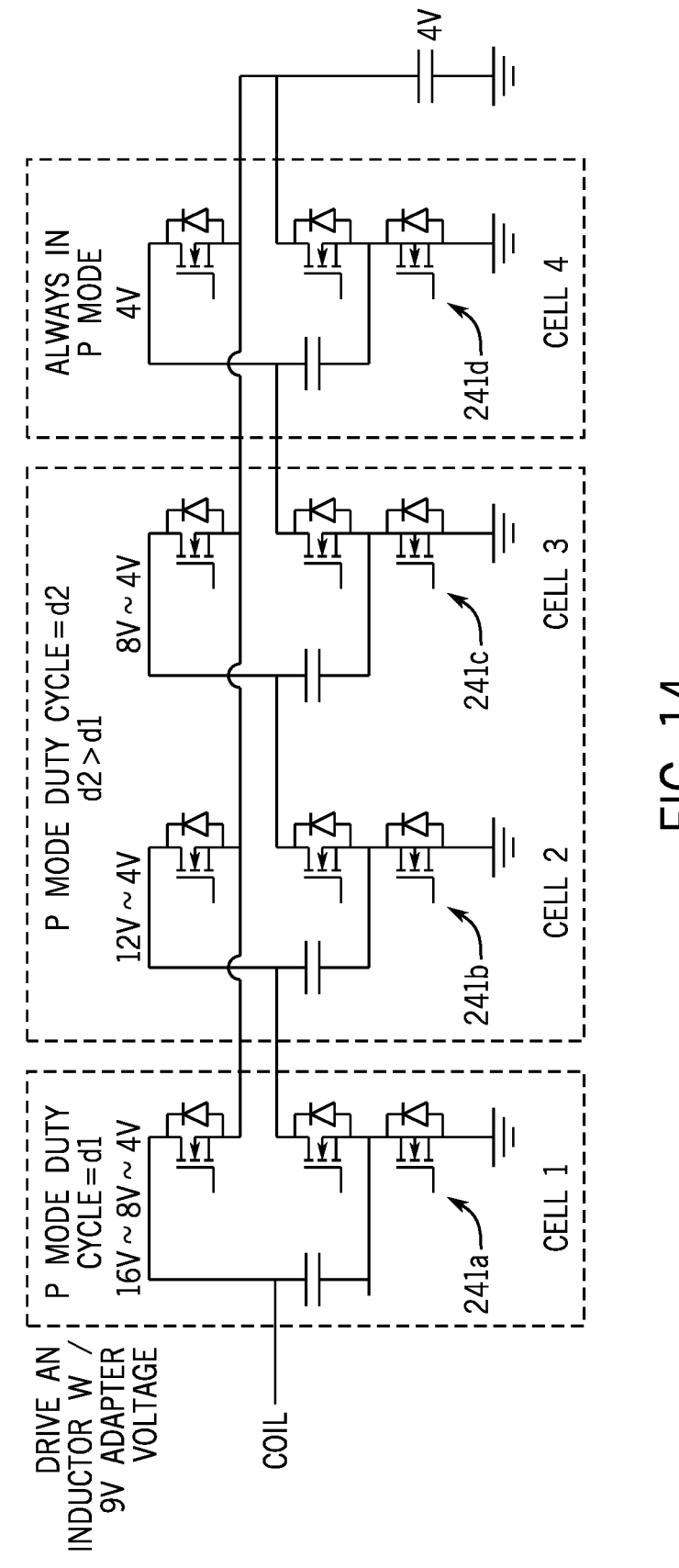
FIG. 14 illustrates a duty cycle control scheme for a cascade of CDSC cells.

FIG. 14 illustrates an alternative duty cycle control scheme 1401 for a cascade of CDSC cells 241a-241b. In this alternative scheme, duty cycle control is applied to one or more cells (e.g. 241b and 241c), and the cells can have different duty cycles. This scheme may be advantageously used with wired charging applications. Using the example voltages of FIG. 14, during a first interval of the switching period, all cells 241a-241d can be in P mode, and the cascade presents 4V to the coil. During a second interval of the switching period, beginning when duty cycle d1 expires, cell 1 transitions to S mode and the cascade presents 8V to interface the coil. Then, during a third interval of the switching period, duty cycle d2 expires. As a result, cells 241b and 241c are in S mode, and the cascade presents 16V to interface the inductor. Cell 241d operates in P mode for the entirety of the switching period.

For inductive charging applications, additional logic is illustrated and described below to show the coordination among current sensors, rectifiers, and two CDSC cascades. As described above, duty cycle control can be used for regulating output voltage and optionally for sending data packets (e.g., using amplitude-shift keying/ASK) to the power transmitter.

Figure 15A:
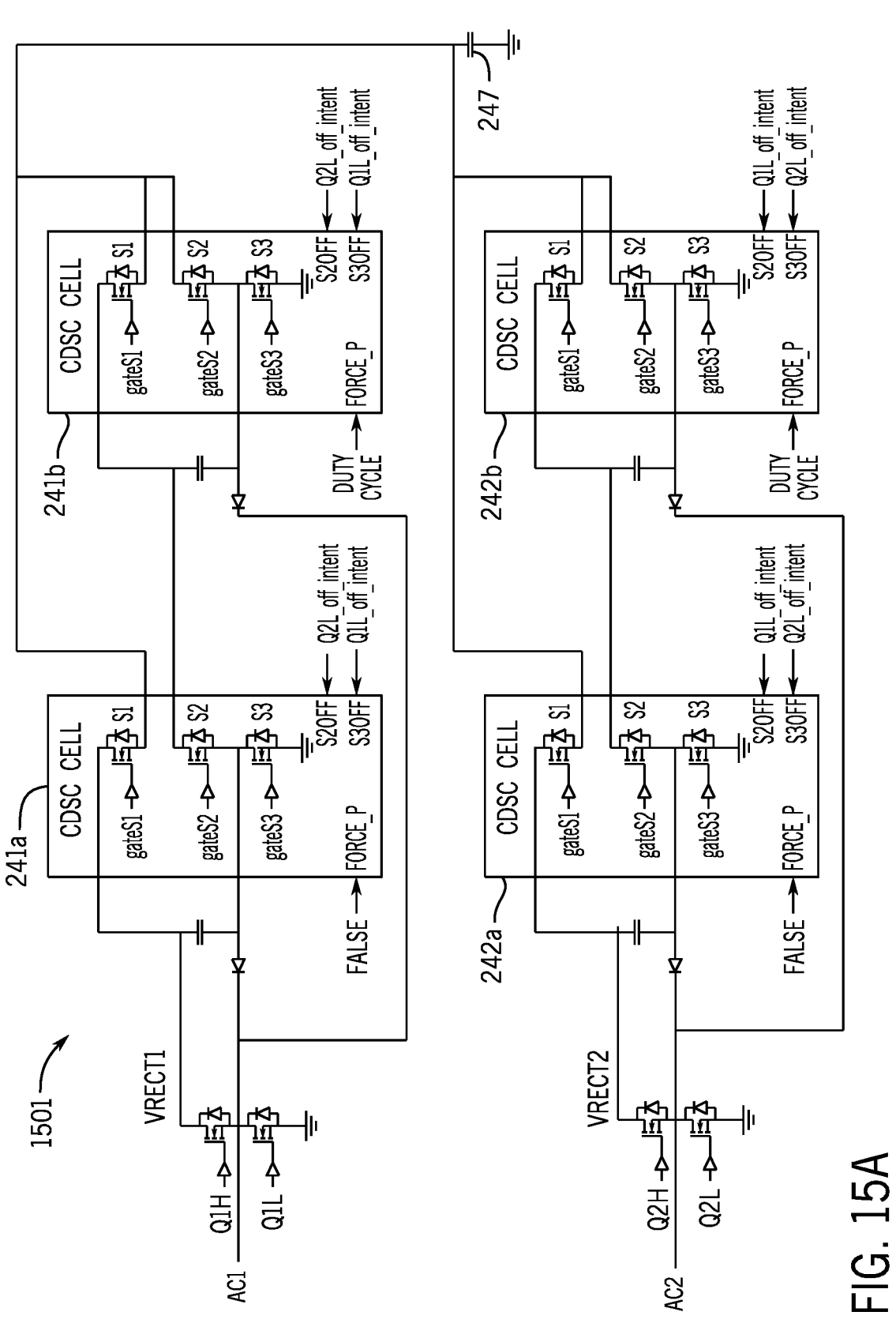
FIGS. 15A-B illustrate inter-cell control logic for a CDSC system employing a simultaneous S mode to P mode transition.
Figure 15B:
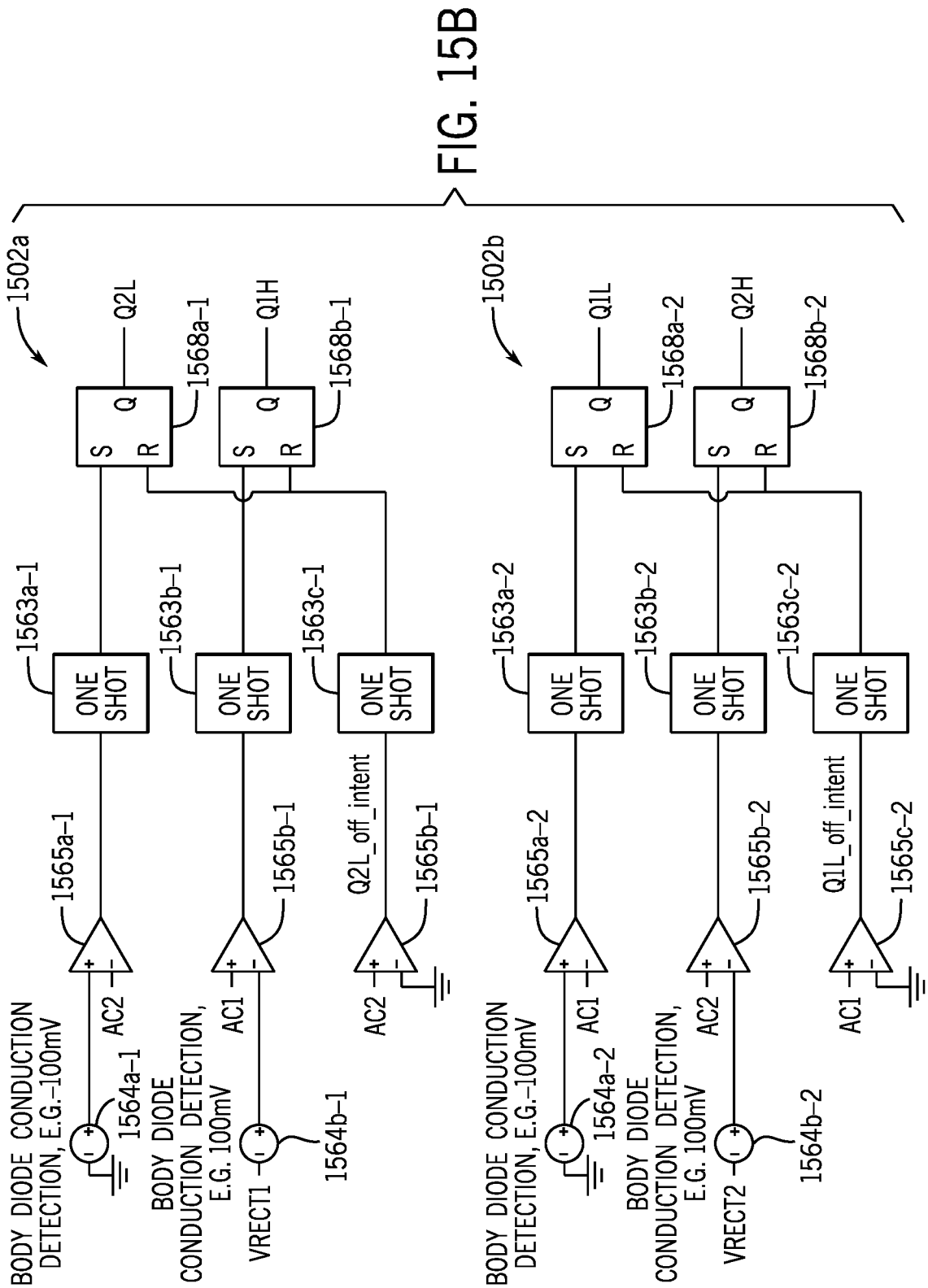

FIGS. 15A-B illustrate inter-cell control logic for a CDSC system employing a simultaneous S mode to P mode transition. More specifically, FIGS. 15A-15B illustrate inter-cell control logic 1501, 1502a, 1502b for a CDSC system employing an upper cascade of two cells 241a/241b and a lower cascade of two cells 242a/242b that employs a simultaneous S mode to P mode transition. A two-cell (i.e., 3:1 conversion ratio) is used as an example, although more cells can be cascaded as described above. Illustrated in FIG. 15A are the Q1L_off_intent and Q2L_off_intent signals corresponding to the respective rectifier switches. (Rectifier 1 connected to the AC1 node is made up of high side switch Q1H and low side switch Q1L, and Rectifier 2 connected to the AC2 node is made up of high side switch Q2H and low side switch Q2L.) FIG. 15A further illustrates the external control signals for the AC1 side CDSC cells 241a and 241b include the Q2L_off_intent signal coupled to the S2OFF input of each cell 241a/241b and the Q1L_off_intent signal coupled to the S3OFF input of each cell 241a/241b. Additionally, a logical "FALSE" signal supplied to the FORCE_P input of cell 241a, while a duty cycle signal is provided to the FORCE_P input of cell 241b. FIG. 15A further illustrates the external control signals for the AC2 side CDSC cells 242a and 242b include the Q1L_off_intent signal coupled to the S2OFF input of each cell 242a/242b and the Q2L_off_intent signal coupled to the S3OFF input of each cell 242a/242b. Additionally, a logical "FALSE" signal supplied to the FORCE_P input of cell 242a, while a duty cycle signal is provided to the FORCE_P input of cell 242b. Each of these signals is described in greater detail below with respect to FIG. 15B.

FIG. 15B illustrates an upper logic train 1502a and a lower logic train 1502b. Upper logic train 1502a takes as inputs the AC input voltages from nodes AC1 and AC2. Upper logic train 1502a generates as outputs the Q2L and Q1H rectifier drive signals, along with the Q2L_off_intent signal provided to the S2OFF input of upper CDSC cells 241a/241b and the S3OFF inputs of lower CDSC cells 242a/242b, as described above. More specifically, the voltage at node AC2 is provided to the inverting input of comparator 1565a-1. A body diode conduction detection reference voltage 1564a-1 is supplied to the non-inverting input of the same comparator. Thus, the output of comparator 1565a-1 will effectively be low when AC2 is positive (i.e., current flows from AC1 to AC2) and high when AC2 is negative (i.e., current flows from AC2 to AC1 and thus conducting the body diode of switch Q2L). Similarly, the voltage at node AC1 is provided to the non-inverting input of comparator 1565b-1. A body diode conduction detection reference voltage 1564b-1 added to the rectifier 1 output voltage VRECT1 (FIG. 15A) is supplied to the inverting input of the same comparator. Thus, the output of comparator 1565b-1 will effectively be low when the rectifier 1 output voltage VRECT1 is greater than the voltage at node AC1 (body diode of Q1H is not conducting) and vice-versa (body diode of Q1H is conducting).

The outputs of comparators 1565a-1 and 1565b-1 are respectively provided as inputs to one shots 1563a-1 and 1563b-1, which provide a logic high pulse upon the respective comparator output transitioning high. These logic high pulses are respectively provided to the set ("S") inputs of SR flipflops 1568a-1 and 1568b-1. The outputs ("Q") of flip flops 1568a-1 and 1568b-1 provide the Q2L drive signal for the low side switch of rectifier 2 and the Q1H drive signal for the high side switch of rectifier 1, respectively. The voltage at node AC2 is also provided to the non-inverting input of comparator 1565c-1, which has its inverting input coupled to ground. The output of comparator 1565c-1 will thus be high when AC2 is positive and low when AC2 is negative. This output is also the Q2L_off_intent signal described above. This signal is provided to the input of one shot 1563c-1, which generates a logic high pulse responsive to the Q2L_off_intent signal transitioning high. This logic pulse is provided to the reset ("R") inputs of flipflops 1568a-1 and 1568b-1, which resets the flipflops, effectively turning off the low side switch of rectifier 2 and the high side switch of rectifier 1.

Lower logic train 1502b takes as inputs the AC input voltages from nodes AC1 and AC2. Lower logic train 1502b generates as outputs the Q1L and Q2H rectifier drive signals, along with the Q1L_off_intent signal provided to the S3OFF input of upper CDSC cells 241a/241b and the S2OFF inputs of lower CDSC cells 242a/242b, as described above. More specifically, the voltage at node AC1 is provided to the inverting input of comparator 1565a-2. A body diode conduction detection reference voltage 1564a-2 is supplied to the non-inverting input of the same comparator. Thus, the output of comparator 1565a-2 will effectively be low when AC1 is positive (i.e., coil current flows from AC2 to AC1) and high when AC1 is negative (i.e., coil current flows from AC1 to AC2 and conducts body diode of Q1L). Similarly, the voltage at node AC2 is provided to the non-inverting input of comparator 1565b-2. A body diode conduction detection reference voltage 1564b-2 added to the rectifier 2 output voltage VRECT2 is supplied to the inverting input of the same comparator. Thus, the output of comparator 1565b-2 will effectively be low when the rectifier 2 output voltage VRECT2 is greater than the voltage at node AC2 (Q2H body diode is not conducting) and vice-versa (Q2H body diode is conducting).

The outputs of comparators 1565a-2 and 1565b-2 are respectively provided as inputs to one shots 1563a-2 and 1563b-2, which provide a logic high pulse upon the respective comparator output transitioning high. These logic high pulses are respectively provided to the set ("S") inputs of SR flipflops 1568a-2 and 1568b-2. The outputs ("Q") of one shots 1568a-2 and 1568b-2 provide the Q1L drive signal for the low side switch of rectifier 1 and the Q2H drive signal for the high side switch of rectifier 2, respectively. The voltage at node AC1 is also provided to the non-inverting input of comparator 1565c-2, which has its inverting input coupled to ground. The output of comparator 1565c-2 will thus be high when AC1 is positive (coil current flows from AC2 to AC1) and low when AC1 is negative. This output is also the Q1L_off_intent signal described above. This signal is provided to the input of one shot 1563c-2, which generates a logic high pulse responsive to the Q1L_off_intent signal transitioning high. This logic pulse is provided to the reset ("R") inputs of flipflops 1568a-2 and 1568b-2, which resets the flipflops, effectively turning off the low side switch of rectifier 1 and the high side switch of rectifier 2.

Figure 16A:
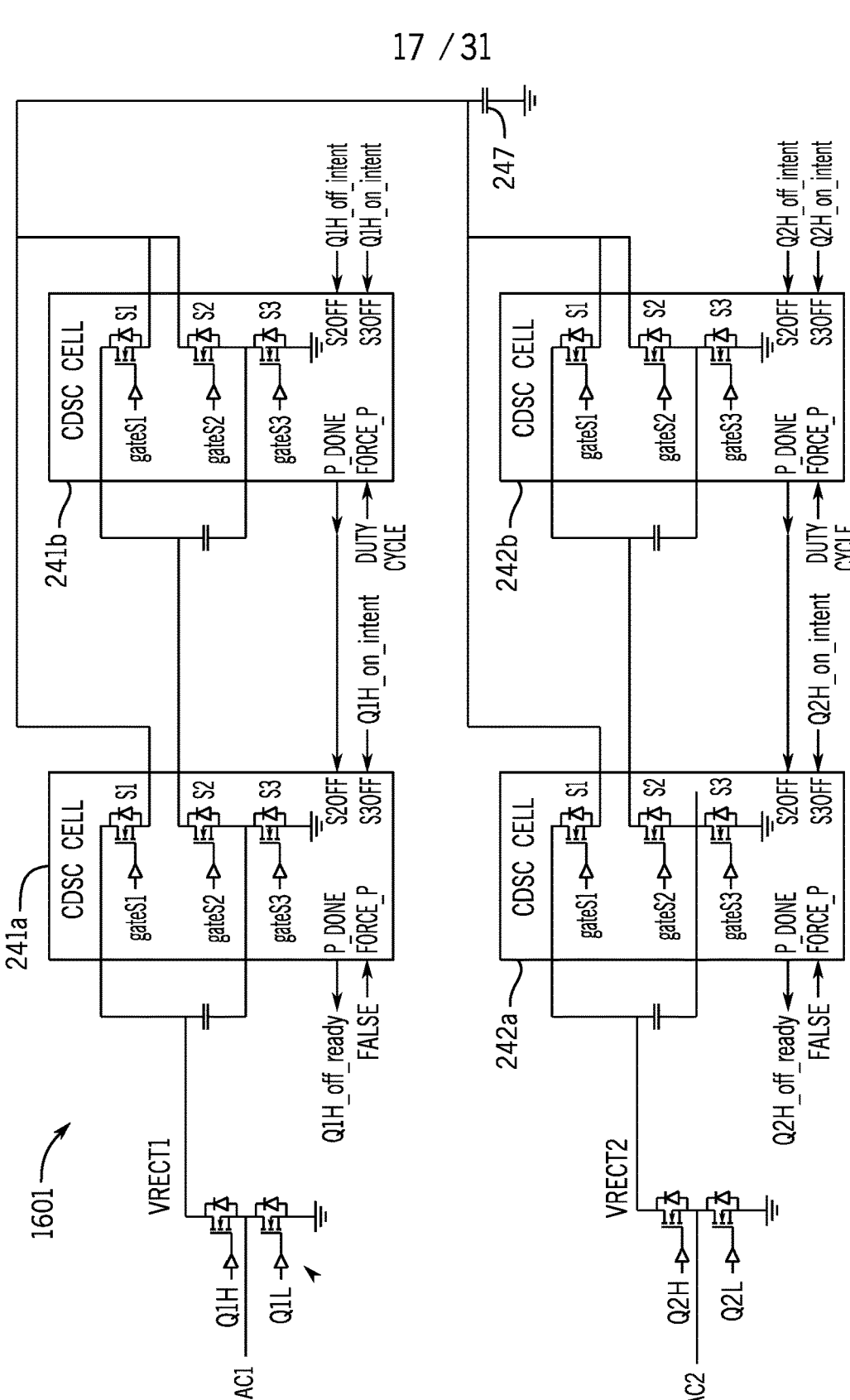
FIGS. 16A-16B illustrate inter-cell control logic for a CDSC system employing a sequential S mode to P mode transition.
Figure 16B:
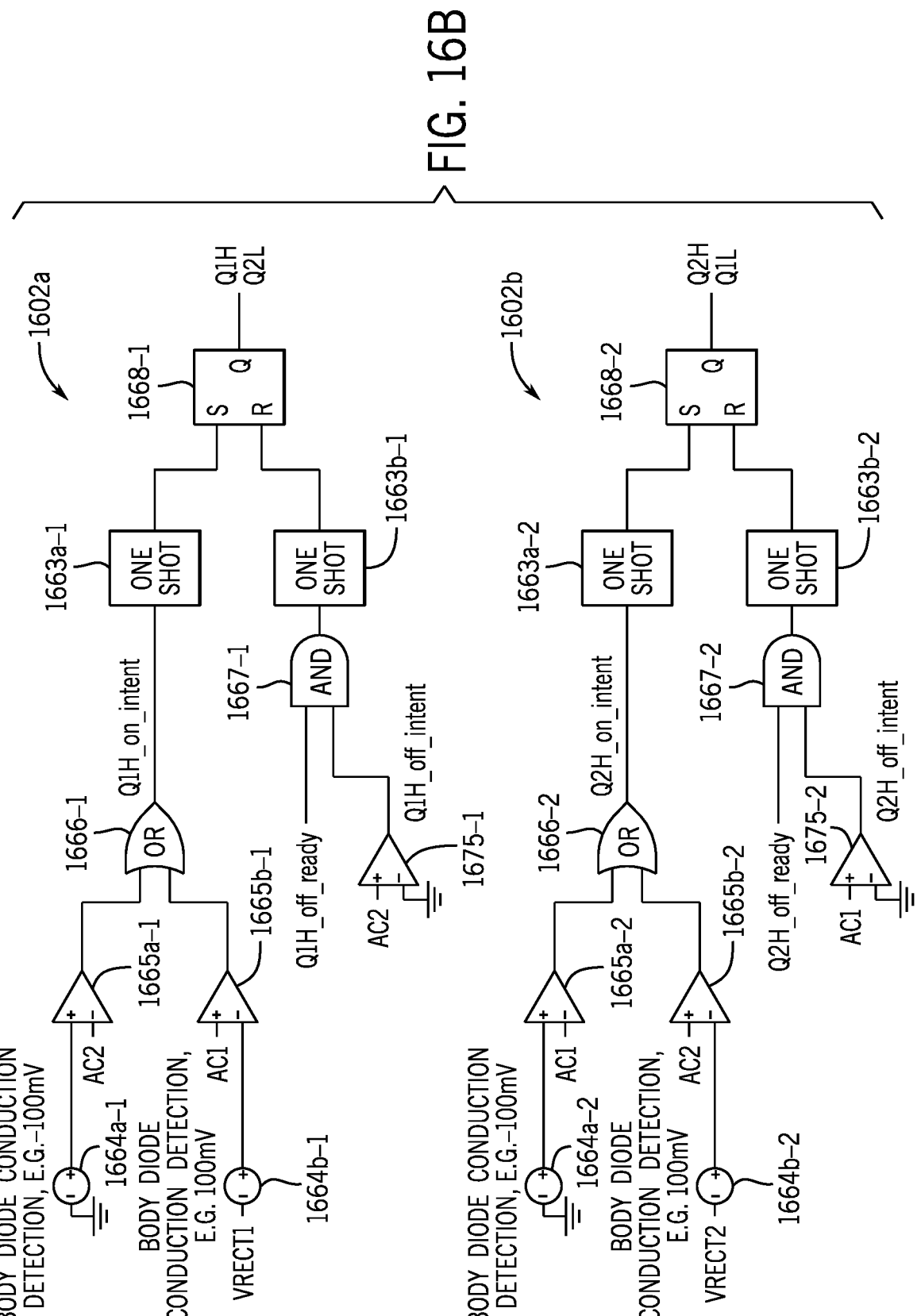

FIGS. 16A-16B illustrate inter-cell control logic for a CDSC system employing a sequential S mode to P mode transition. More specifically, FIGS. 16A-16B illustrate inter-cell control logic 1601, 1602a, 1602b for a CDSC system employing a sequential S mode to P mode transition. A two-cell cascaded RDSC configuration (i.e., 3:1 conversion ratio) is used as an example, although more cells can be cascaded as described above. Illustrated in FIG. 16A are the Q1H, Q1L, Q2H, and Q2L drive signals for the high and low side switches of Rectifier 1 (switches Q1H/Q1L) Rectifier 2 (switches Q2H/Q2L), respectively. FIG. 16A further illustrates the external control signals for CDSC cell 241*b* including the Q1H_off_intent signal coupled to the S2OFF input, the Q1H_on_intent signal coupled to the S3OFF input, and a duty cycle signal supplied to the FORCE_P input. Similarly, the external control signals for CDSC cell 241*a* include the Q1H_on_intent signal coupled to the S3OFF input and a logical "FALSE" signal supplied to the FORCE_P input. The P_DONE output of cell 241*b* is coupled to the S2OFF input of cell 241*a*. The P_DONE output of CDSC cell 241*a* is an Q1H_off_ready signal. FIG. 16A further illustrates the external control signals for CDSC cell 242*b* including the Q2H_off_intent signal coupled to the S2OFF input, the Q2H_on_intent signal coupled to the S3OFF input, and a duty cycle signal supplied to the FORCE_P input. Similarly, the external control signals for RDSC cell 242*a* include the Q2H_off_intent signal coupled to the S3OFF input and a logical "FALSE" signal supplied to the FORCE_P input. The P_DONE output of cell 241*b* is coupled to the S2OFF input of cell 241*a*. The P_DONE output of CDSC cell 241*a* is an Q1H_off_ready signal. Each of these signals is described in greater detail below with respect to FIG. 16B.

FIG. 16B illustrates an upper logic train 1602*a* and a lower logic train 1602*b*. Upper logic train 1602*a* takes as inputs the AC input voltages from nodes AC1 and AC2 (to detect high side or low side body diode conduction, respectively) and the Q1H_off_ready signal coming from the most upstream high side CDSC cell 142*a*. Upper logic train 1602*a* generates as outputs the Q1H and Q2L rectifier drive signals, along with the Q1H_on_intent and Q1H_off_intent signals provided to upper CDSC cells 241*a*/241*b*, as described above. More specifically, the voltage at node AC2 is provided to the inverting input of comparator 1665*a*-1. A body diode conduction detection reference voltage 1664*a*-1 is supplied to the non-inverting input of the same comparator. Thus, the output of comparator 1665*a*-1 will effectively be low when AC2 is positive (i.e., the higher voltage node of the AC input waveform) and high when AC2 is negative (i.e., the lower voltage node of the AC input voltage waveform). Similarly, the voltage at node AC1 is provided to the inverting input of comparator 1665*b*-1. A body diode conduction detection reference voltage 1664*b*-1 added to the output voltage VRECT1 of rectifier 1 is supplied to the non-inverting input of the same comparator. Thus, the output of comparator 1665*b*-1 will effectively be low when the output voltage VRECT1 of rectifier 1 is greater than the voltage at node AC1 and vice-versa. The outputs of comparators 1665*a*-1 and 1665*b*-1 are provided as inputs to OR gate 1666-1, which will generate a high output when either comparator output is high. In other words, the output of OR gate 1666-1, which is the Q1H_on_intent signal, will be high during the positive cycle of the AC waveform impressed between terminals AC1 and AC2. This signal is provided to the S3OFF inputs of upper CDSC cells 241*a* and 241*b*, which triggers the turn off of their low side switches S3, and eventually, leading to the turn on of their middle switches S2 as described above.

The Q1H_on_intent signal output from OR gate 1666-1 is also provided to one shot 1663*a*-1, which provides a logic high pulse on transition of Q1H_on_intent to a high logic state. The output of one shot 1663*a*-1 is provided to the set ("S") input of SR flipflop 1668-1, which will cause the output ("Q") of the flipflop to transition high, which provides the Q1H and Q2L output signals used to turn on the high side switch Q1H of rectifier 1 and low side switch Q2L of rectifier 2. The reset ("R") input of flipflop 1668-1 (which ultimately turns off the high side switch Q1H of rectifier 1 and low side switch Q2L of rectifier 2) is driven by the Q1H_off_ready signal, which is output from the P_DONE output of first CDSC cell 241*a* in the high side cascade. This signal is provided to one input of AND gate 1667-1. The other input of AND gate 1667-1 is the output of comparator 1675-1, which has the voltage at node AC2 coupled to its non-inverting input and ground at its inverting input. Thus, the output of comparator 1675-1, which is also the Q1H_off_intent signal, is positive when the AC2 node is higher than 0V, meaning the coil current is flowing from node AC1 to node AC2. The Q1H_off_intent signal is also provided to the S3OFF input of CDSC cell 241*b* at the end of the cascade and begins the sequence of turning off the middle switches of the high side CDSC cascade. Thus, the output of AND gate 1667-1 is high when the input AC voltage is positive and the first CDSC cell in the high side cascade has turned off its middle switch S2 and turned on its bottom switch S3. The output of the AND gate 1667-1 is provided to one shot 1663*b*-1, which provides a logic high pulse whenever the output of AND gate 1667-1 goes high, triggering the reset ("R") input of flipflop 1668-1, which resets the flip flop, sending rectifier drive signals Q1H and Q2L low, turning off the high side switch Q1H of rectifier 1 and turning off the low side switch Q2L of rectifier 2.

Lower logic train 1666-2 takes as inputs the AC input voltages from nodes AC1 and AC2 (effectively indicating the instantaneous AC polarity of the input AC waveform) and the Q2H_off_ready signal coming from the most upstream low side CDSC cell 142*b*. Lower logic train 1602*b* generates as outputs the Q2H and Q1L rectifier switch drive signals, along with the Q2H_on_intent and Q2H_off_intent signals provided to lower CDSC cells 242*a*/242*b* as described above. More specifically, the voltage at node AC1 is provided to the inverting input of comparator 1665*a*-2. A body diode conduction detection reference voltage 1664*a*-2 is supplied to the non-inverting input of the same comparator. Thus, the output of comparator 1665*a*-2 will effectively be low when AC1 is positive (i.e., the higher voltage node of the AC input waveform) and high when AC1 is negative (i.e., the lower voltage node of the AC input voltage waveform). Similarly, the voltage at node AC2 is provided to the inverting input of comparator 1665*b*-2. A body diode conduction detection reference voltage 1664*b*-2 added to the output voltage VRECT2 of rectifier 2 is supplied to the non-inverting input of the same comparator. Thus, the output of comparator 1665*b*-2 will effectively be low when the output voltage VRECT2 of rectifier 2 is greater than the voltage at node AC2 and vice-versa. The outputs of comparators 1665*a*-2 and 1665*b*-2 are provided as inputs to OR gate 1666-2, which will generate a high output when either comparator output is high. In other words, the output of OR gate 1666-2, which is the Q2H_on_intent signal, will be high during the negative cycle of the AC waveform impressed between terminals AC1 and AC2. This signal is provided to the S3OFF inputs of low side CDSC cells 242*a* and 242*b*, which triggers the turn off of low side switches S3 and triggers the turn on of middle switches S2 in the respective CDSC cells as described above.

The Q2H_on_intent signal output from OR gate 1666-2 is also provided to one shot 1663*a*-2, which provides a logic high pulse on transition of Q2H_on_intent to a high logic state. The output of one shot 1663*a*-2 is provided to the set ("S") input of SR flipflop 1668-2, which will cause the output ("Q") of the flipflop to transition high, which provides the Q2H and Q1L output signals used to turn on the high side switch Q2H of rectifier 2 and low side switch Q1L of rectifier 1. The reset ("R") input of flipflop 1668-2 (which ultimately turns off the high side switch Q2H of rectifier 2 and low side switch Q1L of rectifier 1) is driven by the Q2H_off_ready, which is output from the P_DONE output of first CDSC cell 242a in the low side cascade. This signal is provided to one input of AND gate 1667-2. The other input of AND gate 1667-2 is the output of comparator 1675-2, which has the voltage at node AC coupled to its non-inverting input and ground at its inverting input. Thus, the output of comparator 1675-2, which is also the Q2H_off_intent signal, is positive when the AC1 node is higher than 0V, meaning coil current is flowing from AC2 to AC1. The Q2H_off_intent signal is also provided to the S3OFF input of CDSC cell 242b at the end of the cascade and begins the sequence of turning off the middle switches of the low side CDSC cascade. Thus, the output of AND gate 1667-2 is high when the input AC voltage is positive and the first CDSC cell in the low side cascade has turned off its middle switch S2 and turned on its bottom switch S3. The output of the AND gate 1667-2 is provided to one shot 1663b-2, which provides a logic high pulse whenever the output of AND gate 1667-2 goes high, triggering the reset ("R") input of flipflop 1668-2, which resets the flip flop, sending rectifier drive signals Q2H and Q1L low, turning off the high side switch Q2H of rectifier 2 and turning off the low side switch Q1L of rectifier 1.

Figure 17:
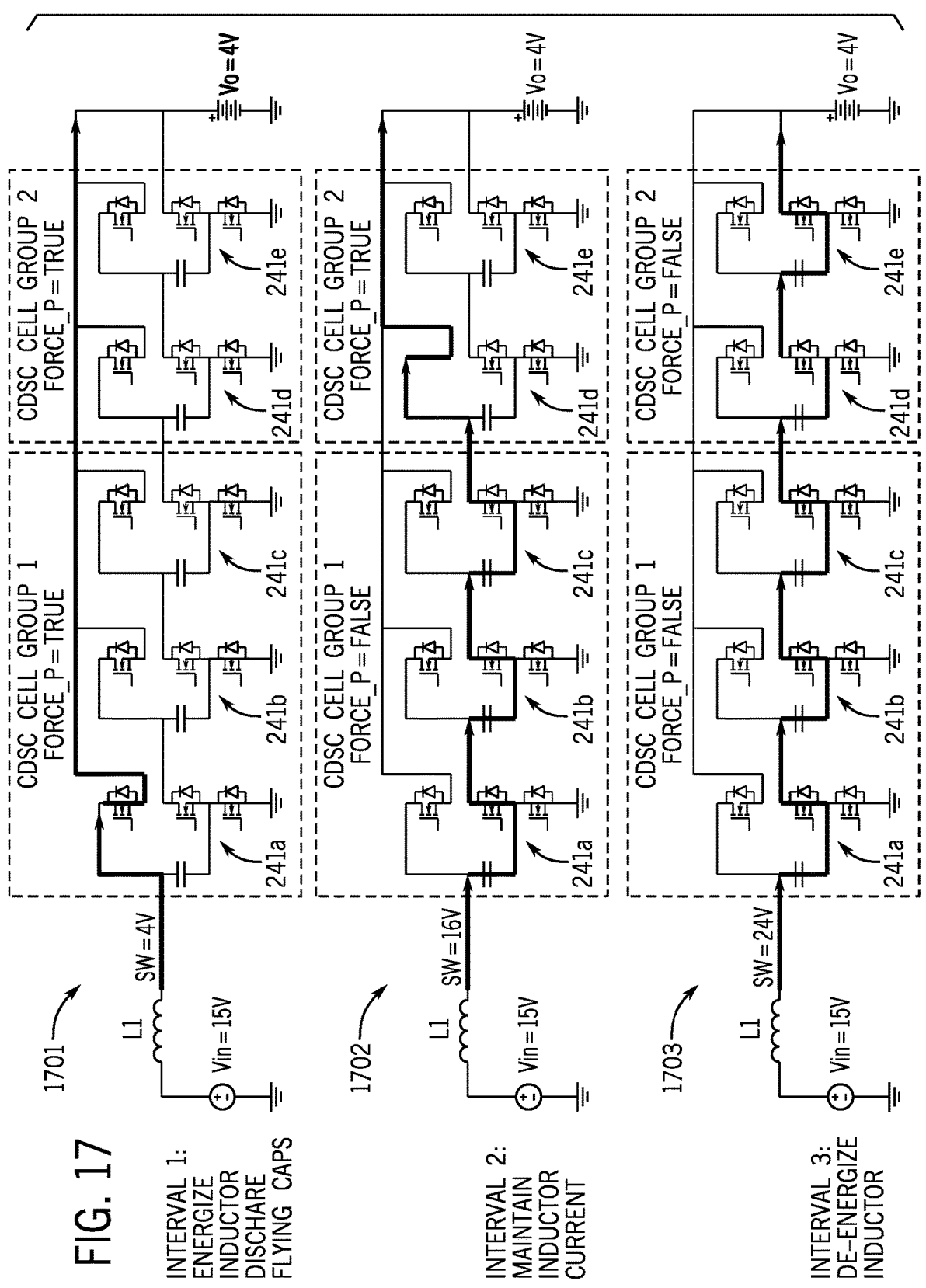
FIG. 17 illustrates control of a CDSC cascade for use in a wired charging configuration with a 15V input voltage.

FIG. 17 illustrates control of a CDSC cascade for use in a wired charging configuration with a 15V input voltage. The CDSC can be operated with three voltage levels, a high voltage level depicted in schematic 1701, an intermediate voltage level depicted in schematic 1702, and a low voltage level depicted in schematic 1703. All cases assume that the output bus of the CDSC system is about 4V, corresponding roughly to the voltage of a single lithium-ion battery cell. This voltage may vary depending on the actual output voltage bus level, which can be affected by battery cell configuration (e.g., multiple cells in series will increase the output voltage), battery chemistry (i.e., different battery chemistries exhibit different voltage ranges), and battery state of charge. Stated generally, the operating principle is that the high voltage level (schematic 1701) can be used to energize the driving coil L1 (i.e., applying a forward voltage to store energy in the inductor), the low voltage level (schematic 1703) can be used to de-energize driving coil L1 (i.e., applying a reverse voltage to discharge energy from the inductor), and an intermediate voltage level (schematic 1702) can optionally be used in the middle of a switching period (to maintain an approximately flat inductor slope, reducing losses and preventing saturation of the inductor core). Under light load conditions, the inductor may completely discharge before.

In the illustrated example, an input voltage of 15V is provided. For a first portion of the switching cycle, a low voltage level depicted by schematic 1701 may be employed by forcing all CDSC cells 241a-241e into P mode (e.g., by providing a FORCE_P=TRUE signal, as described above). In the P mode the flying capacitors of each cell are connected in parallel with the load, and the input of the CDSC cascade sees a voltage approximately equal to the output voltage. Because the output voltage (e.g., 4V) is less than the input voltage (e.g., 15V), the voltage across the driving coil (inductor L1) results in increasing current through the inductor.

Subsequently, once the inductor current reaches a target level, the system can transition to the intermediate voltage level depicted by schematic 1702. In the intermediate voltage mode, a first subset of CDSC cells (e.g., CDSC Cell Group 1 made up of CDSC cells 241a-241c) is actively operated (e.g., by de-asserting the FORCE_P=TRUE signal), while a second subset of CDSC cells (e.g., CDSC Cell Group 2 made up of CDSC cells 241d-241e) remains forced into P-mode. As a result, the variable voltage conversion ratio changes to 4:1. With the example input and output voltages given, this presents a voltage of 16V at the input of the CDSC cascade, which is approximately equal to the input voltage. As a result, the relatively smaller (as compared to the high voltage mode discussed below) negative voltage across the inductor results in a continued current flow that slowly discharges inductor L1.

Thereafter, once the inductor current reaches another target level, the system can transition to the high voltage level depicted by schematic 1703. In the high voltage mode, both subsets of CDSC cells (e.g., CDSC Cell Group 1 made up of CDSC cells 241a-241c and CDSC Cell Group 2 made up of CDSC cells 241d-241e) are actively operated (e.g., by de-asserting the FORCE_P=TRUE signal). As a result, the variable voltage conversion ratio changes to 6:1. With the example input and output voltages given, this presents a voltage of 24V at the input of the CDSC cascade, which is greater than the input voltage. As a result, the relatively larger (as compared to the intermediate voltage mode discussed above) negative voltage across the inductor results in a continued current flow that more rapidly discharges inductor L1.

Conversely, in a relatively lower load condition, the system can transition directly from the low voltage mode (schematic 1701) to the high voltage mode (schematic 1703), omitting the intermediate voltage mode. In any case, the timing of the transitions as between modes may be regulated by the controller circuitry to achieve boundary mode conduction (meaning the current through inductor L1 is always decreased cross below zero and immediately increased again in a switching period) under high loads and either boundary mode conduction or discontinuous conduction (meaning the current though inductor L1 may be near zero for a portion of the switching period) under lighter load conditions. In some applications, boundary mode conduction may be preferred for all but very light load conditions to maximize the efficiency.

Figure 18:
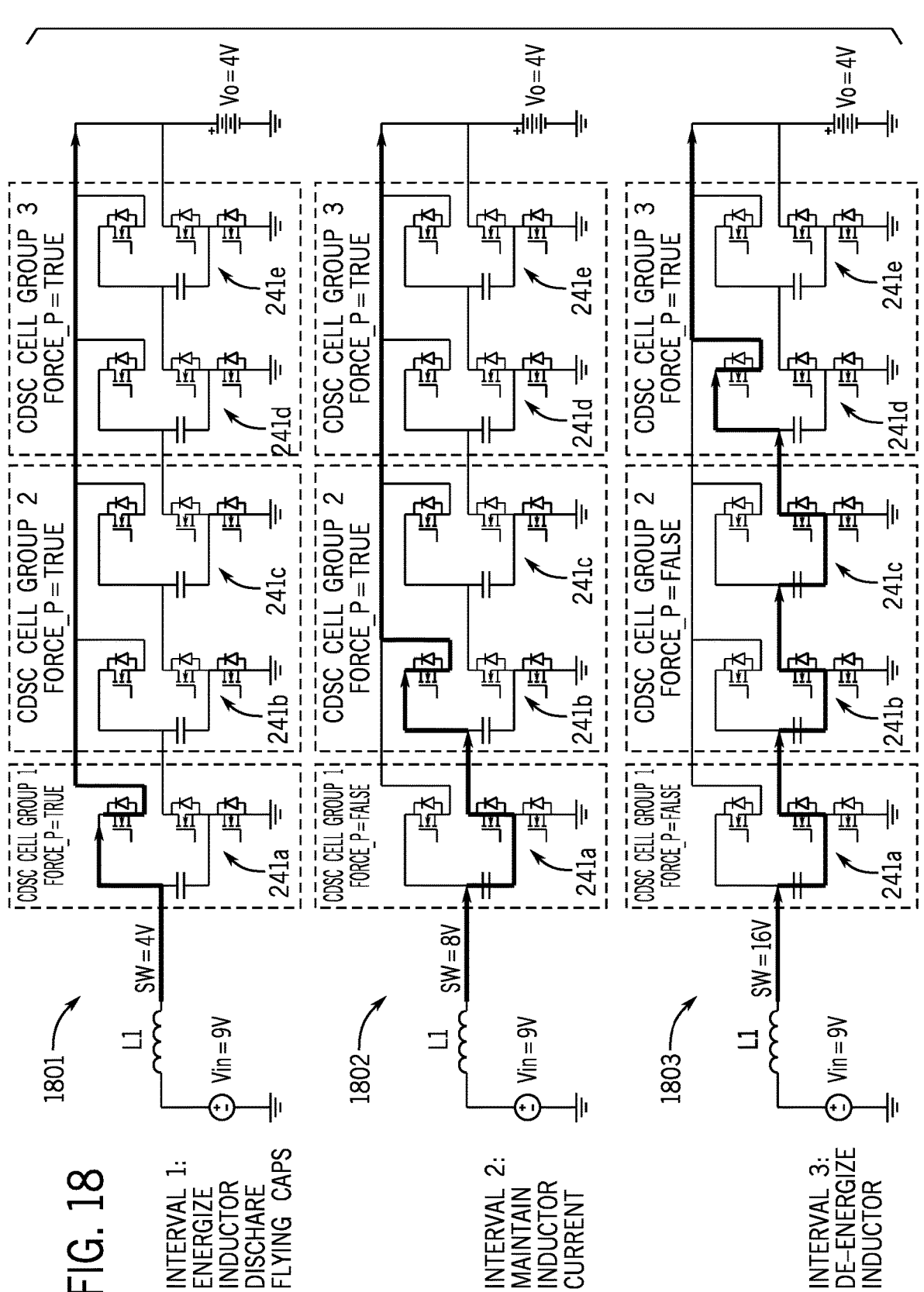
FIG. 18 illustrates control of a CDSC cascade for use in a wired charging configuration with a 9V input voltage.

FIG. 18 illustrates control of a CDSC cascade for use in a wired charging configuration with a 9V input voltage. Operation is broadly similar to the 15V input example provided above, but the grouping of CDSC cells for the high, intermediate, and low voltage modes is slightly different. For a first portion of the switching cycle, a low voltage level depicted by schematic 1801 may be employed by forcing all CDSC cells 241a-241e into P mode (e.g., by providing a FORCE_P=TRUE signal, as described above). In the P mode the flying capacitors of each cell are connected in parallel with the load, and the input sees a voltage approximately equal to the output voltage. Because the output voltage (e.g., 4V) is less than the input voltage (e.g., 9V), the voltage across the driving coil (inductor L1) results in increasing current through the inductor.

Subsequently, once the inductor current reaches a target level, the system can transition to the intermediate voltage level depicted by schematic 1802. In the intermediate voltage mode, a first subset of CDSC cells (e.g., CDSC Cell Group 1 made up of CDSC cell 241a) is actively operated (e.g., by de-asserting the FORCE_P=TRUE signal), while a second subset of CDSC cells (e.g., CDSC Cell Group 2 made up of CDSC cells 241b-241c and CDSC Cell Group 3 made up of CDSC cells 241d-241e) remains forced into P-mode. As a result, the variable voltage conversion ratio changes to 2:1. With the example input and output voltages given, this presents a voltage of 8V at the input of the CDSC cascade, which is approximately equal to the input voltage. As a result, the relatively smaller (as compared to the low voltage mode discussed above) positive voltage across the inductor results in a continued current flow that more slowly energizes inductor L1.

Thereafter, once the inductor current reaches another target level, the system can transition to the high voltage level depicted by schematic 1803. In the high voltage mode, a first subset of CDSC cells (e.g., CDSC Cell Group 1 made up of CDSC cell 241aand CDSC Cell Group 2 made up of CDSC cells 241b-c) are actively operated (e.g., by de-asserting the FORCE_P=TRUE signal), while a second subset of CDSC cells (e.g., CDSC Cell Group 3 made up of CDSC cells 241d-241e) remains in P mode. As a result, the variable voltage conversion ratio changes to 4:1. With the example input and output voltages given, this presents a voltage of 16V at the input of the CDSC cascade, which is greater than the input voltage. As a result, the relatively larger (as compared to the intermediate voltage mode discussed above) negative voltage across the inductor results in a continued current flow that more rapidly discharges inductor L1.

Conversely, in a relatively lower load condition, the system can transition directly from the low voltage mode (schematic 1801) to the high voltage mode (schematic 1803), omitting the intermediate voltage mode. In any case, the timing of the transitions as between modes may be regulated by the controller circuitry to achieve boundary mode conduction (meaning the current through inductor L1 is always decreased cross below zero and immediately increased again in a switching period) under high loads and either boundary mode conduction or discontinuous conduction (meaning the current though inductor L1 may be near zero for a portion of the switching period) under lighter load conditions. In some applications, boundary mode conduction may be preferred for all but very light load conditions to maximize the efficiency.

Figure 19:
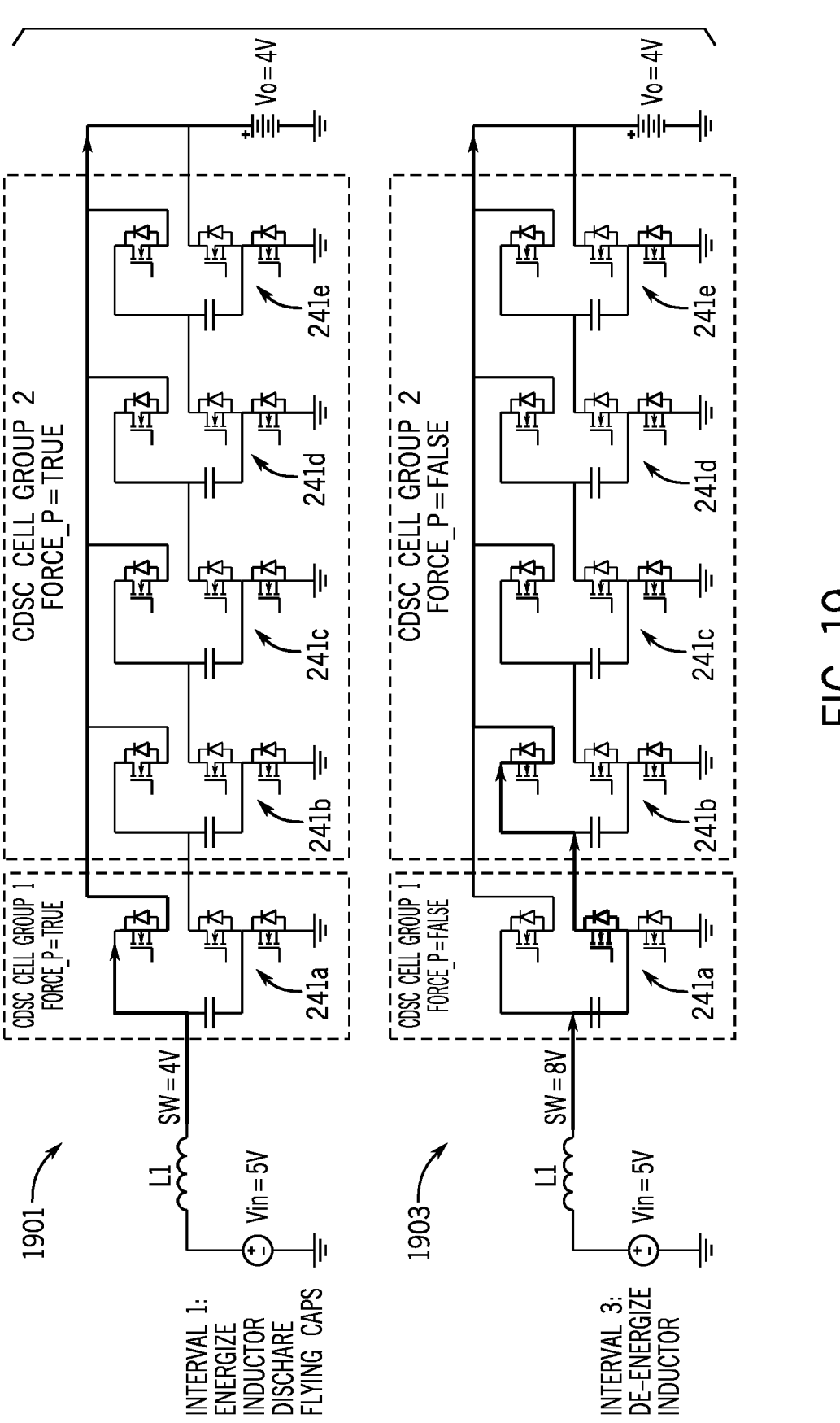
FIG. 19 illustrates control of a CDSC cascade for use in a wired charging configuration with a 5V input voltage.

FIG. 19 illustrates control of a CDSC cascade for use in a wired charging configuration with a 5V input voltage. The configuration of FIG. 19 only supports cases where the input voltage is greater than the output voltage. As a result, it may not be able to support three-level operation when the input voltage is close to the output voltage. Otherwise, operation is broadly similar to the 15V and 9V input examples provided above, except that the intermediate voltage mode is omitted, and the grouping of CDSC cells for the high and low voltage modes is slightly different. For a first portion of the switching cycle, a low voltage level depicted by schematic 1901 may be employed by forcing all CDSC cells 241a-241e into P mode (e.g., by providing a FORCE_P=TRUE signal, as described above). In the P mode the flying capacitors of each cell are connected in parallel with the load, and the input sees a voltage approximately equal to the output voltage. Because the output voltage (e.g., 4V) is less than the input voltage (e.g., 5V), the voltage across the driving coil (inductor L1) results in increasing current through the inductor, storing energy therein.

Subsequently, under any load condition, the system can transition to the high voltage level depicted by schematic 1903. In the low voltage mode, a first subset of CDSC cells (e.g., CDSC Cell Group 1 made up of CDSC cell 241a) is actively operated (e.g., by de-asserting the FORCE_P=TRUE signal), while a second subset of CDSC cells (e.g., CDSC Cell Group 2 made up of CDSC cells 241b-241e remains forced into P-mode. As a result, the variable voltage conversion ratio changes to 2:1. With the example input and output voltages given, this presents a voltage of 8V at the input of the CDSC cascade, which is greater than the input voltage. As a result, the negative voltage across the inductor results in a continued current flow that discharges inductor L1.

As above, the timing of the transitions as between modes may be regulated by the controller circuitry. Because the input voltage is very close to output voltage, the CDSC system may need to operate in continuous conduction mode (meaning the current through inductor L1 may not be decreased cross below zero in a switching period) with the two illustrated voltage levels.

Figure 20:
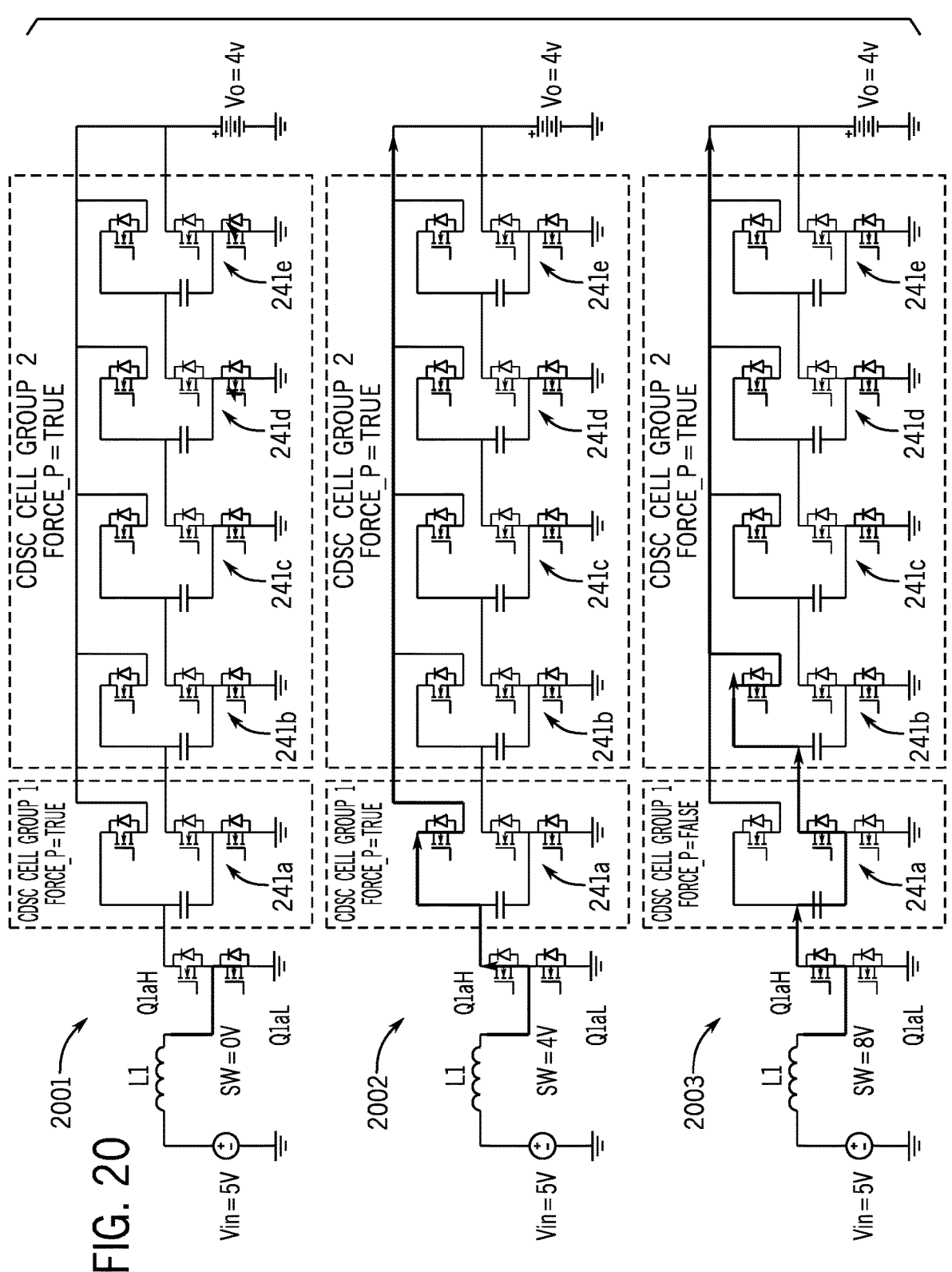
FIG. 20 illustrates control of a CDSC cascade for use in a wired charging configuration with an input voltage less than the output voltage.

FIG. 20 illustrates control of a CDSC cascade for use in a wired charging configuration with an input voltage less than the output voltage. Unlike the configuration of FIG. 19, which only supports cases where the input voltage is greater than the output voltage, the configuration of FIG. 20 can support cases where the input voltage is greater than the output voltage by alternately connecting node SW (i.e., the output side of inductor L1) to the input of the CDSC cascade (via switch Q1*aH*) and to ground (via switch Q1*aL*). As a result, it can allow three level boundary conduction mode operation for a 5V input voltage.

In the illustrated example, an input voltage of 5V is provided. For a first portion of the switching cycle, a low voltage level depicted by schematic 2001 may be employed by forcing all CDSC cells 241a-241e into P mode (e.g., by providing a FORCE_P=TRUE signal, as described above) and coupling node SW to ground via switch Q1*aL*. In the P mode the flying capacitors of each cell are connected in parallel with the load, and the input sees a voltage approximately equal to the output voltage. However, because the driving coil (inductor L1) has been decoupled from the CDSC cell 241a and coupled to ground, the system input voltage across the driving coil (inductor L1) results in increasing current through the inductor, storing energy therein.

Subsequently, in a relatively higher inductor current condition, the system can transition to the intermediate voltage level depicted by schematic 2002. In the intermediate voltage mode, unlike the configurations discussed above with respect to FIGS. 17 and 18, all CDSC cells remain forced into P-mode. However, switches Q1*aH* and Q1*aL* switch states to couple node SW to the input of the CDSC cascade (i.e., to CDSC cell 241a). As a result, with the example input and output voltages given, this presents a voltage of 4V at the input of the CDSC cascade and at node SW, which is approximately equal to the input voltage. As a result, the relatively smaller (as compared to the high voltage mode discussed above) positive voltage across the inductor results in a continued current flow that more slowly charges inductor L1.

Thereafter, while still in the relatively high inductor current condition, the system can transition to the high voltage level depicted by schematic 2003. In the high voltage mode, a first subset of CDSC cells (e.g., CDSC Cell Group 1 made up of CDSC cell 241a) are actively operated (e.g., by de-asserting the FORCE_P=TRUE signal), while a second subset of CDSC cells (e.g., CDSC Cell Group 2 made up of CDSC cells 241b-241c) remain in P mode. As a result, the variable voltage conversion ratio changes to 2:1.

Also, switches Q1aH and Q1aL remain in their previous state, with node SW coupled to the input of the CDSC cascade. With the example input and output voltages given, this presents a voltage of 8V at the input of the CDSC cascade, which is greater than the input voltage. As a result, the relatively larger (as compared to the intermediate voltage mode discussed above) negative voltage across the inductor results in a continued current flow that quickly decreases inductor L1 current.

Conversely, in a relatively lower load condition, the system can transition directly from the low voltage mode (schematic 2001) to the high voltage mode (schematic 2003), omitting the intermediate voltage mode. In any case, the timing of the transitions as between modes may be regulated by the controller circuitry to achieve boundary mode conduction (meaning the current through inductor L1 is always decreased cross below zero and immediately increasing again in a switching period) under high loads and either boundary mode conduction or discontinuous conduction (meaning the current though inductor L1 may stay near zero for a portion of the switching period) under lighter load conditions. In some applications, boundary mode conduction may be preferred for all but very light load conditions to maximize the efficiency.

Figure 21:
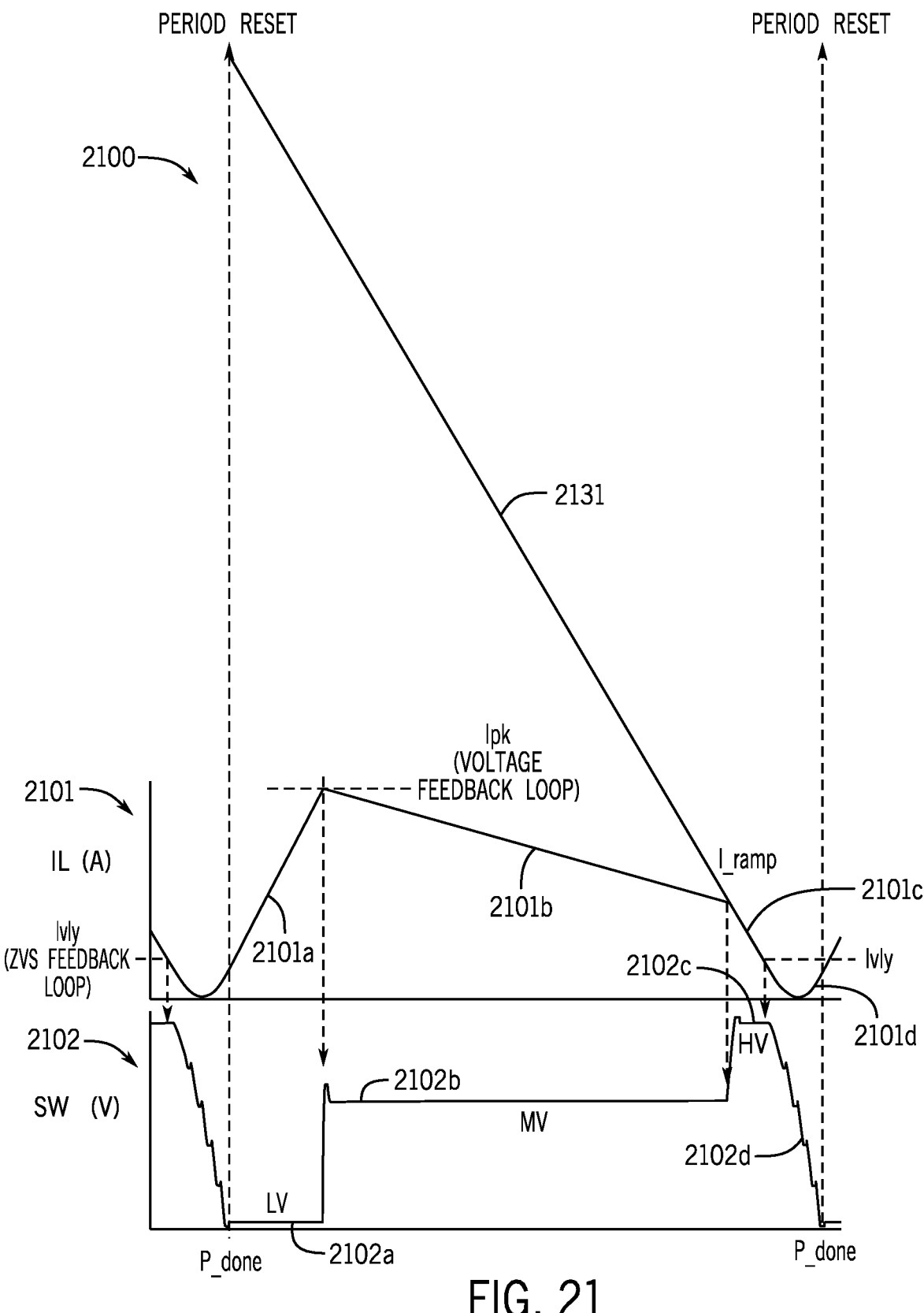
FIG. 21 illustrates boundary conduction mode (BCM) control for a CDSC cell.

FIG. 21 illustrates boundary conduction mode (BCM) control for a CDSC cascade. FIG. 21 illustrates one complete cycle/period, for example as depicted above with respect to FIG. 17, with a plot 2101 of the current through the driving coil (e.g., inductor L1) 2101 and a plot 2102 of the voltage at node SW. The period begins after a ZVS transition from S mode to P mode for all cells, triggering the first (left-hand) period reset, and beginning the illustrated cycle/period. This can be achieved by the controller circuitry receiving the P_DONE signal from the most upstream cell of the CDSC cascade. Immediately following a period reset, all cells are in P-mode, meaning the voltage of node SW is at its low voltage level 2102a (see, e.g., schematic 1701, etc.). When node SW is at the low voltage level 2102a, inductor current 2101a rises until it reaches a peak value Ipk (which, for example, can be provided from a voltage control feedback loop). When this peak current value is reached, the control circuitry can de-assert the FORCE-P signal to the first subset of cells (e.g., Cell Group 1 in FIG. 17, etc.). Then, these Group 1 cells transition to S mode, causing the voltage at node SW to rise to the medium voltage value 2102b (see, e.g., schematic 1702, etc.). During this interval, depending on whether the input voltage is less than or greater than the medium voltage level 2102b, the inductor current 2101b will either ramp up (see, e.g., schematic 1802) or down (see, e.g., schematic 1702) relatively slowly as compared to the rate of rise during the high voltage interval.

The control circuitry can generate an "artificial" ramp I_ramp 2131, which can match the inductor current slope during interval 2101c when node SW is at the high voltage level 2102c (see, e.g., schematic 1703, etc.). This I_ramp can be reset by a period reset event (e.g., left hand period reset in FIG. 21) at which point it is set to a high level, ramping down. When I_ramp reaches zero, a subsequent period reset (right hand period reset in FIG. 21) occurs. This triggers a period_timer event, discussed in greater detail below. When the voltage of node SW is at the medium voltage 2102b, the inductor current 2101b will eventually intersect and exceed I_ramp. At this point, the control circuitry can de-assert the FORCE_P signal to the second subset of cells (e.g., Cell Group 2 in FIG. 17, etc.). Then, the Group 2 cells can transition to S mode, and the SW node voltage can rise to the high voltage level 2102c (see, e.g., schematic 1703). When the SW node voltage is at the high voltage level 2102c, inductor current 2101c ramps down quickly. When inductor current reaches the valley current threshold Ivly, the control circuitry can start the transition to P mode for all cells. Once done, the control circuitry can receive a P_DONE event from the most upstream cell. When both P_DONE and period_timer are TRUE, the controller resets the period (as illustrated with respect to the control circuitry example of FIG. 24, discussed below.

Figure 22:
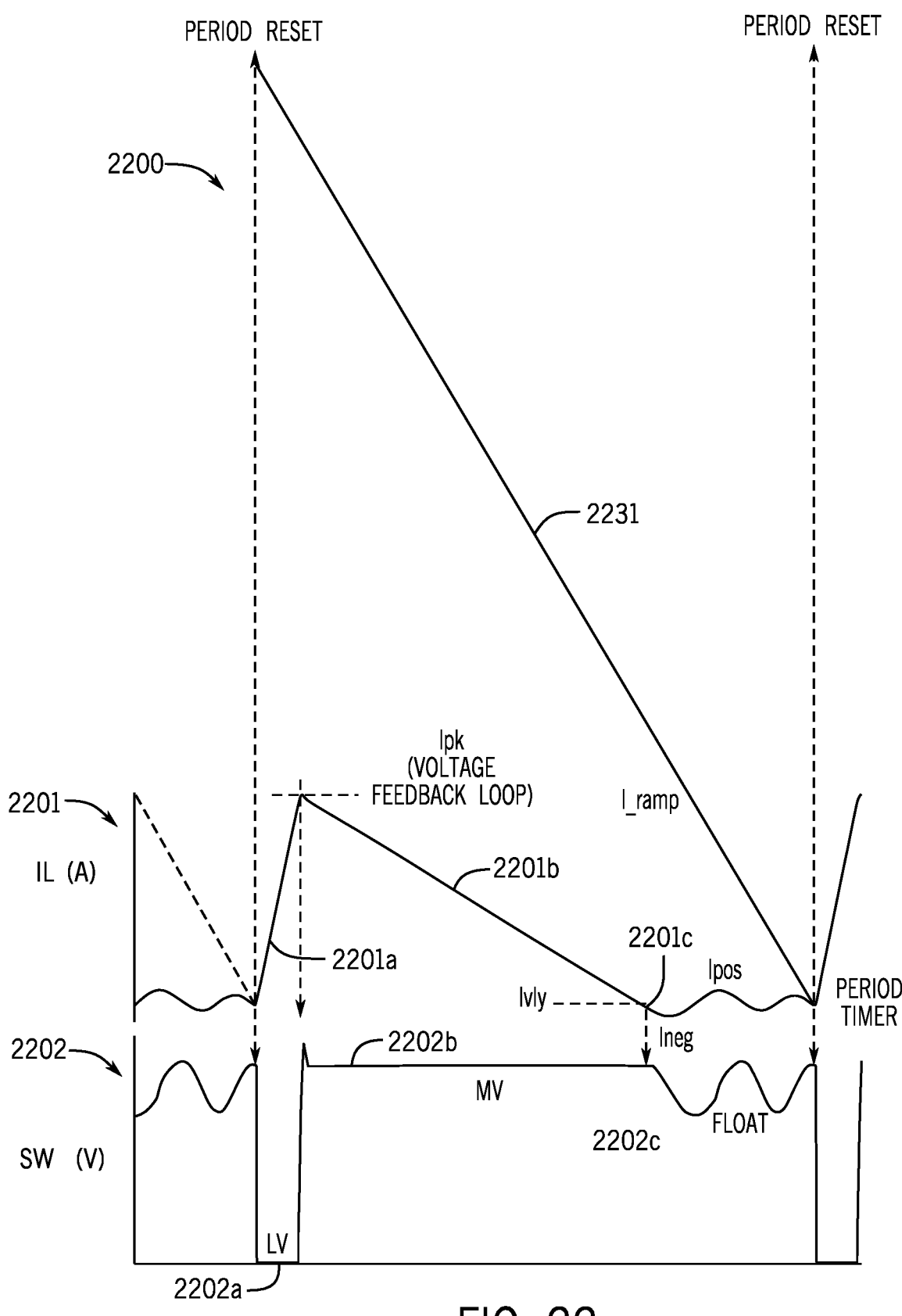
FIG. 22 illustrates discontinuous conduction mode one (DCM1) control for a CDSC cell.

FIG. 22 illustrates discontinuous conduction mode one (DCM1) control for a CDSC cascade. FIG. 22 illustrates one complete cycle/period, for example as depicted above with respect to FIG. 18, with a plot 2101 of the current through the driving coil (e.g., inductor L1) and a plot 2102 of the voltage at node SW. DCM1 occurs at light load and when the input voltage Vin is less than the medium voltage level MV/2202b (see, e.g., schematic 1802). When I_ramp 2231 (corresponding to I_ramp 2131 described above with respect to FIG. 21) reaches zero, a period_timer event is triggered. When period_timer is TRUE, and either P_DONE or Ipos (corresponding to a positive oscillation of coil current after a zero crossing) is TRUE, the control circuitry can resets the period, e.g., left hand Period reset of FIG. 22.

Immediately following this period reset, the voltage of node SW is at the low voltage (LV) level 2202a. As a result, inductor current 2201a rises and reaches peak current threshold, Ipk (e.g., from a voltage control loop). Then, the control circuitry can trigger a transition to the medium voltage level, causing the voltage of node SW node voltage to rise to MV level 2202b-just as in the boundary conduction mode (BCM) described above with respect to FIG. 21. As a result, the inductor current ramps down. Due to the low peak current under light load conditions, the discharging inductor current 2201b may reach below the Ivly threshold (at 2201c) before intersecting with I_ramp. In this case, the control circuitry can first trigger S to P mode transitions for all cells. Once done (signaled by P_DONE) or inductor current reversal is detected (signaled by Ipos), the control circuitry can set all cells to F mode (float mode, or Hi-Z/high impedance mode), causing the voltage at node SW to float as well. Then, when I_ramp eventually reaches zero, triggering a period_timer event, the controller resets the period.

Figure 23:
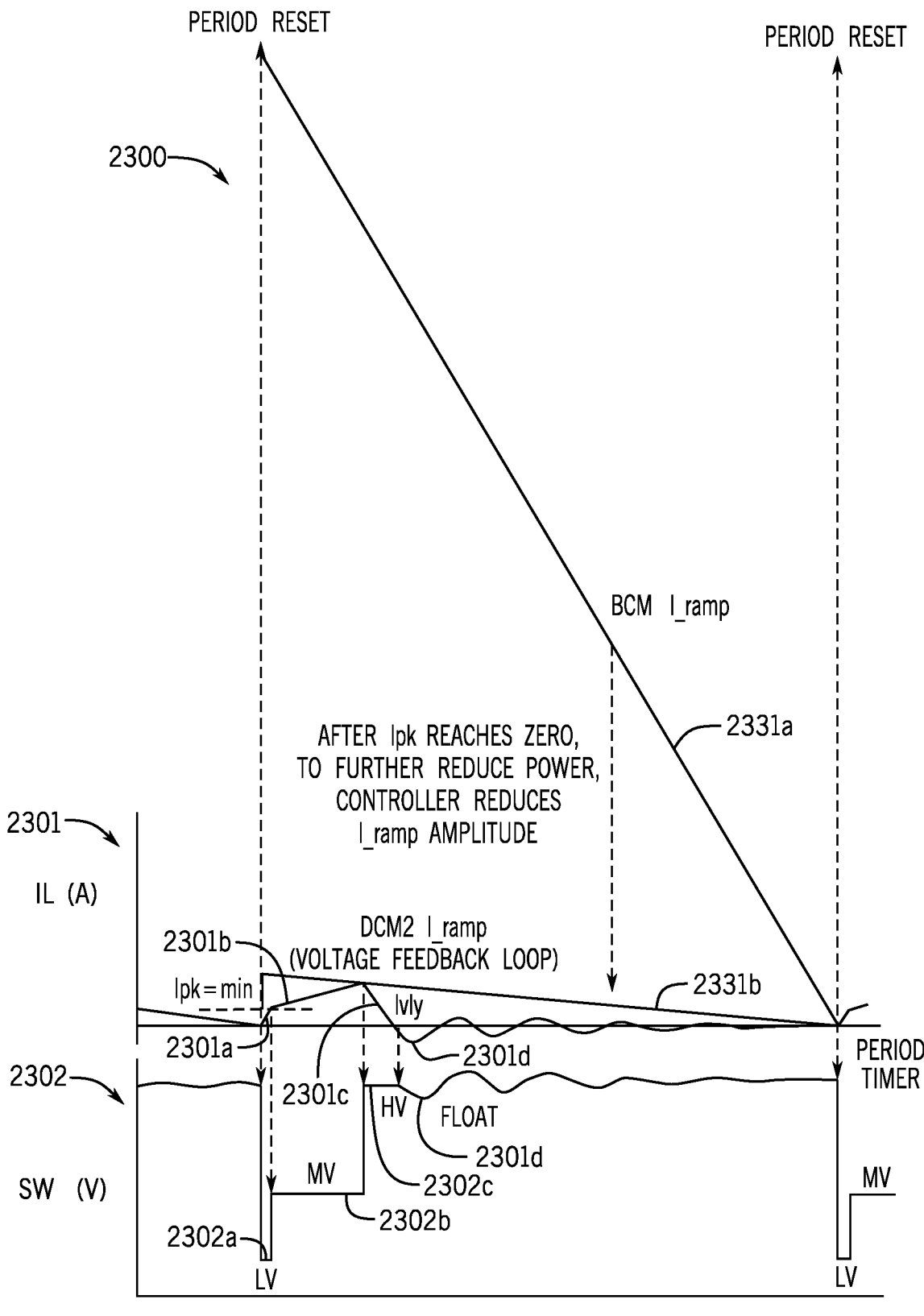
FIG. 23 illustrates discontinuous conduction mode two (DCM2) control for a CDSC cell.

FIG. 23 illustrates discontinuous conduction mode two (DCM2) control for a CDSC cascade. FIG. 23 illustrates one complete cycle/period, for example as depicted above with respect to FIG. 17, with a plot 2301 of the current through the driving coil (e.g., inductor L1) and a plot 2302 of the voltage at node SW. DCM2 occurs at light load and when the input voltage Vin is greater than the medium voltage level MV (see, e.g., schematic 1702). As in the above examples, I_ramp 2331a/2331b reaching zero triggers a period_timer event. When period_timer is TRUE, and either P_DONE or Ipos (as described above) is TRUE, the control circuitry can reset the period (e.g., left hand period reset in FIG. 23).

Following a period reset, the voltage at node SW is at low voltage (LV) level 2302a. The peak current Ipk may be already at the minimum Ipk level, thus the voltage of node SW can soon increase to MV 2302b. Because input voltage Vin is higher than medium/intermediate voltage MV (see, e.g., schematic 1701), inductor current 2301b continues to rise, and intersects I_ramp 2331b, causing the voltage of node SW to rise to high voltage value HV 2302c (see, e.g., schematic 1703). To further reduce power when Ipk is already at its minimum level, the controller can reduce the I_ramp amplitude (and thus slope), such that the inductor current and I_ramp intersects at a lower current level. In any case, the voltage of node SW being at high voltage level $2302c$ causes inductor current $2301c$ to quickly decrease, reaching below valley threshold Ivly before period_timer event. In this case, the control circuitry can first trigger S to P mode transition for all cells. Once done (signaled by P_DONE), or upon detecting inductor current reversal (signaled by Ipos, as discussed above), the controller sets all cells to F mode (float, or Hi-Z).

In each of the examples described above with respect to FIGS. 21-23, I_ramp (2131, 2231, 2231$b$) is a dual-role ramp that controls switching period. In the case of boundary mode control (BCM), illustrated in FIG. 21, I_ramp also programs the inductor current to reach zero near the end of the constant switching periods. As a result, the slope has Vin and Vout feedforward, to reconstruct the inductor current slope. Additionally, closed-loop calibration can be used to fine tunes the I_ramp slope to match inductor current slope, as described in greater detail below with respet to FIG. 25. Alternatively, in the discontinuous current modes 1 and 2 (DCM1 & DCM2), discussed above with respect to FIGS. 22 and 23, I_ramp functions as a timer to maintain constant switching periods, as well as controlling light load power in DCM2 (FIG. 23). More specifically, in DCM2, when Ipk has been reduced to its minimum level and the voltage feedback loop needs to further reduce output power, reducing I_ramp amplitude can achieve this goal.

Figure 24:
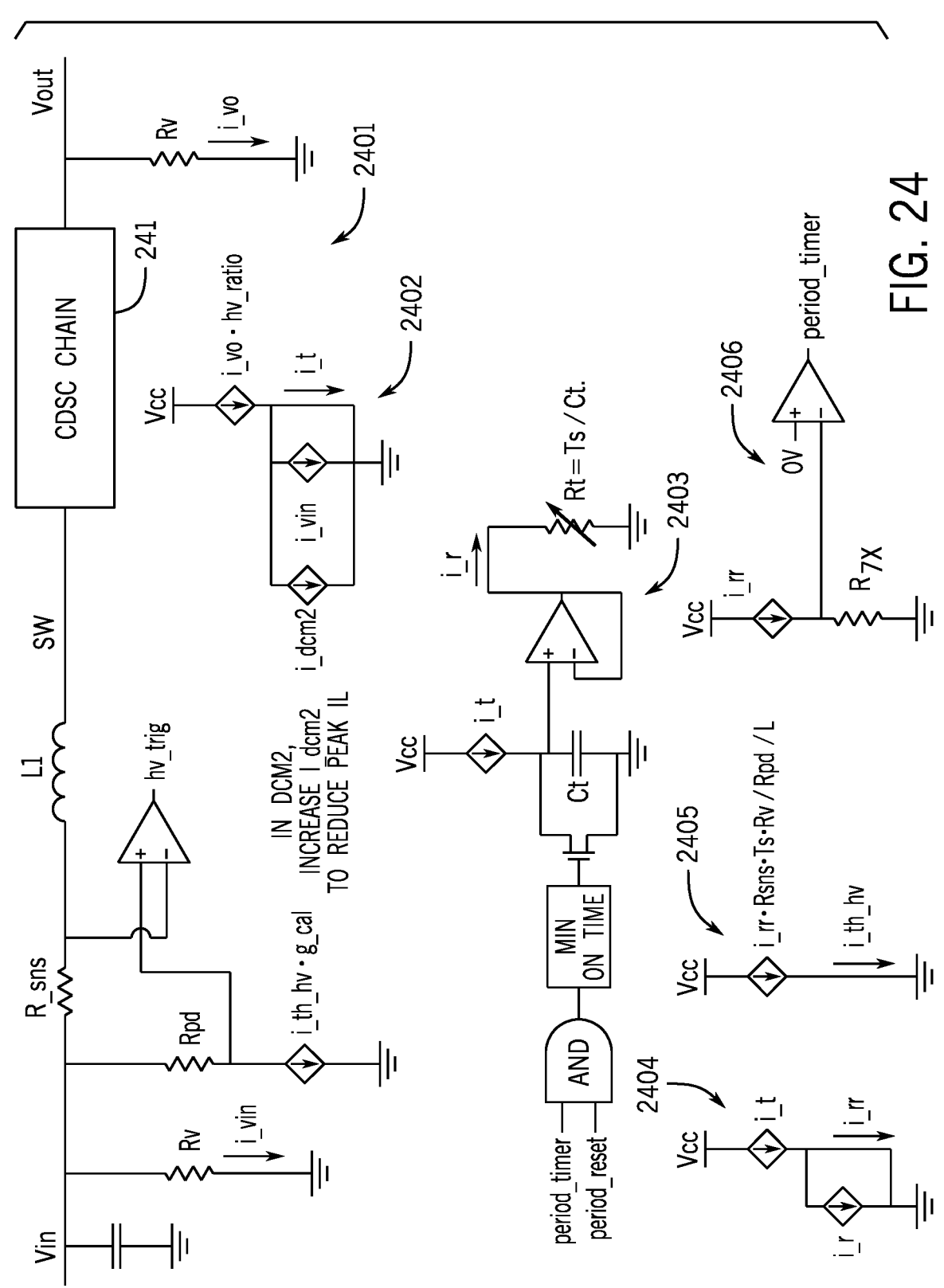
FIG. 24 illustrates an example implementation of the dual role ramp signal discussed above with respect to FIGS. 21-23.

FIG. 24 illustrates an example implementation of the dual role ramp signal discussed above with respect to FIGS. 21-23. The power train and certain control elements are depicted in schematic 2401, with additional control circuitry components denoted in schematics 2402-2406. The example ramp implementation takes into account sensor scaling. The max I_ramp discussed above with respect 21-22 corresponds to the inductor L1 current level. Thus, $$IL\_max=(HV-Vin)/L*Ts=(hv\_ratio*Vout-Vin)/L*Ts,$$

where IL_max is the maximum inductor current, HV is the high voltage level, Vin is the input voltage, L is the inductance of inductor L1, Ts is switching period, and hv_ratio is the high voltage level divided by the output voltage Vout. The control circuitry (block 2402) can generate an internal reference i_t, corresponding to IL_max, determined by:

$$i\_t=hv\_ratio*i\_vo-i\_vin=(hv\_ratio*Vo-Vin)/Rv.$$

where i_vo is the current through sense resistor Rv at the output and corresponds to the output voltage Vout, i_vin is the current through sense resistor Rv at the input and corresponds to the input voltage Vin, and Rv is the value of the sense resistors.

In Discontinuous Conduction Mode 2 (DCM2) (discussed above with respect to FIG. 23), I_ramp can be reduced by the output voltage feedback loop. This can be achieved by subtracting i_dcm2 from i_t as shown in block 2402. Reference i_t is mirrored and charged into a timing capacitor Ct (block 2403). The voltage ramp on Ct can then converted to a current ramp i_r, given by:

$$i\_r=i\_t/Ct*t/Rt,$$

where Rt=Ts/Ct. As a result, $$i\_r=i\_t*t/Ts.$$

Thus, when t=Ts, i_r=i_t. The i_r ramp thus starts from 0 and ends at i_t, whereas the I_ramp in FIGS. 21-23 goes from max to 0 in each period. As illustrated in block 2404, subtracting i_r from i_t produces a reversed ramp i_rr, given by:

$$i\_rr=i\_t-i\_r=i\_t*(1-t/Ts).$$

Reference i_rr reaching OA indicates that t=Ts, and hence triggers period_timer event (block 2406). As shown in block 2405, the control circuitry can also scale i_rr to i_th_hv. (Reference i_th_hv can be used to drive the comparator threshold in block 2401, which in turn generates the hv_trig signal.) With reference to control circuitry block 2405, the scaling factor g_i_th_hv can be given by:

$$g\_i\_th\_hv=Rsns*Ts*Rv/Rpd/L,$$

where R_sns is the input current sense resistance (block 2401), Ts is the switching period, Rv is the voltage sense resistance (discussed above), and Rpd is the comparator threshold drive resistance illustrated in block 2401. As illustrated by block 2405, and applying the equations above, $$i\_th\_hv=i\_rr*g\_i\_th\_hv=i\_rr*Rsns*Ts*Rv/Rpd/L=(HV-Vin)/L*(Ts-t)*Rsns/Rpd.$$

The scale factor g_i_th_hv can be a fixed value built into an integrated circuit controller implementation and/or stored in a read only memory. Thus, a designer may vary other variables to design around a fixed g_i_th_hv value. In addition, using a DCR method to sense inductor current may offer additional design freedom to scale sensing gain.

In any case, applying i_th_hv to Rpd (block 2401) produces a comparator threshold voltage (at the positive input of the comparator). The corresponding inductor current threshold calculated from the above is thus, $$i\_th\_hv*Rpd/Rsns=(HV-Vin)/L*(Ts-t)=IL\_max*(1-t/Ts).$$

If, I_ramp exactly matches the inductor current slope, switching frequency is a constant. In practice, variations such as component tolerance mismatches can result in a slightly variable (quasi-constant) switching frequency. Thus, if inductor current IL crosses below zero before period_timer, the switching frequency will be dominated by the period timer, and ZVS may be partially lost. Otherwise, if inductor current IL crosses below zero after period timer, the switching frequency will be dominated by ZVS, which may vary with input and output voltages. Applying a calibration gain, g_cal, to i_th_hv (as shown in block 2401) can compensate for such variation. The calibration gain g_cal may be adjusted during operation on-the-fly. The on-the-fly calibration can be based on timing relation between (1) IL_cross_below_OA event, and (2) period_timer event as illustrated in FIG. 30.

Figure 25:
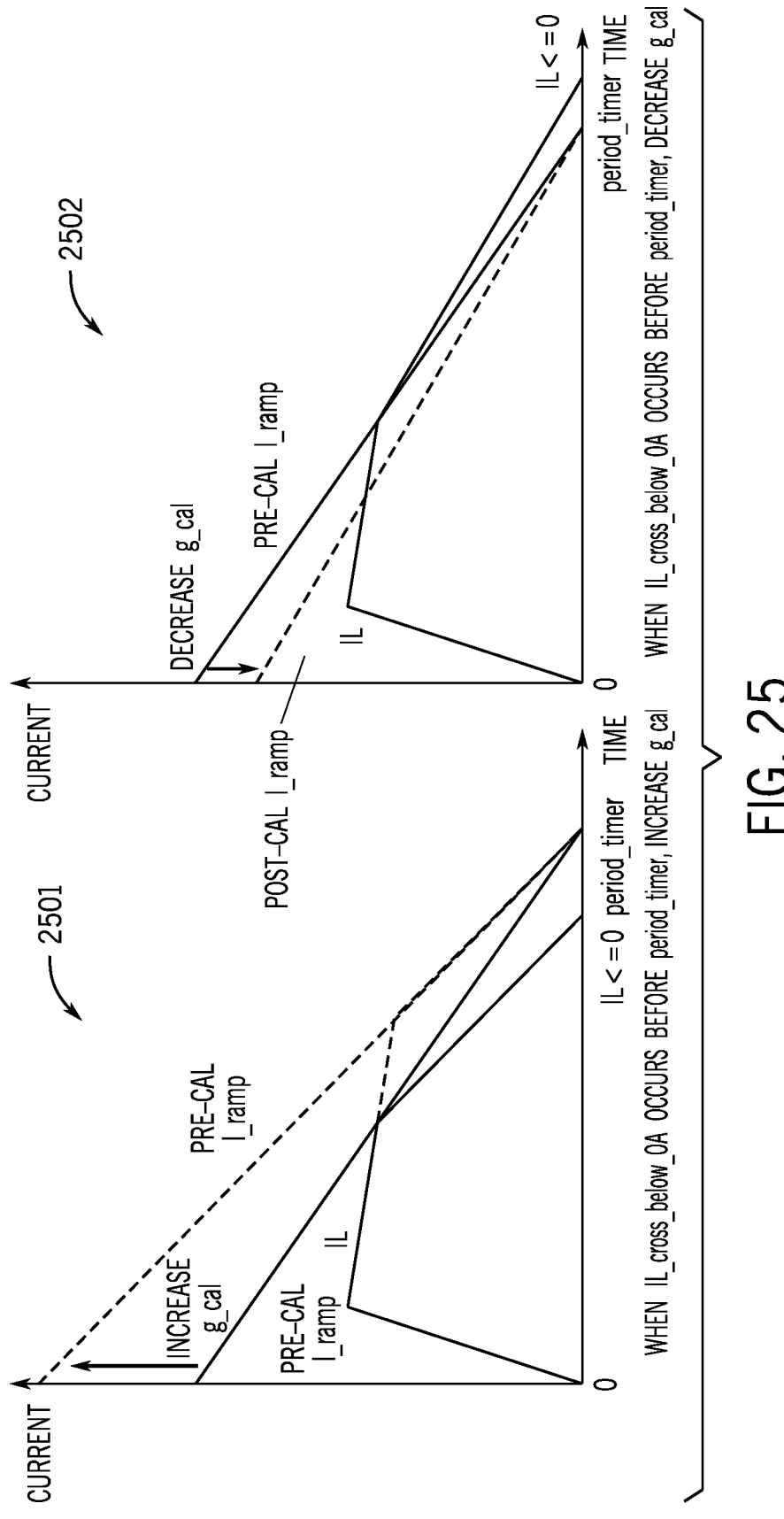
FIG. 25 illustrates a calibration process for a dual role ramp signal.

FIG. 25 illustrates a calibration process for a dual role ramp signal in Boundary Conduction Mode (BCM). In BCM, if the inductor current crosses below OA before period_timer, then g_cal can be increased as illustrated in plot 2501. This results in a post calibration current ramp with a higher slope and higher initial value, as illustrated. Otherwise, if inductor current IL crosses below 0 after period_timer, then g_cal can be decreased, as illustrated in diagram 2502. This results in a post calibration current ramp with a lower slope and lower initial value, as illustrated.

Figure 26A:
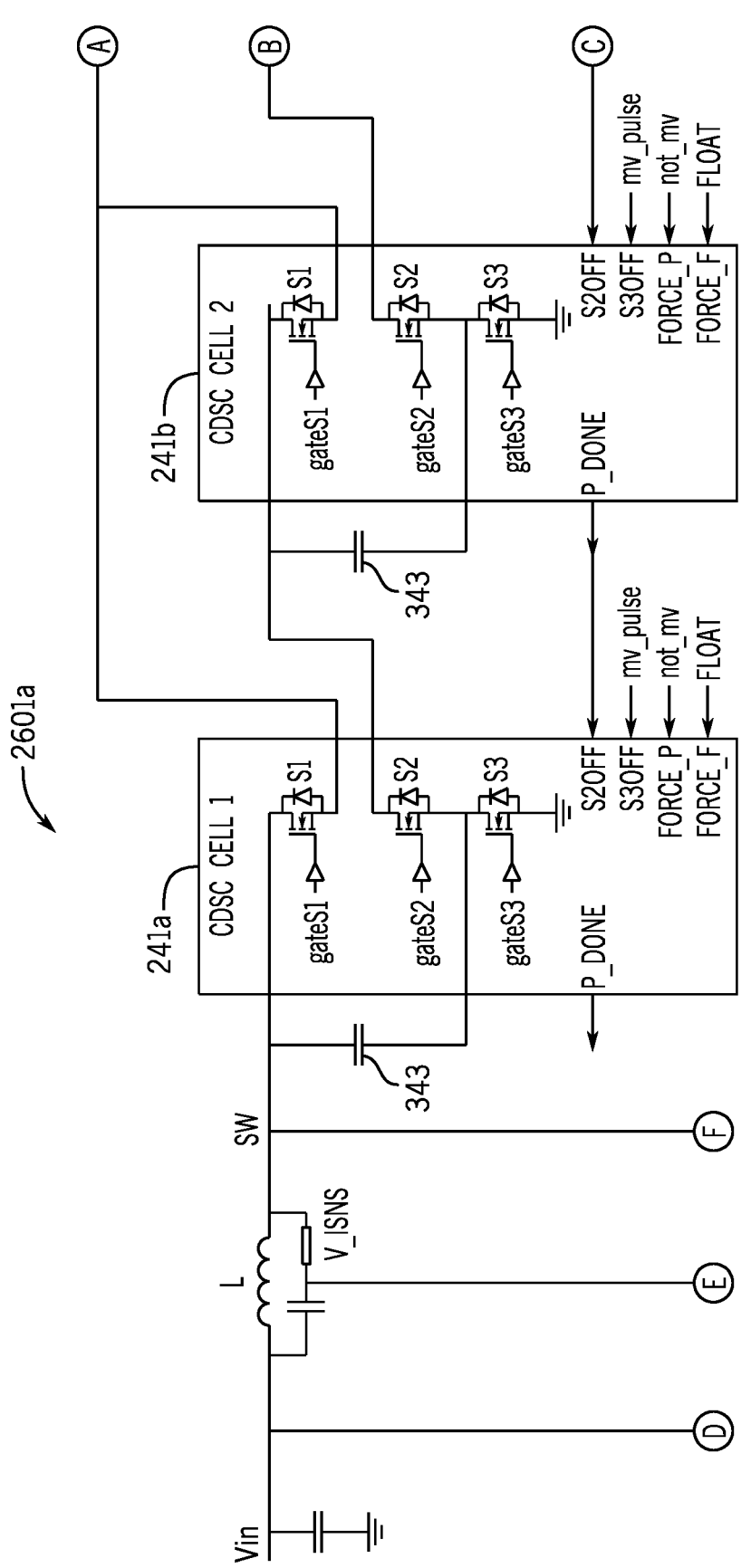
FIGS. 26A-D illustrate control logic of a CDSC cascade for wired charging.
Figure 26B:
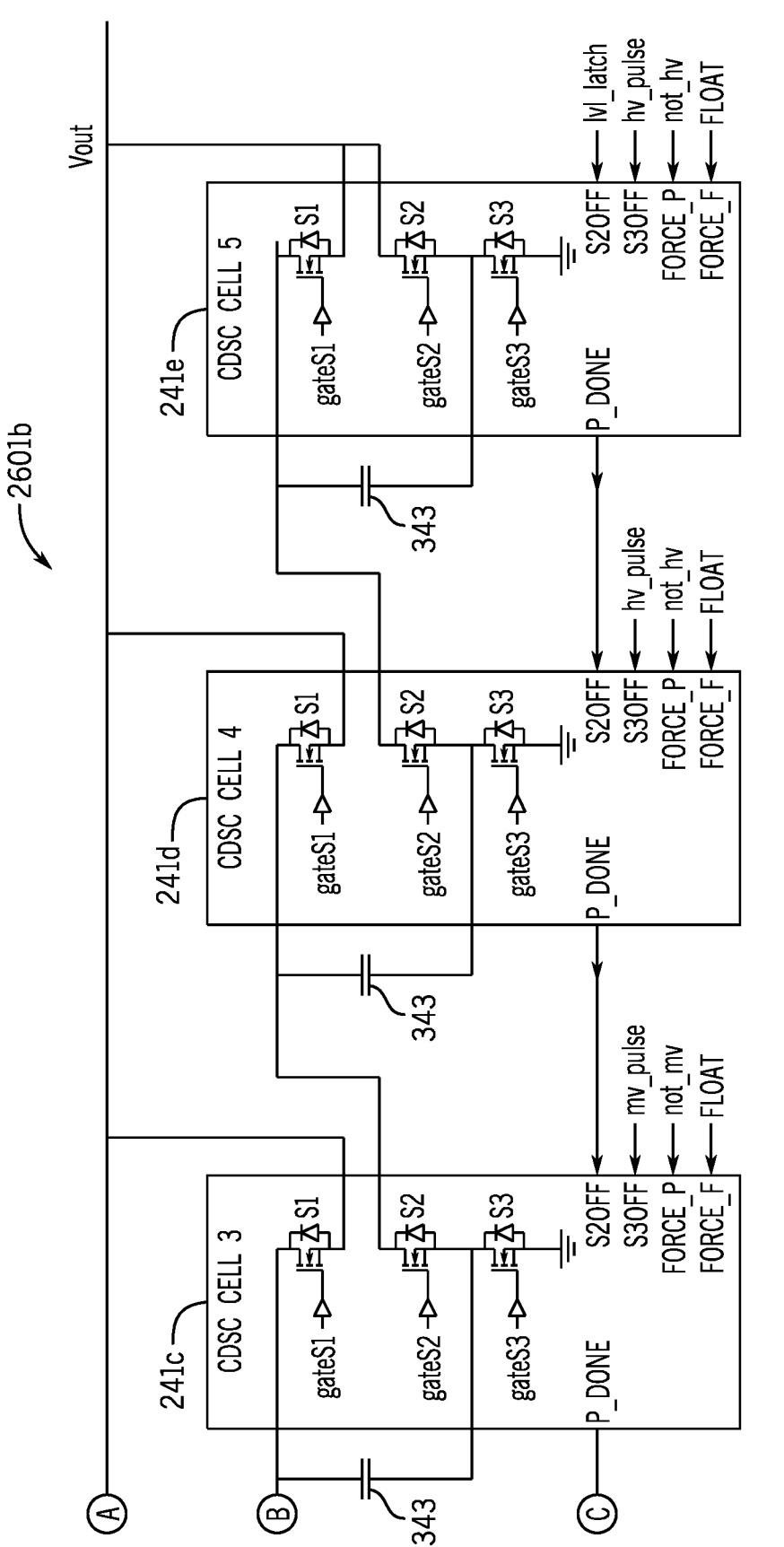
Figure 26C:
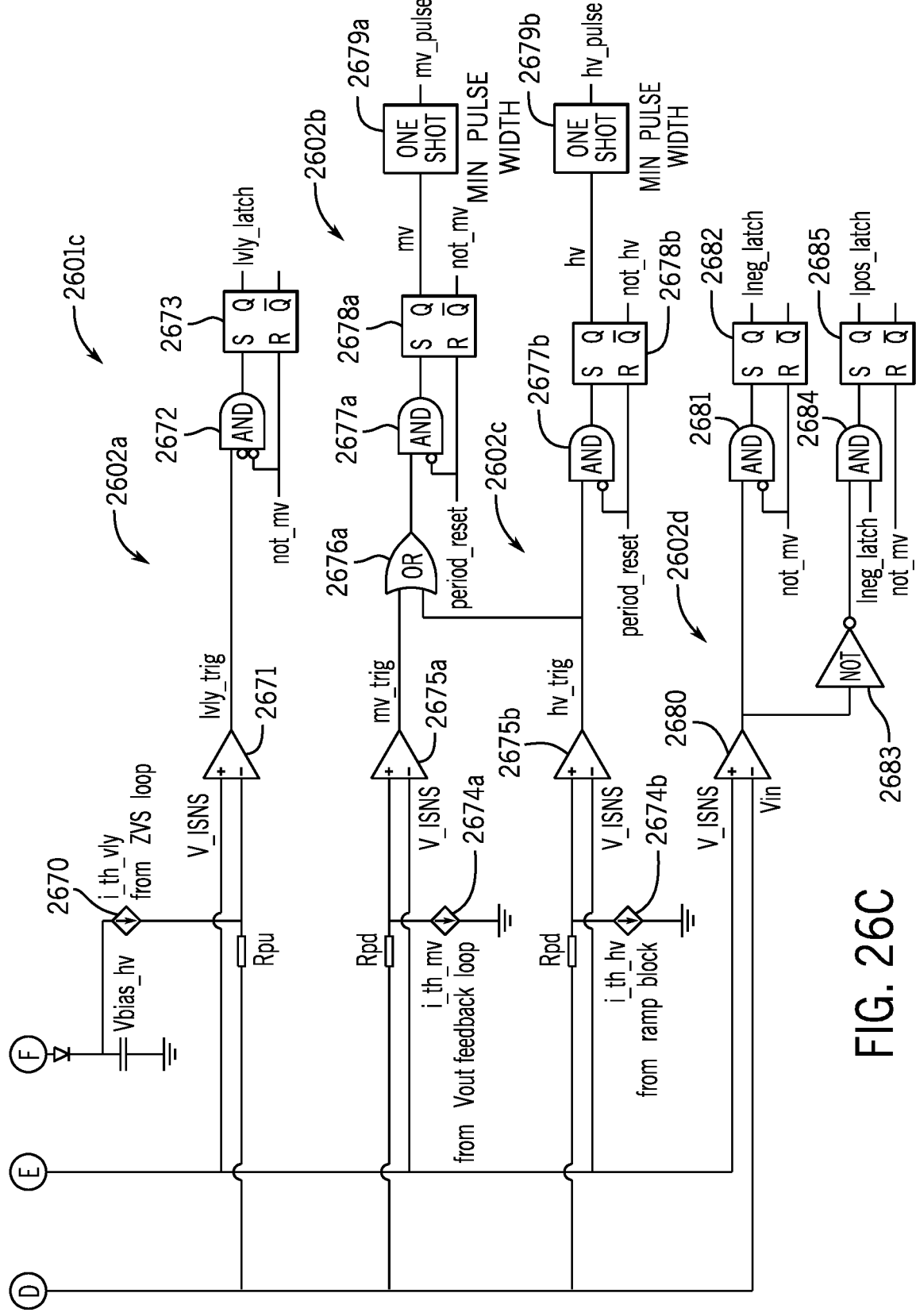
Figure 26D:
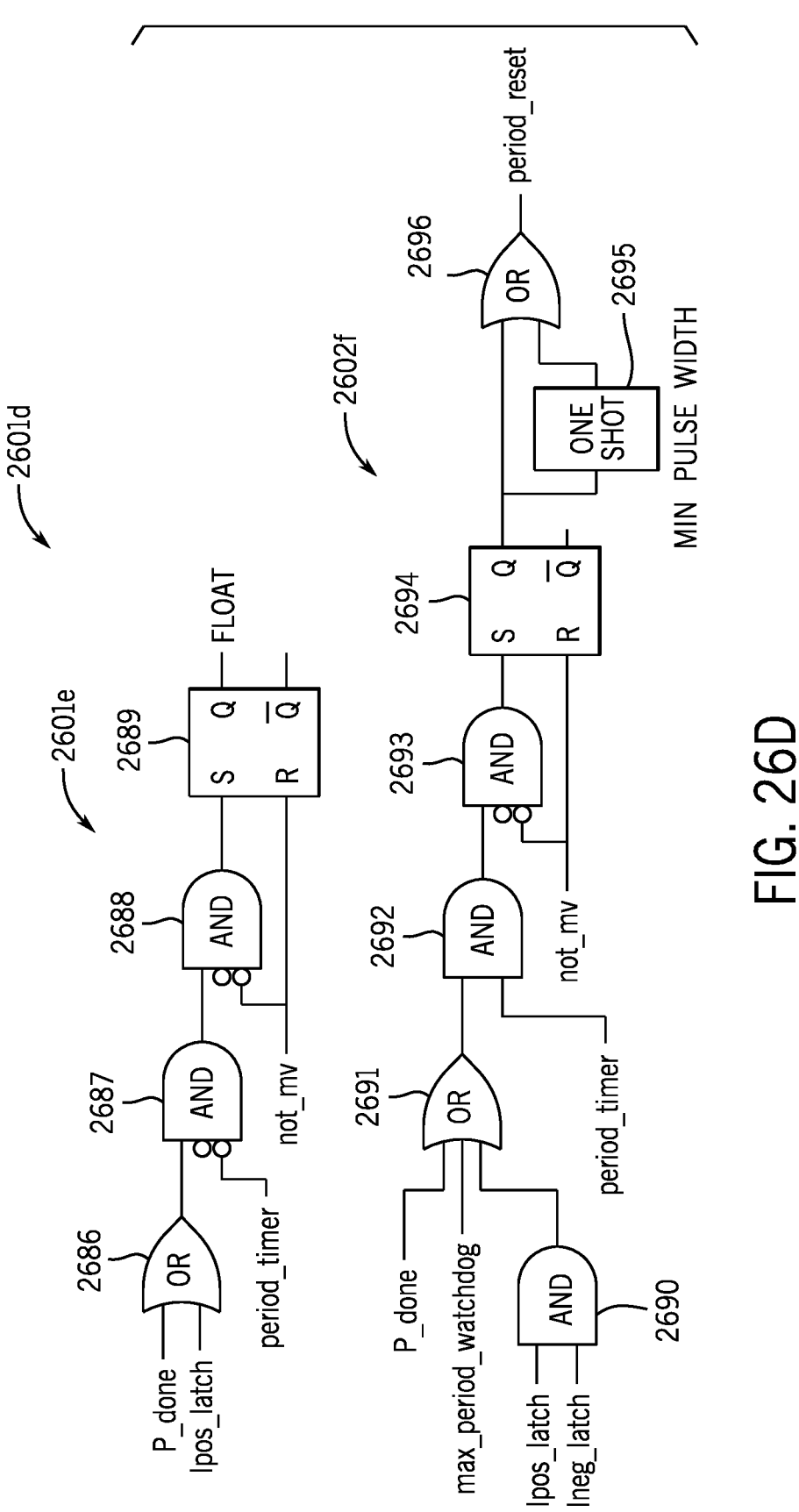

FIGS. 26A-26D illustrate a CDSC cascade and exemplary associated control logic for power supply from a wired power source, e.g., for wired battery charging. As with the control circuitry described above, the control circuitry illustrated in FIGS. 26A-26D could be implemented as any suitable combination of discrete, integrated, analog, digital, and/or programmable circuitry. FIG. 26A illustrates a first portion 2601$a$ of the CDSC cascade beginning with an input voltage Vin that is coupled via an inductor L to a first CDSC cell 241$a$, which is in turn coupled to a second CDSC cell 241$b$. FIG. 26B illustrates a second portion 2601$b$ of the CDSC cascade, including third CDSC cell 241$c$, fourth CDSC cell 241*d*, and fifth CDSC cell 241*e*, which provides the output voltage Vout. In one embodiment, Vout may be used as a battery charging voltage, although the output bus. FIG. 26C illustrates a first portion 2601*c* of the control circuitry for the CDSC cascade illustrated in FIGS. 26A-26B. This first portion 2601*c* includes four logic trains 2602*a*-2602*d* that generate various control signals as described in greater detail below. FIG. 26D illustrates a second portion 2601*d* of the control circuitry for the CDSC cascade illustrated in FIGS. 26A-26B. The second portion 2601*d* includes two logic trains 2602*e* and 2602*f* that generate various control signals as described in greater detail below. FIGS. 26A-26D illustrate only a single cascade, but a converter could include two such cascades, as described above with respect to FIG. 2, for example.

With reference to FIGS. 26A-26B, each CDSC cell 241*a*-241*e* has power and control inputs and outputs as generally described above, e.g., with respect to FIG. 3. More particularly, the most downstream CDSC cell 241*e* receives the following control inputs: an Ivly_latch control signal generated as described below at its S2OFF input; an hv_pulse input generated as described below at its S3OFF input; a not_hv control signal generated as described below at its FORCE_P input, and a float control signal generated as described below at its FORCE_F input. The P_DONE output of most downstream CDSC cell 241*e* is coupled to the S2OFF input of the next upstream CDSC cell 241*d*. The other three control inputs of next upstream CDSC cell 241*d* are the same as CDSC cell 241*e*. P_DONE output of CDSC cell 241*d* is connected to the S2OFF input of the next upstream CDSC cell, which has its inputs and outputs connected as described above, except that the FORCE_P input is coupled to a not_mv signal generated as described below. This pattern continues until reaching the most upstream CDSC cell 241*a*, which provides its P_DONE output to the control circuitry as described in greater detail below.

With reference to FIG. 26C, logic train 2602*a* generates the Ivly_latch (i.e., current valley latch) control signal that is provided to the S2OFF input of most downstream CDSC cell 241*e*. This signal is generated by comparing the i_th_vly ("current threshold valley") signal 2670 to the V_ISNS signal from the input current sensor (received via connection "E" to FIG. 26A). The former is connected to the inverting input of comparator 2671, and the latter is connected to the non-inverting input of comparator 2671. As a result, comparator 2671 generates an output Ivly_trig ("current valley trigger") signal when the sensed input inductor current exceeds the ZVS threshold. This trigger signal is provided to a non-inverting input of AND gate 2672, which receives a not_mv control signal (generated by logic train 2602*b* as described below) at an inverting input. The output of AND gate 2672 is coupled to the S input of SR flipflop 2673, while the not_mv signal is coupled to the R input of SR flipflop 2673. As a result, whenever the current valley trigger signal is received and not_mv is low, flipflop 2673 will latch high. Flipflop 2673 will reset low when the not_mv signal transition high.

With continued reference to FIG. 26C, logic train 2602*b* generates the mv_pulse signal provided to CDSC cells 241*a*-241*c*. Depending on the input voltage, desired output voltage, and number of CDSC cells in the cascade, the mv_pulse signal may be provided to more or fewer CDSC cells. Logic train 2602*b* begins with comparator 2675*a*, which compares the sensed input inductor current (corresponding to V_ISNS) to the I_th_mv (current threshold for medium voltage level switching) current signal 2674*a* from the output voltage regulation feedback loop. The former is connected to the inverting input of comparator 2675*a*, while the latter is connected to the non-inverting input of comparator 2675*a*. As a result, comparator 2675*a* generates an mv_trigger (medium voltage level switching trigger) signal at its output when the sensed input inductor current falls below the threshold value. This mv_trigger signal is provided to one input of OR gate 2676*a*, which receives an hv_trigger (high voltage level switching trigger) signal at its other output. If either input is high, OR gate 2676*a* will generate a high signal at its output, which is provided to a non-inverting input of AND gate 2677*a*. The period_reset signal (generated by logic train 2602*f*, described below) is provided to an inverting input of AND gate 2677*a*. The output of the AND gate is coupled to the S input of SR flipflop 2678*a*, and the period_reset signal is coupled to the reset input of SR flipflop 2678*a*. The Q output of SR flipflop 2678*a* is the mv signal, which will latch high whenever the mv_trigger signal is received, and the period reset signal transitions low. The mv signal will transition low whenever the period_reset signal triggers the reset of flipflop 2678*a*. The mv control signal is provided to oneshot 2679*a*, which guarantees a minimum pulse width for the mv_pulse signal, which is provided to CDSC cells 241*a*-241*c*, as described above. The Q' output of flipflop 2678*a* is the not_mv signal provided to the FORCE_P inputs of CDSC cells 241*a*-241*c*, although, as noted above with respect to the mv_pulse signal, the not_mv signal may be provided to more or fewer CDSC cells depending on the total number of cells, input voltage, desired output voltage, etc.

With continued reference to FIG. 26C, logic train 2602*c* generates the hv_pulse signal provided to CDSC cells 241*e*-241*f*. Depending on the input voltage, desired output voltage, and number of CDSC cells in the cascade, the hv_pulse signal may be provided to more or fewer CDSC cells. Logic train 2602*c* begins with comparator 2675*b*, which compares the sensed input inductor current (corresponding to V_ISNS) to the I_th_hv (current threshold for medium voltage level switching) current signal 2674*b* from the dual mode ramp block. The former is connected to the inverting input of comparator 2675*b*, while the latter is connected to the non-inverting input of comparator 2675*b*. As a result, comparator 2675*b* generates an hv_trigger (high voltage level switching trigger) signal at its output when the sensed input inductor current falls below the threshold value. This hv_trigger signal is provided to one input of OR gate 2676*a*, which receives an mv_trigger (medium voltage level switching trigger) signal at its other output, as described above. The hv_trigger signal is also provided to a non-inverting input of AND gate 2677*b*. The period_reset signal (generated by logic train 2602*f*, described below) is provided to an inverting input of AND gate 2677*b*. The output of the AND gate is coupled to the S input of SR flipflop 2678*b*, and the period_reset signal is coupled to the reset input of SR flipflop 2678*b*. The Q output of SR flipflop 2678*b* is the hv signal, which will latch high whenever the hv_trigger signal is received, and the period_reset signal transitions low. The hv signal will transition low whenever the period_reset signal triggers the reset of flipflop 2678*b*. The hv control signal is provided to oneshot 2679*b*, which guarantees a minimum pulse width for the hv_pulse signal, which is provided to CDSC cells 241*d*-241*e*, as described above. The Q' output of flipflop 2678*b* is the not_hv signal provided to the FORCE_P inputs of CDSC cells 241*c*-241*f*, although, as noted above with respect to the hv_pulse signal, the not_hv signal may be provided to more or fewer CDSC cells depending on the total number of cells, input voltage, desired output voltage, etc.

With still further reference to FIG. 26C, logic train 2602d generates the Ineg_latch (negative current latch) and Ipos_latch (positive current latch) signals used by logic trains 2602c-2602f, described below. Logic train 2602d begins with a comparator 2680 that compares the sensed input inductor current (corresponding to V_ISNS) to the input voltage Vin. The output of this comparator goes high when V_ISNS is greater than the input voltage and vice-versa. This output is coupled to an input of AND gate 2681, which receives at an inverting input the not_mv signal described above. The output of AND gate 2681 is provided to the S input of SR flipflop 2682, while the not_mv signal is provided to the R input. Flipflop 2682 thus acts as a latch that is triggered high when the inductor current goes negative and the not_mv signal is low. The latch is reset when the not_mv signal transitions high. The Q output of the flipflop 2682 is thus the Ineg_latch signal, which latches low for negative current. The output of comparator 2680 is also coupled to NOT gate 2683, which inverts the signal before providing it to a non-inverting input of AND gate 2684, which receives at another non-inverting input the Ineg_latch signal described above. The output of AND gate 2684 is provided to the S input of SR flipflop 2685, while the not_mv signal is provided to the R input. Flipflop 2685 thus acts as a latch that is triggered high when the inductor current goes positive (and the not_mv signal is low). The latch is reset when the not_mv signal transitions high. The Q output of the flipflop 2685 is thus the Ineg_latch signal, which latches low for positive current.

Turning now to FIG. 26D, control circuit portion 2601d includes logic train 2602e, which provides the float signal that is provided to the CDSC cells 241a-241c. Logic train 2602c begins with OR gate 2686, which receives at one of its inputs the P_done signal coming from the most upstream CDSC cell 241e (shown in FIG. 26A) and indicating completion of the parallel mode transition. OR gate 2686 receives at its other input the Ipos_latch signal, indicating that the input current has transitioned high. Thus, if either of these conditions is true, the output of OR gate 2686, which is coupled to an input of AND gate 2687, transitions high. AND gate 2687 receives at an inverting input the period_timer signal (discussed below), which provides timing for the switching operation. Thus, the output of AND gate 2687 transitions high when either the parallel mode transition is complete or the input current has transitioned positive, and the period timer clock is not reset. This output is coupled to an input of AND gate 2688 which receives at an inverting input the not_mv signal discussed above. The output of AND gate 2688 is coupled to the S input of SR flipflop 2689, while the not_mv signal is coupled to its R input. The Q output of flipflop 2689 thus becomes a float latch that latches high when the above condition is met and is reset when the not_mv signal is triggered.

With further reference to FIG. 26D, logic train 2602f generates the period_reset signal that serves as the overall timing clock for the CDSC cascade. Logic train 2602f begins with AND gate 2690, which receives the Ipos_latch and Ineg_latch signals described above. Thus, the output of AND gate 2690 will be high at the transitions from positive to negative current. This output is coupled to one input of OR gate 2691, which also receives the max_period_watchdog signal that sets the maximum time for the switching period, and the P_done signal from the most upstream CDSC sell 241a. Thus, the output of OR gate 2691 will transition high upon the occurrence of either of: completion of the parallel mode transition, expiration of the max_period_watchdog timer, or an input current reversal. The output of OR gate 2691 is provided to a first input of AND gate 2692, which receives at its other input the period_timer signal (that is generated by logic train 2602f). Thus, the output of AND gate will transition high when either of the aforementioned conditions occurs and the period_timer signal is triggered. The output of AND gate 2692 is provided to an input of AND gate 2693, which receive at an inverting input the not_mv signal discussed above. The output of AND gate 2693 is provided to the S input of SR flipflop 2694, which receives the not_mv signal at its R input. Flipflop 2694 thus becomes a latch where the output Q latches high when the conditions described above and is reset when the not_mv signal is received. The Q output of flipflop 2694 is provided directly to one input of OR gate 2696 and to another output via a onehot 2690 that provides a minimum pulse width. Thus, to simplify, the period_reset signal will effectively be provided upon occurrence of an input current reversal, expiration of a maximum period watchdog timer, or completion of the P_mode transition.

Described above are various features and embodiments relating to coil driven switched capacitor converters. Such arrangements may be used in a variety of applications but may be particularly advantageous when used in conjunction with electronic devices such as mobile phones, tablet computers, laptop or notebook computers, and accessories, such as wireless headphones, styluses, etc. Additionally, although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The foregoing describes exemplary embodiments of wireless power transfer systems that are able to transmit certain information amongst the PTx and PRx in the system. Such information may be used in a variety of ways, including those described herein, to enhance the operation of the wireless power transfer system. Entities implementing the present technology should take care to ensure that, to the extent any sensitive information is used in particular implementations, that well-established privacy policies and/or privacy practices are complied with. In particular, such entities would be expected to implement and consistently apply privacy practices that are generally recognized as meeting or exceeding industry or governmental requirements for maintaining the privacy of users. Implementers should inform users where personally identifiable information is expected to be transmitted in a wireless power transfer system and allow users to "opt in" or "opt out" of participation. For instance, such information may be presented to the user when they place a device onto a power transmitter, if the power transmitter is configured to poll for sensitive information from the power receiver.

Risk can be minimized by limiting the collection of data and deleting data once it is no longer needed. In addition, and when applicable, data de-identification can be used to protect a user's privacy. For example, a device identifier may be partially masked to convey the power characteristics of the device without uniquely identifying the device. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy. Robust encryption may also be utilized to reduce the likelihood that communication between inductively coupled devices are spoofed.

The invention claimed is:

1. A coil driven switched capacitor (CDSC) converter comprising:
   at least one input coil configured to receive input power;
   a first cascade of two or more CDSC cells, an input of the first cascade being coupled to a first terminal of the at least one input coil, and an output of the first cascade being coupled to an output bus of the CDSC converter; and
   a second cascade of two or more CDSC cells coupled to a second terminal of the at least one input coil and an output of the second cascade being coupled to the output bus of the CDSC converter.

2. The CDSC converter of claim 1 wherein the at least one input coil comprises a first inductor coupled between a wired input power source and the first cascade of one or more CDSC cells and a second inductor coupled between the wired input power source and the second cascade of one or more CDSC cells.

3. The CDSC converter of claim 2 wherein the at least one input coil further comprises a wireless power receiver coil.

4. The CDSC converter of claim 1 wherein the at least one input coil further comprises a wireless power receiver coil.

5. The CDSC converter of claim 1 wherein each CDSC cell comprises:
   a flying capacitor having a first terminal coupled to an input terminal of the CDSC cell and a second terminal;
   a top switch having a first terminal coupled to the input terminal of the CDSC cell and the first terminal of the flying capacitor and a second terminal coupled to a first output terminal of the CDSC cell, thereby allowing the top switch to selectively couple the first terminal of the flying capacitor to the first output terminal of the CDSC cell;
   a middle switch having a first terminal coupled to a second output terminal of the CDSC cell and a second terminal coupled to the second terminal of the flying capacitor, thereby allowing the middle switch to selectively couple the second terminal of the flying capacitor to the second output terminal of the CDSC cell; and
   a bottom switch having a first terminal coupled to the second terminal of the flying capacitor and the second terminal of the middle switch and a second terminal coupled to ground, thereby allowing the bottom switch to selectively couple the second terminal of the flying capacitor to ground.

6. The CDSC converter of claim 5 wherein:
   the first cascade of one or more CDSC cells further comprises:
      a first upstream CDSC cell having its input terminal coupled to a first rectifier and its first output terminal coupled to the output bus; and
      a first downstream CDSC cell having its input terminal coupled to a second output terminal of the first upstream CDSC cell and its first and second output terminals coupled to the output bus; and the second cascade of one or more CDSC cells further comprises:
      a second upstream CDSC cell having its input terminal coupled to a second rectifier and its first output terminal coupled to the output bus; and
      a second downstream CDSC cell having its input terminal coupled to a second output terminal of the second upstream CDSC cell and its first and second output terminals coupled to the output bus.

7. The CDSC converter of claim 6 wherein the first and second cascades of CDSC cells each further comprise one or more intermediate CDSC cells, with each intermediate CDSC cell having its input terminal coupled to an immediately upstream CDSC cell, its first output terminal coupled to the output bus, and its second output terminal coupled to an immediately downstream CDSC cell.

8. The CDSC converter of claim 7 wherein each CDSC cell further comprises:
   a diode having its anode coupled to the second terminal of the flying capacitor and its cathode coupled to a terminal of the input coil.

9. The CDSC converter of claim 5 further comprising control circuitry that selectively alternates each CDSC cell among a P mode, an S mode, and a float mode to convert received input power to a desired voltage on the output bus, wherein:
   in the P mode the flying capacitor of the CDSC cell is connected in parallel with the first output terminal of the CDSC cell;
   in the S mode the flying capacitor of the CDSC cell is connected in series with the second output terminal of the CDSC cell; and
   in the float mode the flying capacitor of the CDSC cell is disconnected from the first and second output terminals of the CDSC cell.

10. The CDSC converter of claim 9 wherein the control circuitry sequences switching of switching devices of each cascade of CDSC cells to achieve zero voltage switching.

11. The CDSC converter of claim 9 wherein the control circuitry sequences switching a cascade of CDSC cells undergoing a P mode to S mode transition to achieve zero voltage switching by:
   simultaneously turning off top and bottom switches of the cascade of CDSC cells undergoing a P mode to S mode transition;
   turning off a low side switch of a rectifier coupled to the cascade of CDSC cells undergoing a P mode to S mode transition;
   turning on a high side switch of a rectifier coupled to the cascade of CDSC cells undergoing a P mode to S mode transition; and
   turning on middle switches of all CDSC cells in the cascade from upstream to downstream, upon middle switches' body diode conduction.

12. The CDSC converter of claim 9 wherein the control circuitry sequences switching a cascade of CDSC cells undergoing an S mode to P mode transition to achieve zero voltage switching by:
   turning off a middle switch of a most downstream CDSC cell in the cascade of CDSC cells undergoing an S mode to P mode transition;
   turning on a bottom switch of the most downstream CDSC cell upon its body diode conduction, and then turning on a top switch of the most downstream CDSC cell;
   turning off a middle switch of an adjacent upstream CDSC cell;

turning on a bottom switch of the adjacent upstream RDSC cell upon its body diode conduction, and then turning on a top switch of the adjacent upstream RDSC cell; and turning off a high side switch and turning on a low side switch of a rectifier corresponding to the cascade of CDSC cells undergoing a S mode to P mode transition.

13. The CDSC converter of claim 9 wherein the control circuitry sequences switching a cascade of CDSC cells undergoing an S mode to P mode transition to achieve zero voltage switching by:

simultaneously turning off a middle switch of each CDSC cell in the cascade of CDSC cells undergoing an S mode to P mode transition, and off a high side switch of a rectifier corresponding to the same cascade of CDSC cells;

waiting for current through the input coil to discharge the voltage on a second terminal of each flying capacitor through an auxiliary diode of each CDSC cell in the cascade;

upon completion of discharging the voltage on second terminals of all flying capacitors, simultaneously turning on a bottom switch and a top switch of each CDSC cell in the cascade of CDSC cells undergoing an S mode to P mode transition; and turning on a low side switch of a rectifier corresponding to the cascade of CDSC cells undergoing an S mode to P mode transition.

14. The CDSC converter of claim 9 wherein the control circuitry varies a conversion ratio of the CDSC converter to produce discrete conversion ratios by selectively actively operating a first subset of CDSC cells of a CDSC cascade and selectively forcing a second subset of CDSC cells of the CDSC cascade into P mode.

15. The CDSC converter of claim 9 wherein the control circuitry varies a conversion ratio of the CDSC converter to produce continuous conversion ratios by selectively actively operating a first subset of CDSC cells of a CDSC cascade, selectively operating at least one CDSC cell of the CDSC cascade with a variable duty cycle alternating between active operation and forced P mode, and selectively forcing a second subset of CDSC cells of the CDSC cascade into P mode.

16. The CDSC converter of claim 9 wherein the control circuitry varies a conversion ratio of the CDSC converter to produce continuous conversion ratios by selectively operating a first subset of CDSC cells of a CDSC cascade with a first variable duty cycle alternating between active operation and forced P mode, selectively operating a second subset of CDSC cells of the CDSC cascade with a second variable duty cycle greater than the first variable duty cycle and alternating between active operation and forced P mode, and selectively forcing a third subset of CDSC cells of the CDSC cascade into P mode.

17. The CDSC converter of claim 9 wherein the control circuitry operates the CDSC cells to produce three voltage levels in each switching period to control inductor current.

18. The CDSC converter of claim 17 wherein one of the three voltage levels is a medium voltage close to an input voltage of the CDSC converter, one of the voltage levels is a low voltage that is lower than the input voltage, and one of the voltage levels is a high voltage that is higher than the input voltage.

19. The CDSC converter of claim 18 wherein the control circuitry controls the inductor current to achieve boundary conduction mode operation.

20. The CDSC converter of claim 18 wherein the control circuitry operates the CDSC cells responsive to a peak current signal to trigger voltage level switching from the low voltage to the medium voltage and operates the CDSC cells responsive to a dual-role ramp signal to trigger voltage level switching from the medium voltage to the high voltage so as to force coil current to cross below zero at an end of each switching period.

21. The CDSC converter of claim 20 wherein the dual-role ramp signal is used as a switching period timer and an inductor current threshold.

22. The CDSC converter of claim 21 wherein the control circuitry generates the dual-role ramp signal so that an amplitude and a slope of the dual-role ramp signal change with input and output voltage to keep the switching period constant.

23. The CDSC converter of claim 22 wherein the control circuitry generates the dual-role ramp signal so that the amplitude and slope of the dual-role ramp signal are proportional to an amplitude and slope of a current through the input coil.

24. A wireless power receiver comprising:

a wireless power receiver coil configured to have an AC receiver input voltage induced thereacross by a wireless power transmitter;

a first rectifier having an input coupled to a first terminal of the wireless power receiver coil;

a second rectifier having an input coupled to a second terminal of the wireless power receiver coil;

a first cascade of two or more rectifier driven switched capacitor (RDSC) cells coupled between an output of the first rectifier and an output bus, each RDSC cell comprising a flying capacitor and a plurality of associated switching devices; and a second cascade of two or more RDSC cells coupled between an output of the second rectifier and the output bus; each RDSC cell comprising a flying capacitor and a plurality of associated switching devices;

whereby the first and second cascades of RDSC cells allow selecting a voltage or current conversion ratio to reduce losses.

25. The wireless power receiver of claim 24 wherein for each RDSC cell:

the flying capacitor has a first terminal coupled to an input terminal of the RDSC cell and a second terminal; and the plurality of switching devices include:

a top switch having a first terminal coupled to the input terminal of the RDSC cell and the first terminal of the flying capacitor and a second terminal coupled to a first output terminal of the RDSC cell, thereby allowing the top switch to selectively couple first terminal of the flying capacitor to the first output terminal of the RDSC cell;

a middle switch having a first terminal coupled to a second output terminal of the RDSC cell and a second terminal coupled to the second terminal of the flying capacitor, thereby allowing the middle switch to selectively couple the second terminal of the flying capacitor to the second output terminal of the RDSC cell; and a bottom switch having a first terminal coupled to the second terminal of the flying capacitor and the second terminal of the middle switch and a second terminal coupled to ground, thereby allowing the bottom switch to selectively couple the second terminal of the flying capacitor to ground.

26. The wireless power receiver of claim 25 wherein each RDSC cell further comprises: a diode having its anode coupled to the second terminal of the flying capacitor and its cathode coupled to the wireless power receiver coil.

27. The wireless power receiver of claim 25 wherein:

the first cascade of one or more RDSC cells further comprises:

a first upstream RDSC cell having its input terminal coupled to the first rectifier and its first output terminal coupled to the output bus; and a first downstream RDSC cell having its input terminal coupled to the second output terminal of the first upstream RDSC cell and its first and second output terminals coupled to the output bus; and the second cascade of one or more RDSC cells further comprises:

a second upstream RDSC cell having its input terminal coupled to the second rectifier and its first output terminal coupled to the output bus; and a second downstream RDSC cell having its input terminal coupled to the second output terminal of the second upstream RDSC cell and its first and second output terminals coupled to the output bus.

28. The wireless power receiver of claim 27 wherein the first and second cascades of RDSC cells each further comprise one or more intermediate RDSC cells, with each intermediate RDSC cell having its input terminal coupled to an immediately upstream RDSC cell, its first output terminal coupled to the output bus, and its second output terminal coupled to an immediately downstream RDSC cell.

29. The wireless power receiver of claim 24 further comprising control circuitry that:

operates the first cascade of one or more RDSC cells in a series mode when the AC receiver input current is in a positive half cycle and in a parallel mode when the AC receiver input current is in a negative half cycle; and operates the second cascade of one or more RDSC cells in a series mode when the AC receiver input current is in a negative half cycle and in a parallel mode when the AC receiver input current is in a positive half cycle.

30. The wireless power receiver of claim 29 wherein the control circuitry sequences switching of switching devices of each cascade of RDSC cells to achieve zero voltage switching.

31. The wireless power receiver of claim 24 further comprising control circuitry that operates to communicate data to the wireless power transmitter by amplitude shift keying.

32. The wireless power receiver of claim 31 further comprising controllable load circuitry coupled to at least one of the output of the first rectifier and the output of the second rectifier.

33. The wireless power receiver of claim 31 wherein the control circuitry operates the first and second cascades of one or more RDSC cells to simultaneously alternate between a first conversion ratio and a second conversion ratio.

34. The wireless power receiver of claim 31 wherein the control circuitry operates the first and second cascades of one or more RDSC cells to respectively alternate between a first conversion ratio and a second conversion ratio, wherein the cascades of one or more RDSC cells operate at two or more conversion ratios on the same switching cycle.

* * * * *